(12) United States Patent
Saito et al.

(10) Patent No.: US 7,774,580 B2
(45) Date of Patent: Aug. 10, 2010

(54) ARRAY PROCESSOR HAVING RECONFIGURABLE DATA TRANSFER CAPABILITIES

(75) Inventors: Miyoshi Saito, Kawasaki (JP); Hisanori Fujisawa, Kawasaki (JP); Hideki Yoshizawa, Kawasaki (JP); Tetsu Tanizawa, Kawasaki (JP); Ichiro Kasama, Kawasaki (JP); Tetsuo Kawano, Kawasaki (JP); Kazuaki Imafuku, Kawasaki (JP); Hiroshi Furukawa, Kawasaki (JP); Shiro Uriu, Yokohama (JP); Mitsuharu Wakayoshi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 37 days.

(21) Appl. No.: 11/077,561

(22) Filed: Mar. 11, 2005

(65) Prior Publication Data

US 2006/0010306 A1  Jan. 12, 2006

(30) Foreign Application Priority Data

Jul. 12, 2004  (JP) .............................. 2004-205332

(51) Int. Cl.
*G06F 15/00* (2006.01)
*G06F 15/76* (2006.01)

(52) U.S. Cl. ....................................... 712/15
(58) Field of Classification Search ................... 712/15, 712/226, 229, 241, 3, 215
See application file for complete search history.

(56) References Cited

U.S. PATENT DOCUMENTS

| | | | | |
|---|---|---|---|---|
| 4,825,359 A | * | 4/1989 | Ohkami et al. ................. 712/15 |
| 5,613,146 A | * | 3/1997 | Gove et al. ..................... 712/20 |
| 5,689,661 A | * | 11/1997 | Hayashi et al. ............. 710/316 |
| 6,457,116 B1 | * | 9/2002 | Mirsky et al. .................. 712/16 |
| 7,114,061 B2 | * | 9/2006 | Hirose et al. ................. 712/226 |
| 2003/0135710 A1 | | 7/2003 | Farwell et al. | |

(Continued)

FOREIGN PATENT DOCUMENTS

JP    02158214 A    6/1990

(Continued)

OTHER PUBLICATIONS

Patterson & Hennessy; Computer Organization and Design: The Hardware / Software Interface; 1998; Morgan Kaufmann Publishers, Inc.; Second Edition; p. B-24.*

(Continued)

*Primary Examiner*—Eddie P Chan
*Assistant Examiner*—Corey S Faherty
(74) *Attorney, Agent, or Firm*—Arent Fox LLP

(57) ABSTRACT

A reconfigurable operation apparatus consists of a plurality of operation units capable of reconfiguring themselves by using a piece of given first configuration data and of operating simultaneously with one another; RAMs; diverse processor elements required for constituting an operation apparatus; an inter-resource network interconnecting the operation units, the RAMs and the diverse processor elements, performing data transfers between resources connected thereto in a uniform transfer time independent of positions and kinds of the resources, and being reconfigurable by using a given second configuration data; and a configuration memory storing the first and the second configuration data. Configuration data is loaded from an external storage apparatus onto the configuration memory, and the first and the second configuration data are supplied to the reconfigurable processor resources in appropriate sequence and timing based on data available from a plurality of operation units.

20 Claims, 61 Drawing Sheets

U.S. PATENT DOCUMENTS

2003/0154357 A1* 8/2003 Master et al. .................. 712/15
2004/0025004 A1   2/2004 Gorday et al.
2006/0010306 A1*  1/2006 Saito et al. .................. 712/226

FOREIGN PATENT DOCUMENTS

| | | |
|---|---|---|
| JP | 03116225 A | 5/1991 |
| JP | 04364525 A | 12/1992 |
| JP | 11085463 A | 3/1999 |
| JP | 11296345 A | 10/1999 |
| JP | 2001-312481 | 11/2001 |
| JP | 2003-208305 | 7/2003 |
| WO | WO-03009125 A1 | 1/2003 |
| WO | WO-2004025468 A1 | 3/2004 |

OTHER PUBLICATIONS

Dev C. Chen et al., "A Reconfigurable Multiprocessor IC for Rapid Prototyping of Real-Time Data Paths", IEEE International Solid State Circuits Conference, IEEE Service Center, New York, NY, US, vol. 35, Feb. 1, 1992, pp. 74, 75 and 249.

* cited by examiner

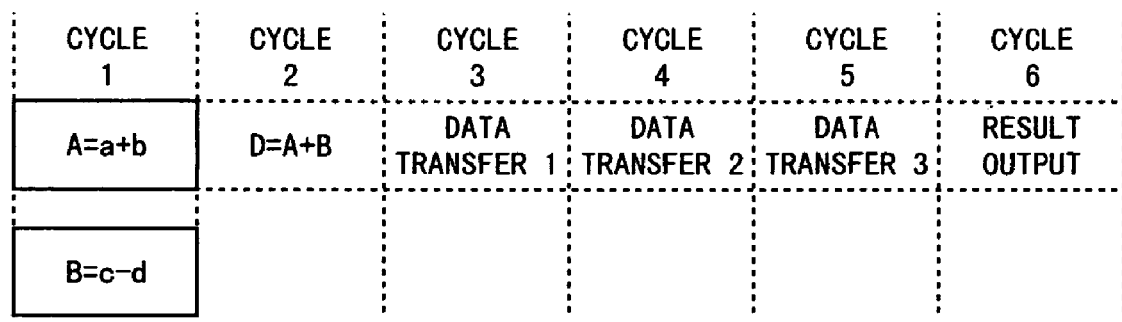
F I G. 3 B

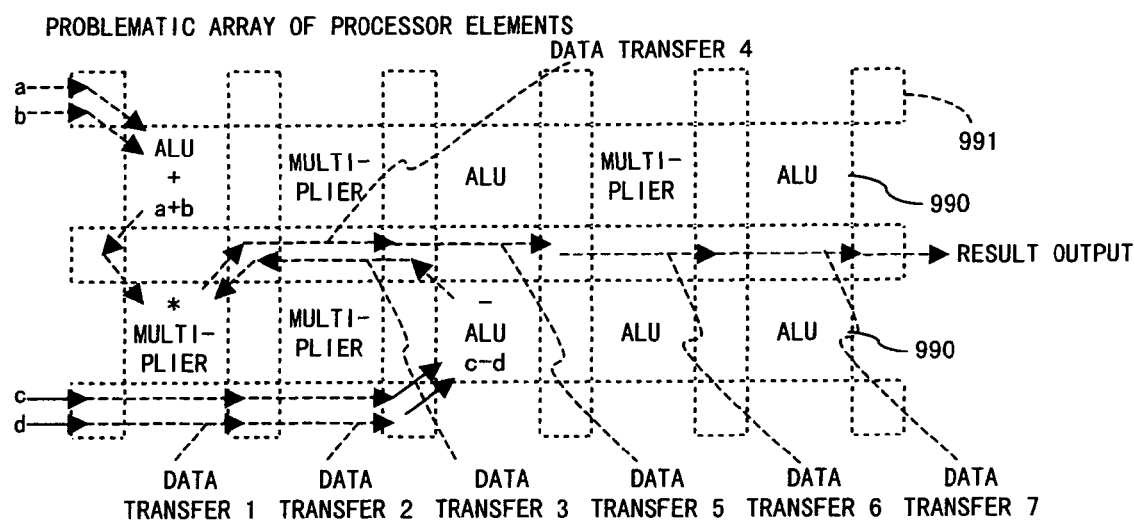
F I G. 3C

| CYCLE 1 | CYCLE 2 | CYCLE 3 | CYCLE 4 | CYCLE 5 | CYCLE 6 | CYCLE 7 | CYCLE 8 | CYCLE 9 | CYCLE 10 |
|---|---|---|---|---|---|---|---|---|---|
| A=a+b | | | | C=A*B | DATA TRANSFER 4 | DATA TRANSFER 5 | DATA TRANSFER 6 | DATA TRANSFER 7 | RESULT OUTPUT |
| DATA TRANSFER 1 | DATA TRANSFER 2 | B=c−d | DATA TRANSFER 3 | | | | | | |

FIG. 3D

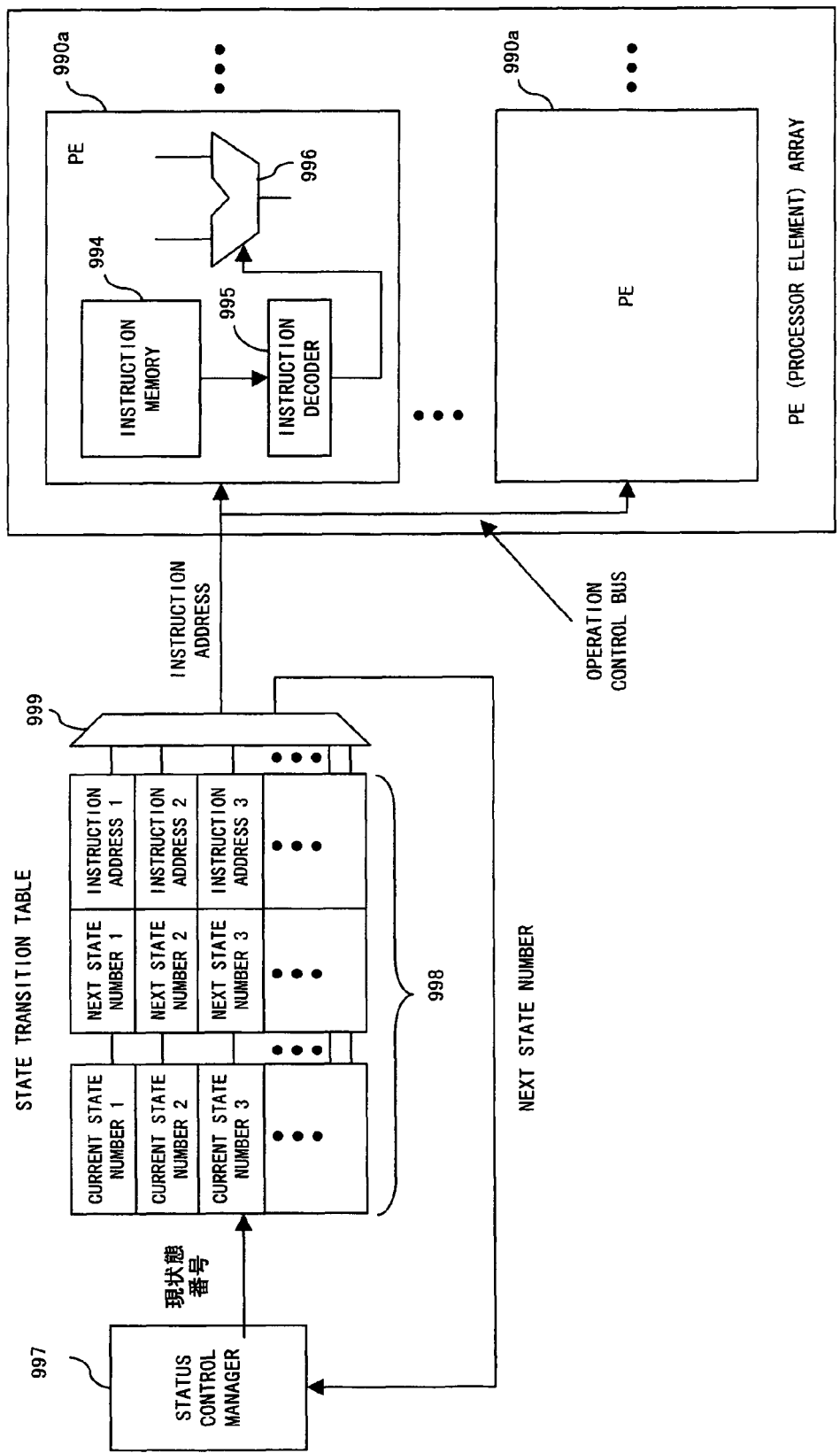
F I G. 5

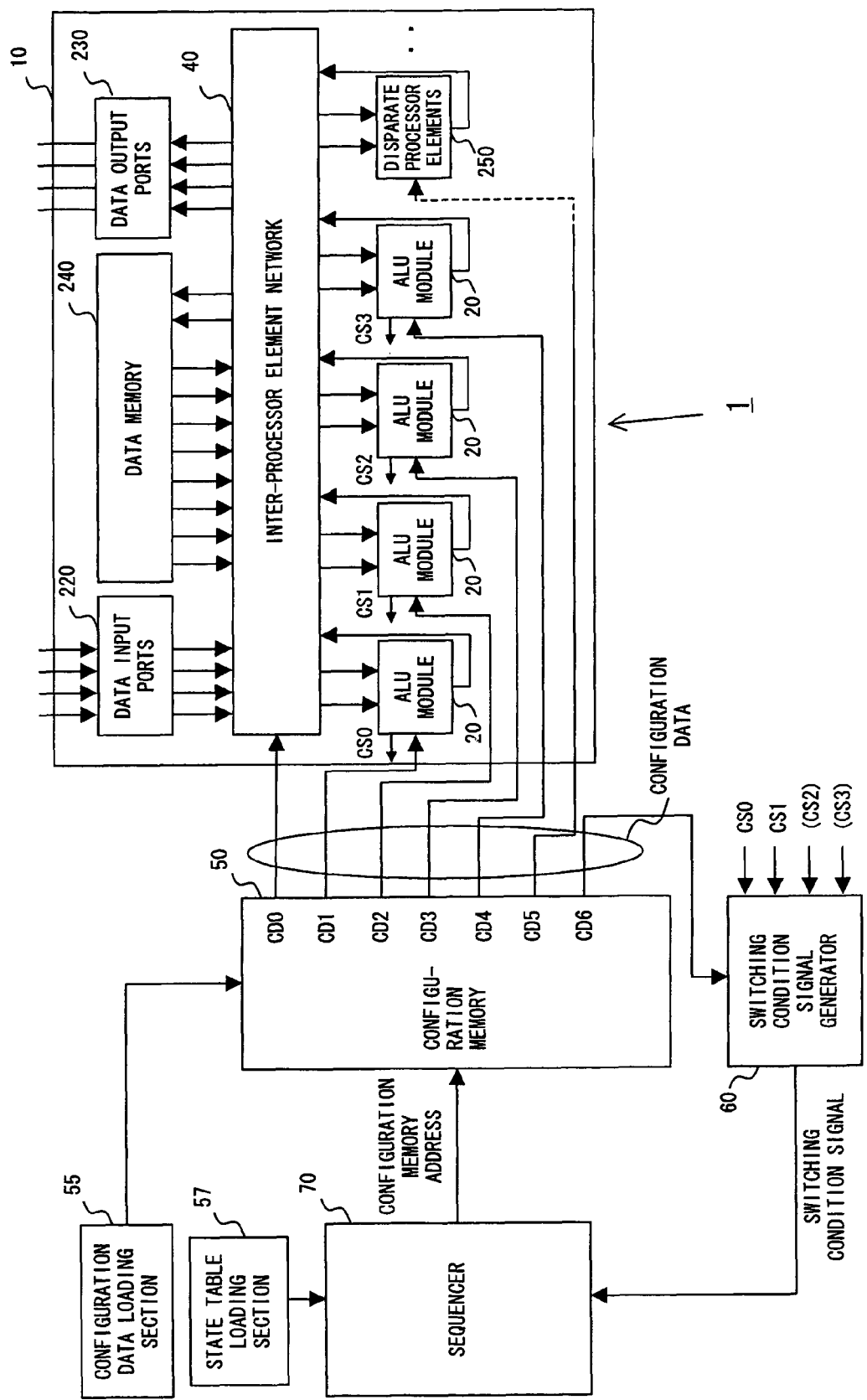
F I G. 7

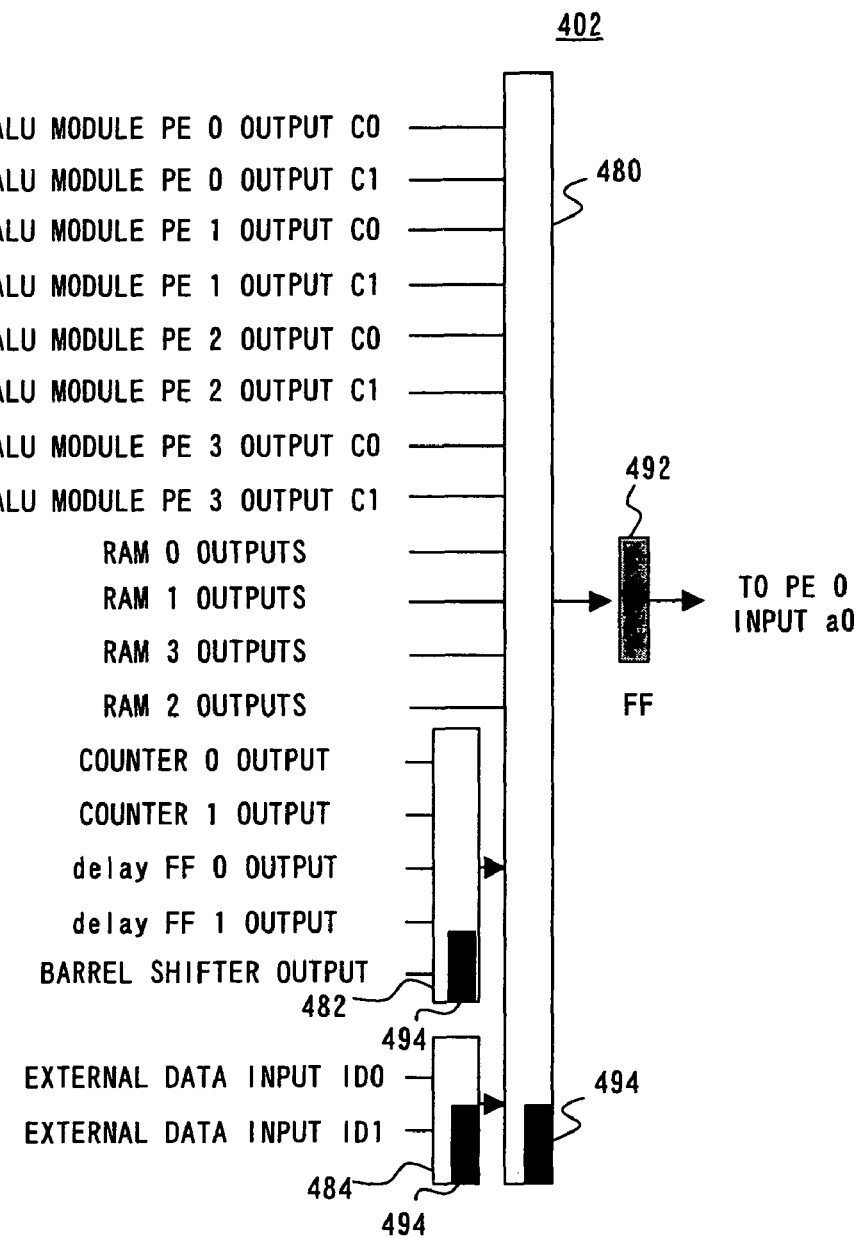
F I G. 1 0 A

SELECTOR FOR RAM 0 ADDRESS INPUT SECTION

SELECTOR FOR DATA OUTPUT

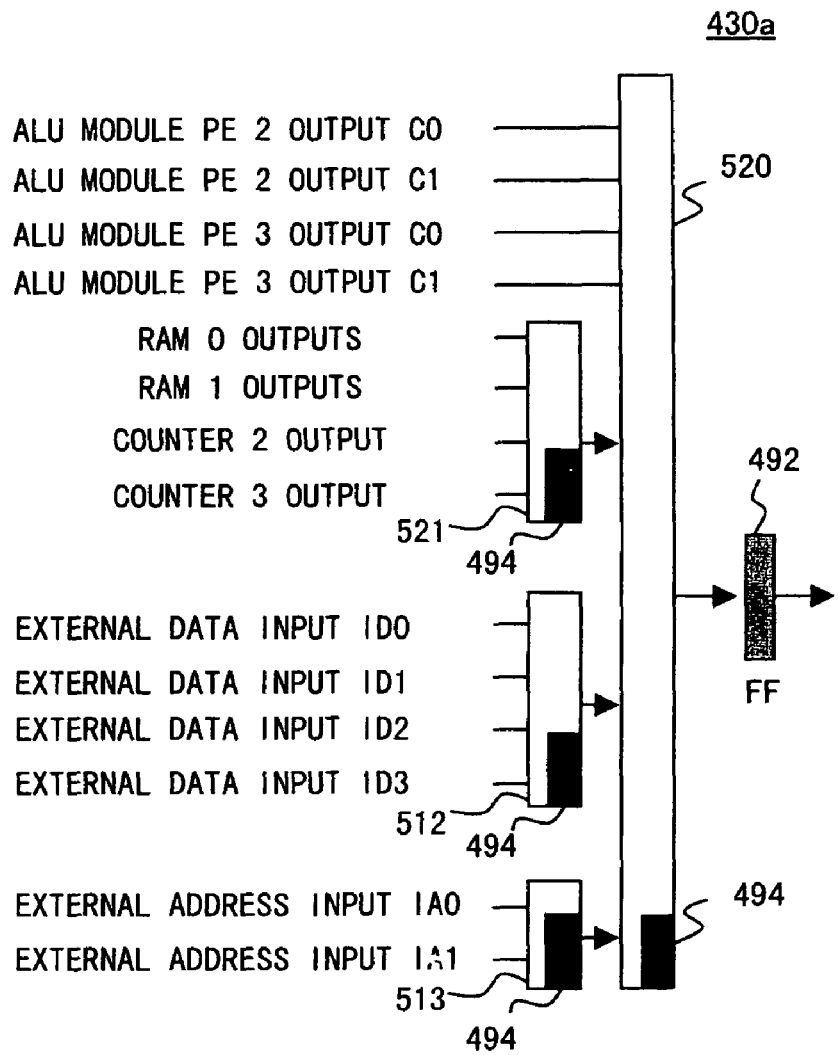
SELECTOR FOR delay FLIP-FLOP (VARIABLE DELAY)
DATA INPUT SECTION 1
F I G. 1 0 I

SELECTOR FOR COUNTER 0 INPUT SECTION

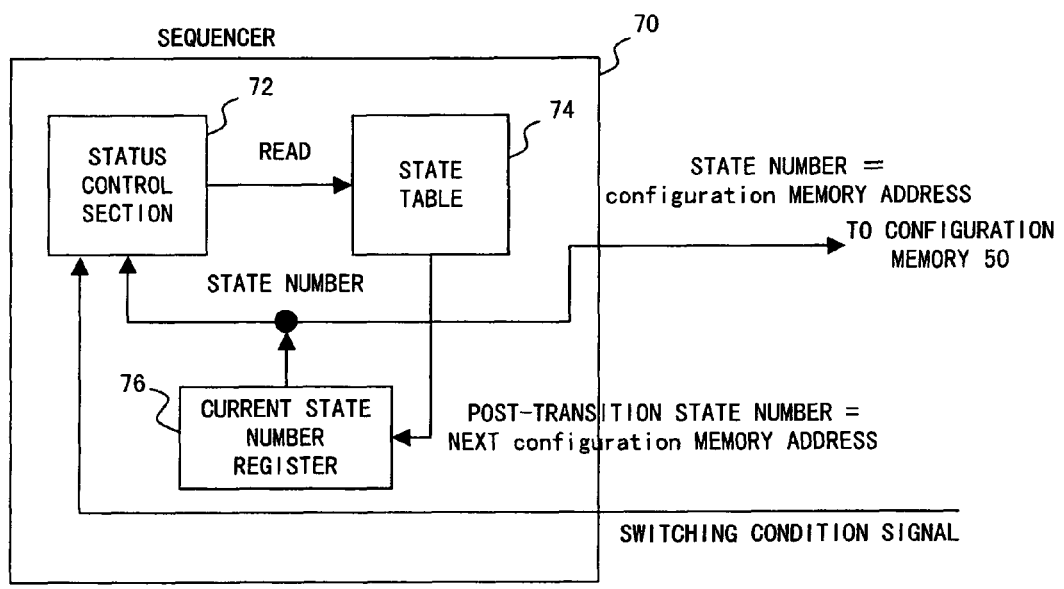
F I G. 1 1 A

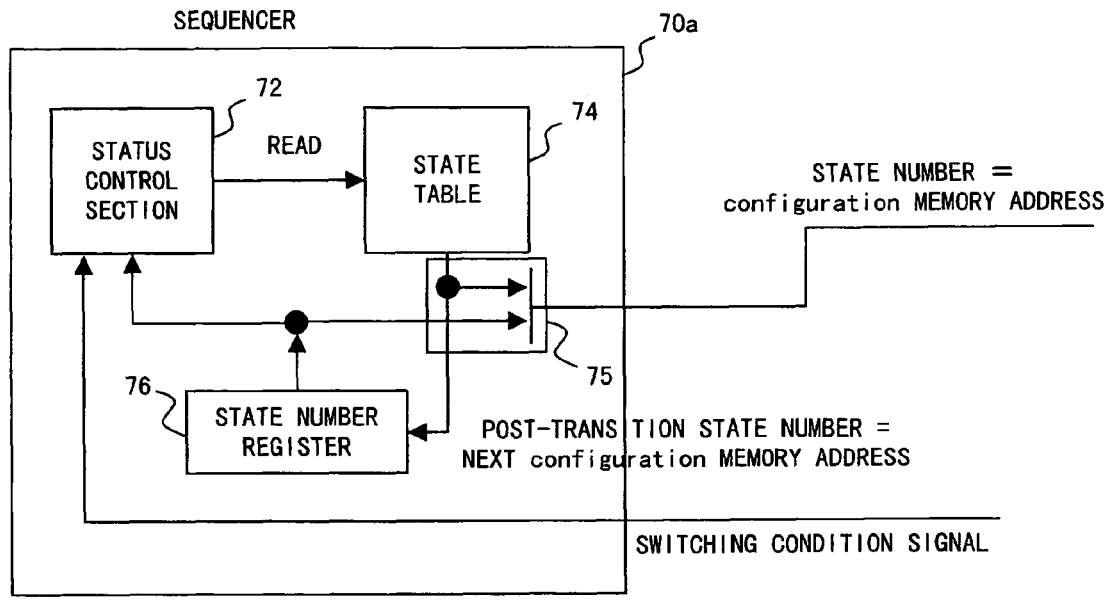
F I G. 1 1 B

EXAMPLE PROCESSING CYCLE (OF THE ABOVE)

| CYCLE 1 | CYCLE 2 | CYCLE 3 | CYCLE 4 |
|---------|---------|---------|---------|
| A=a+b   | D=A+B   | E=D+C   | RESULT OUTPUT |
| B=c-d   |         |         |         |
| C=e+f   |         |         |         |

F I G. 1 4 B

EXAMPLE PROCESSING CYCLE (OF THE ABOVE)

| CYCLE 1 | CYCLE 2 | CYCLE 3 | CYCLE 4 | CYCLE 5 | CYCLE 6 |
|---|---|---|---|---|---|
| aa[0]= D[0]+a[0] | B[0]= b[0]+aa[0] | D[1]= B[0]+cc[0] | | | |
| cc[0]= c[0]+d[0] | | RESULT OUTPUT B[0] | | | |
| | | | aa[1]= D[1]+a[1] | B[1]= b[1]+aa[1] | D[2]= B[1]+cc[1] |
| | | | cc[1]= c[1]+d[1] | | RESULT OUTPUT B[1] |

. . .

F I G. 1 6 B

```
for(i=0;j<5+i++) {
    A[i]=a1[i]+a2[i]; ...OPERATION (a)
    B[i]=b1[i]+b2[i]; ...OPERATION (b)
    C[i]=c1[i]*c2[i]; ...OPERATION (c)
    D[i]=d1[i]*d2[i]; ...OPERATION (d)
}
```

| 0 | 1 | 2 | 3 | 4 | 5 | 6 | 7 |   |
|---|---|---|---|---|---|---|---|---|
| R | N | a | W |   |   |   |   |   |
| R | N | b | W |   |   |   |   | i = 0 |
| R | N | c | W |   |   |   |   |   |
| R | N | d | W |   |   |   |   |   |
|   | R | N | a | W |   |   |   |   |
|   | R | N | b | W |   |   |   | i = 1 |
|   | R | N | c | W |   |   |   |   |
|   | R | N | d | W |   |   |   |   |
|   |   | R | N | a | W |   |   |   |
|   |   | R | N | b | W |   |   | i = 2 |
|   |   | R | N | c | W |   |   |   |
|   |   | R | N | d | W |   |   |   |
|   |   |   | R | N | a | W |   |   |
|   |   |   | R | N | b | W |   | i = 3 |
|   |   |   | R | N | c | W |   |   |
|   |   |   | R | N | d | W |   |   |
|   |   |   |   | R | N | a | W |   |
|   |   |   |   | R | N | b | W | i = 4 |
|   |   |   |   | R | N | c | W |   |
|   |   |   |   | R | N | d | W |   |

F I G. 1 8 B

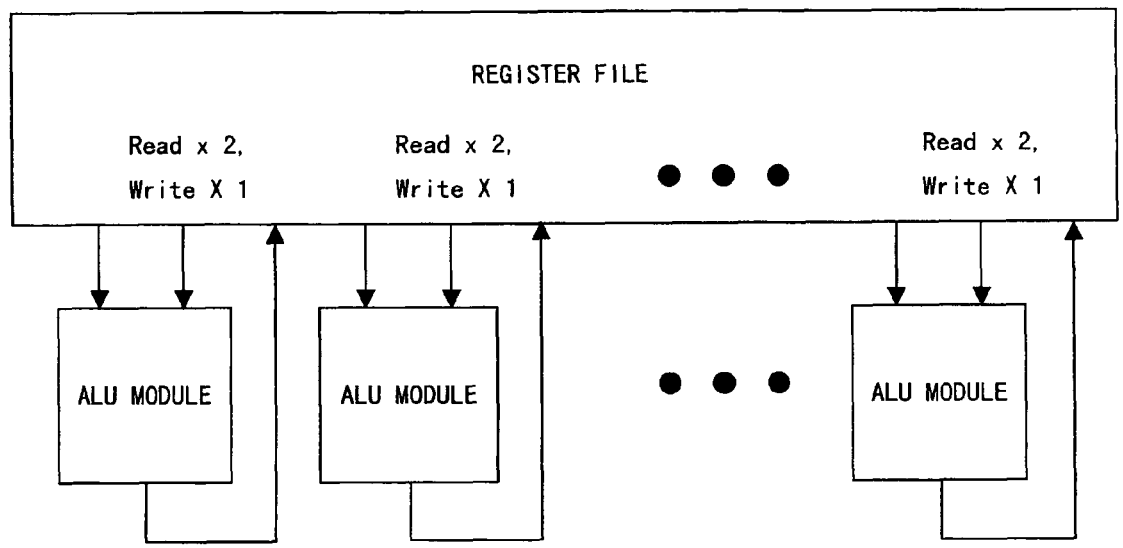
F I G. 2 0 A

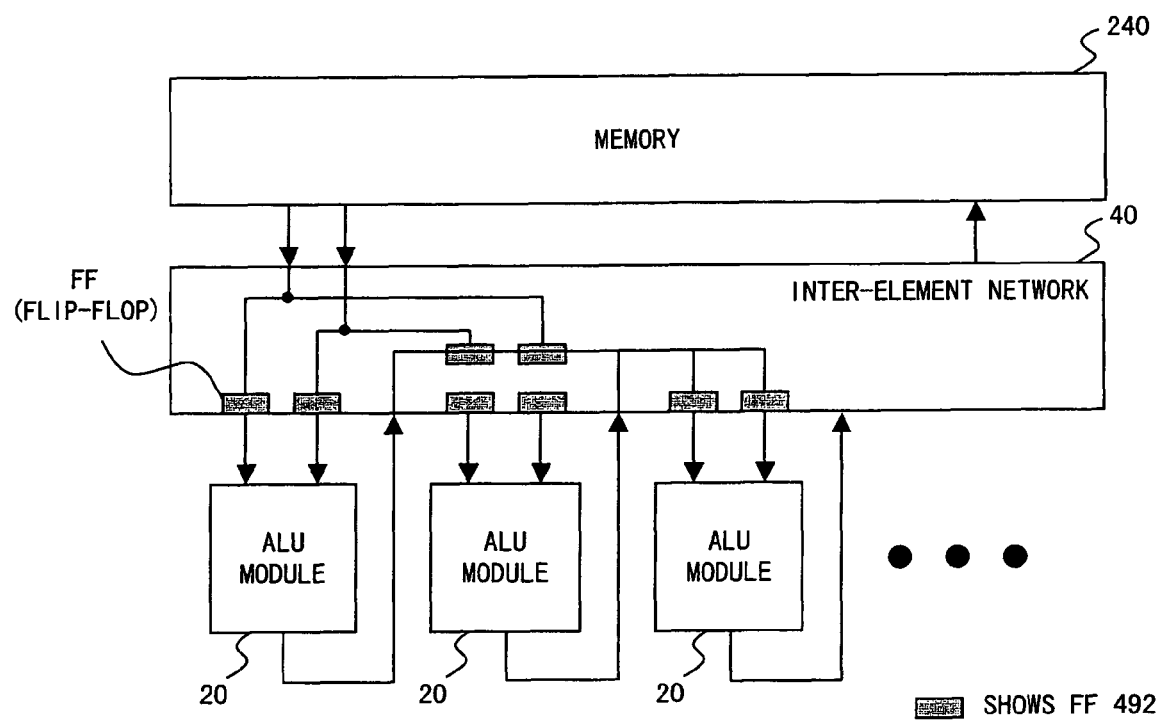
F I G. 2 0 B

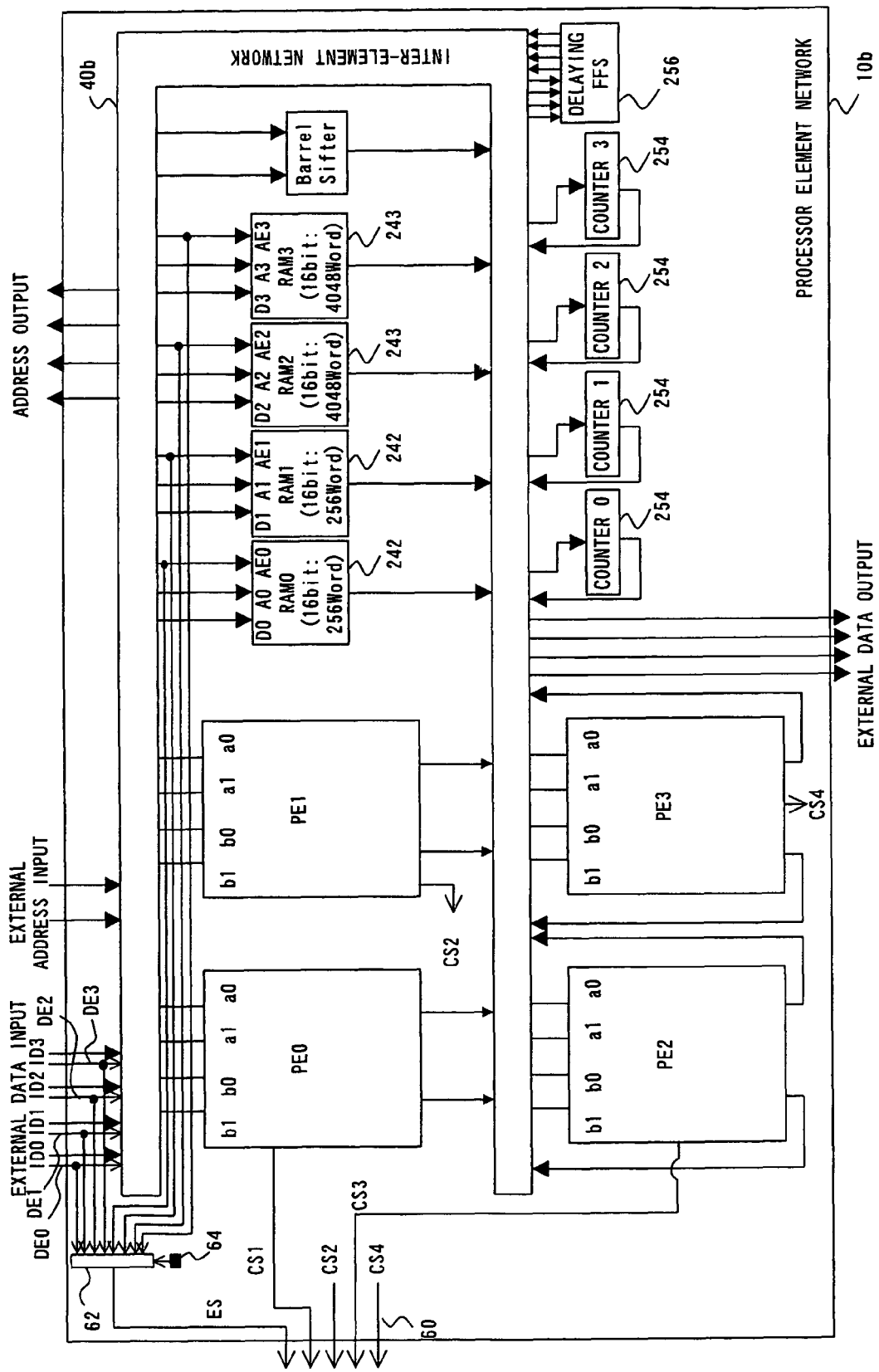
F I G. 21

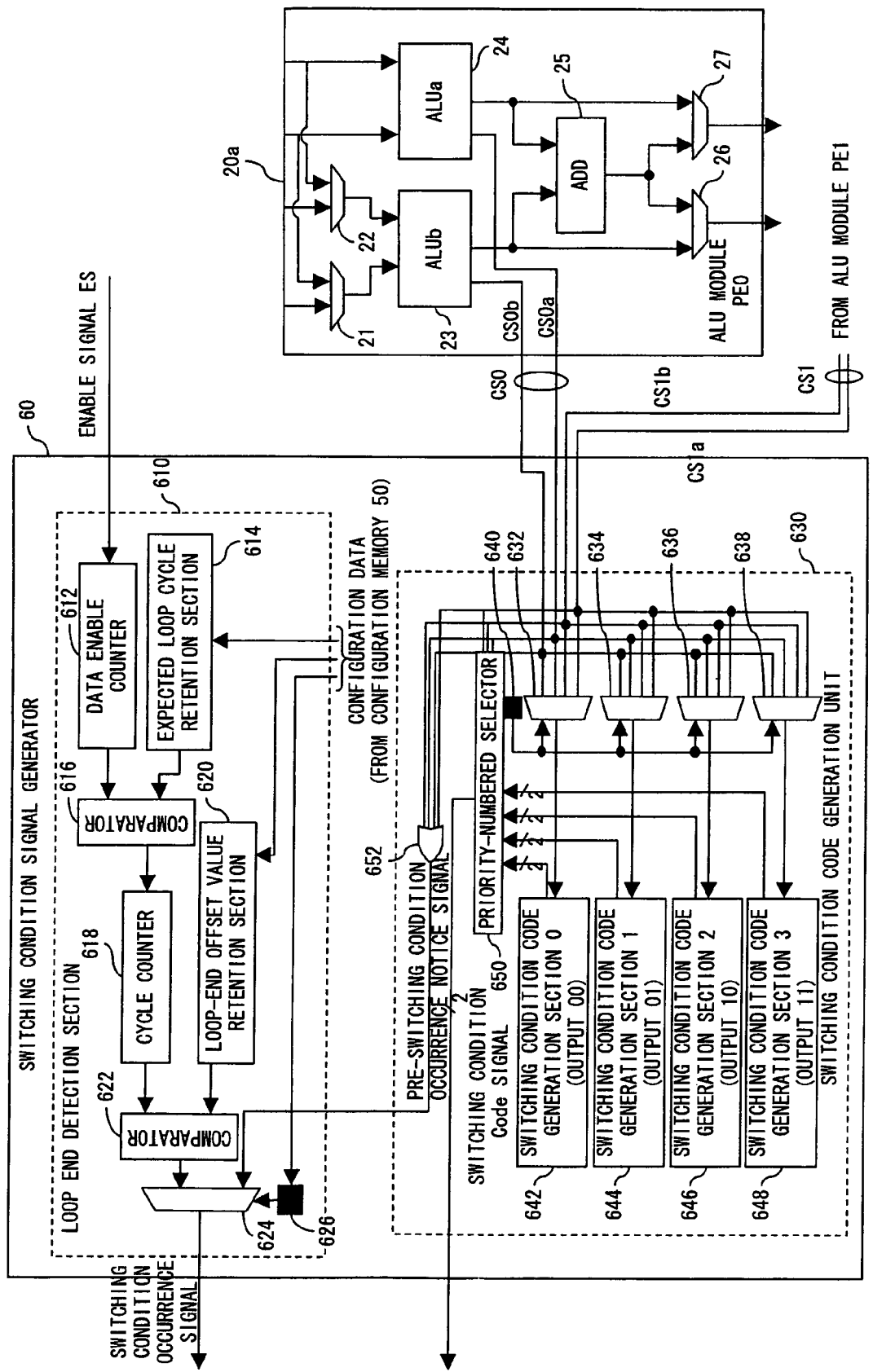
F I G. 22

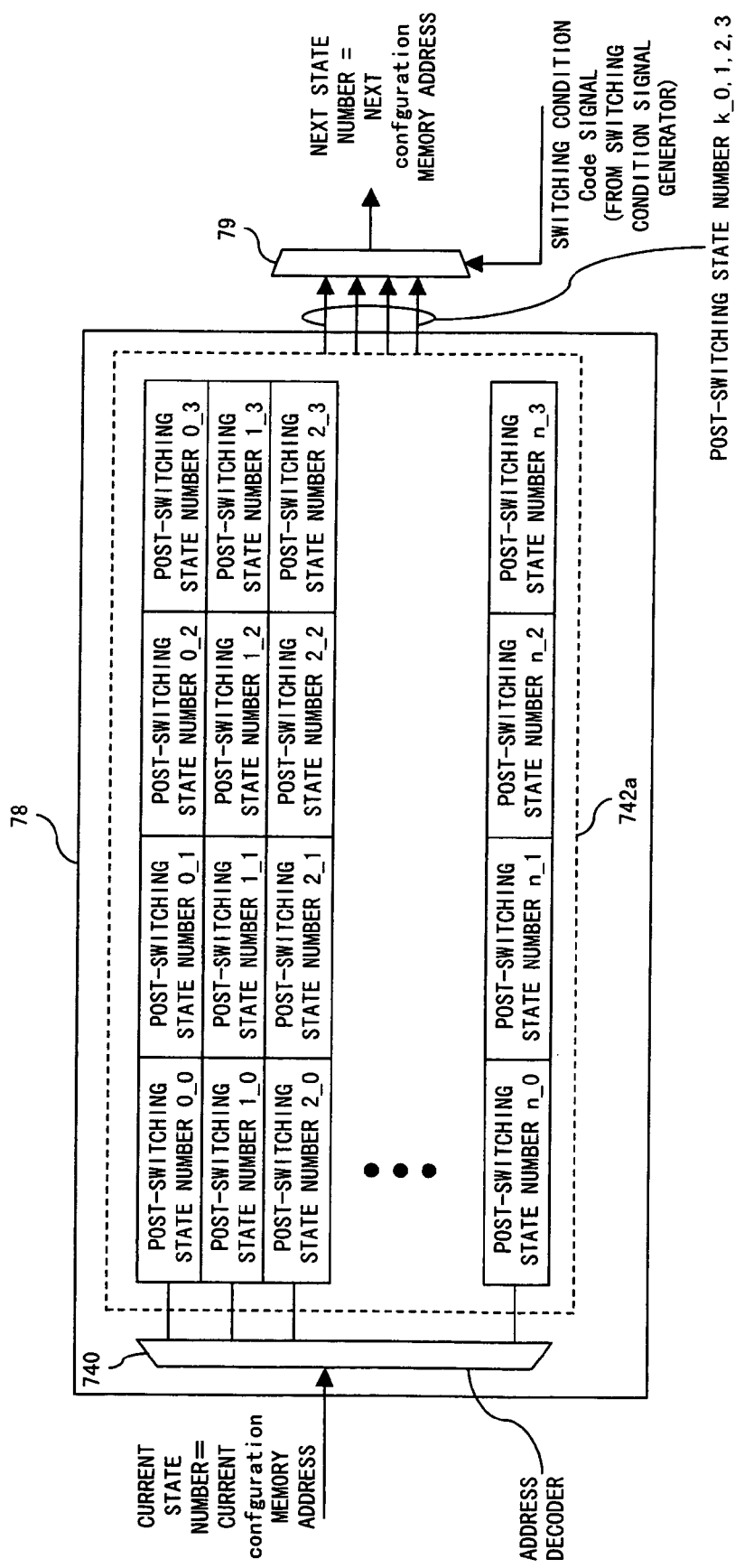
F I G. 24

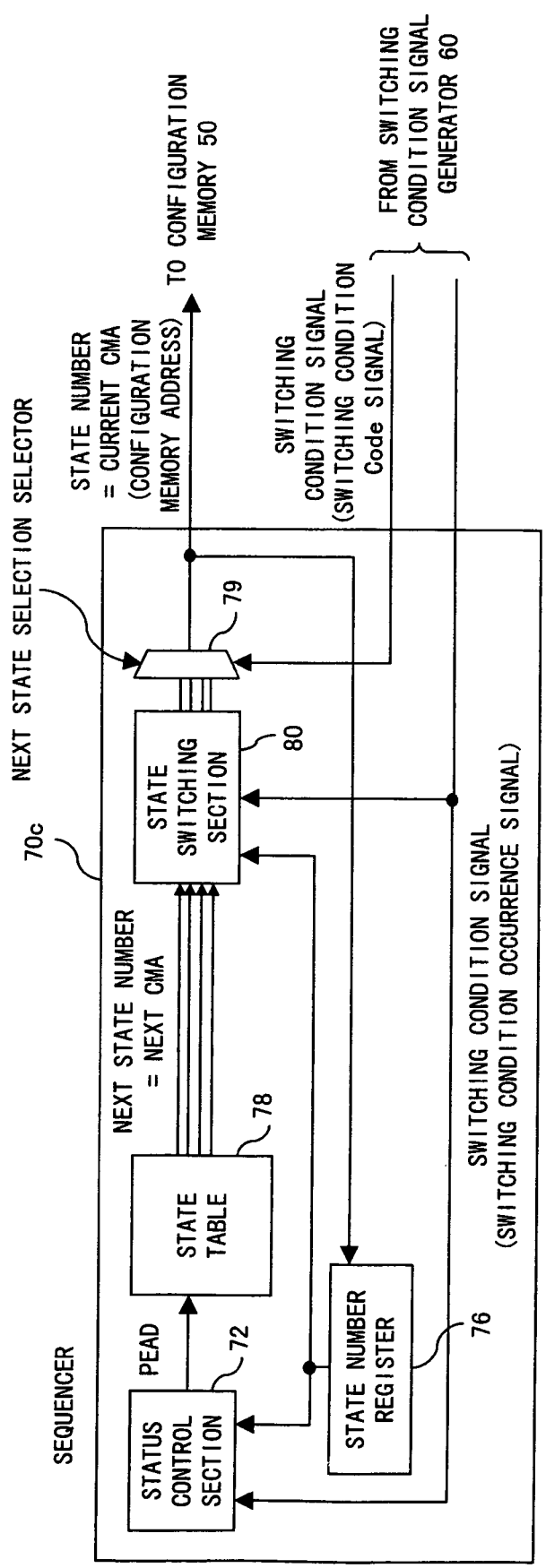
F I G. 25

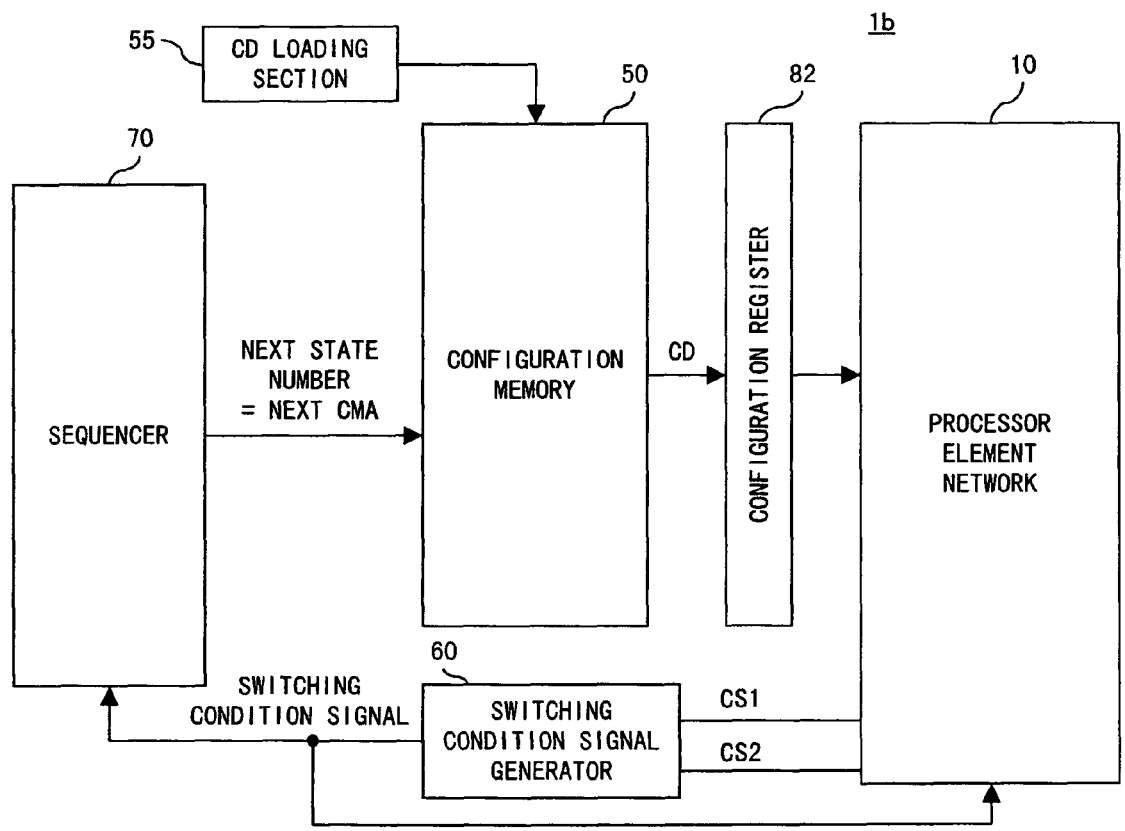
F I G. 27

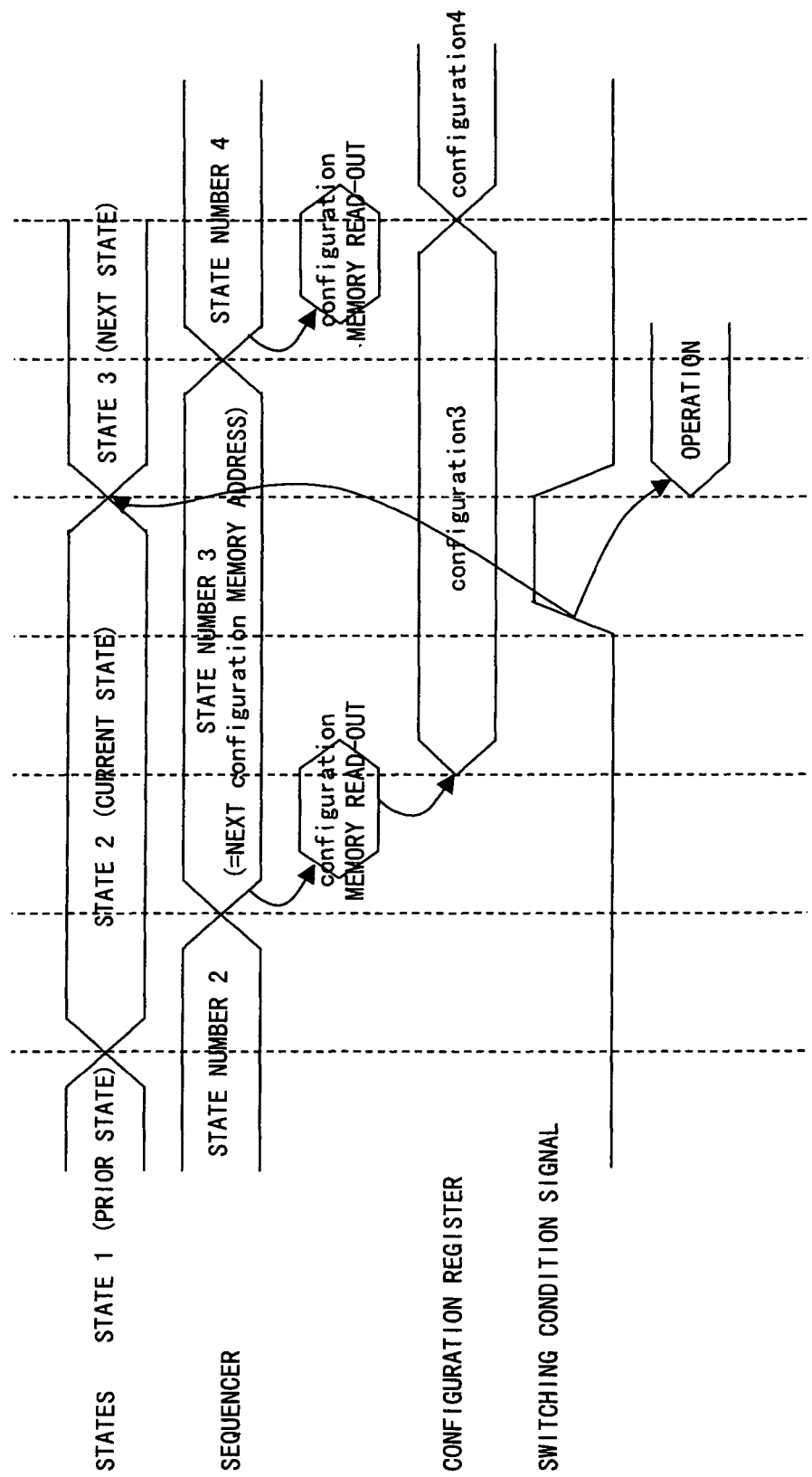
F I G. 28

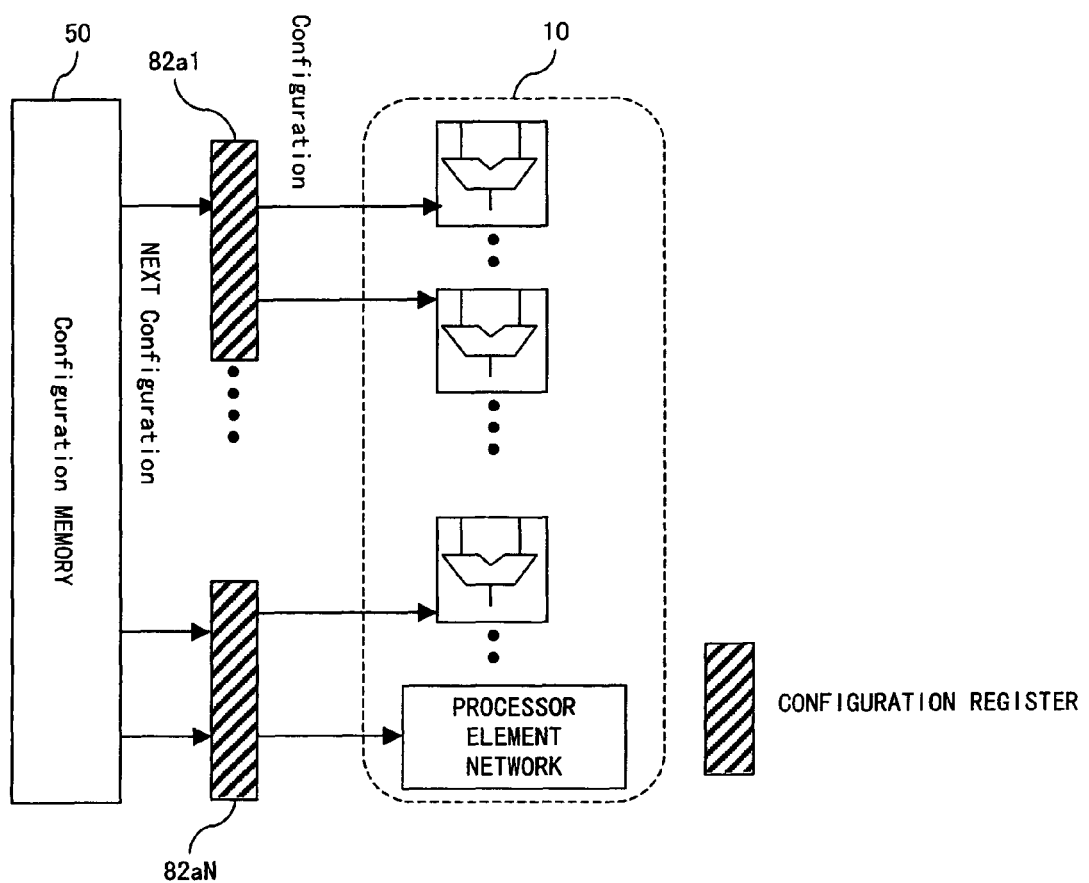
F I G. 29A

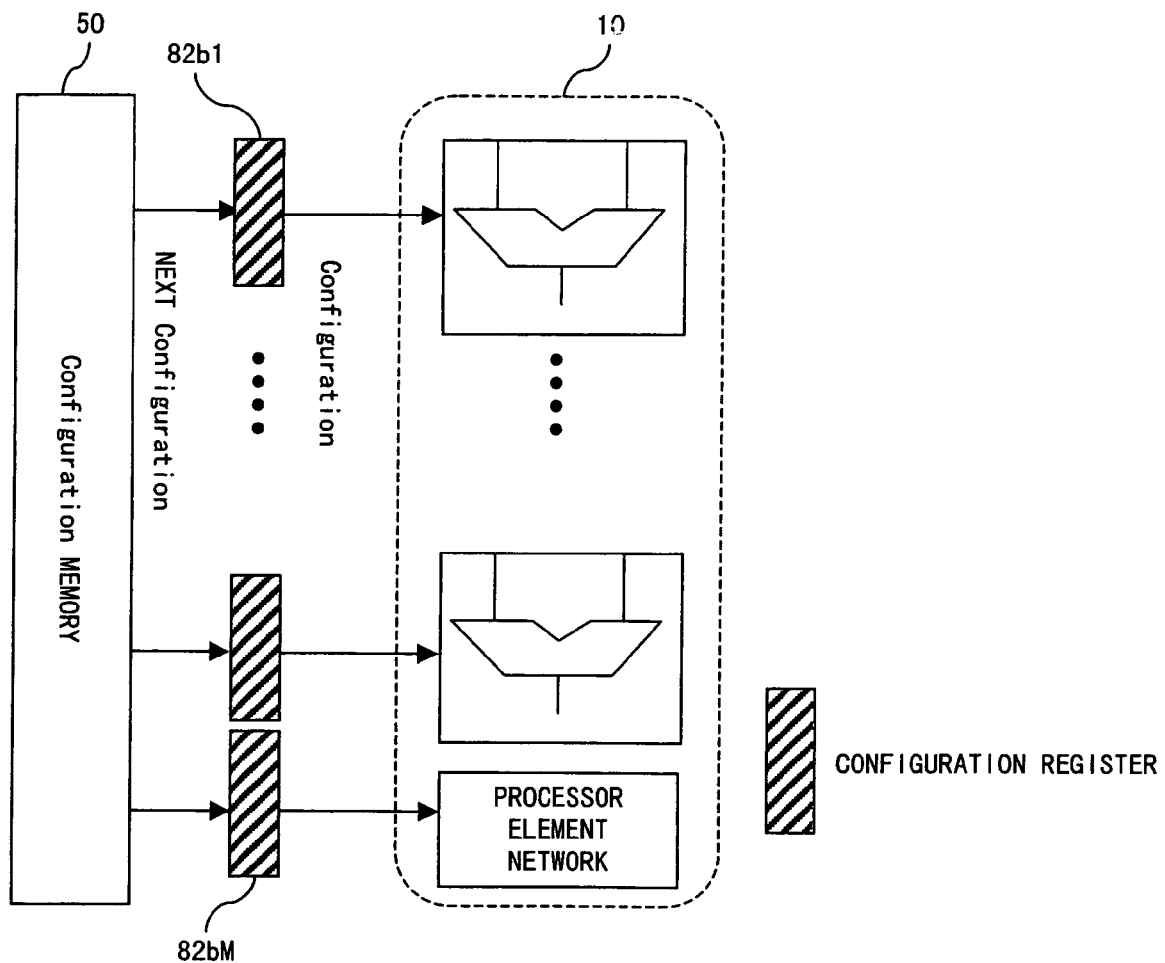
F I G. 29B

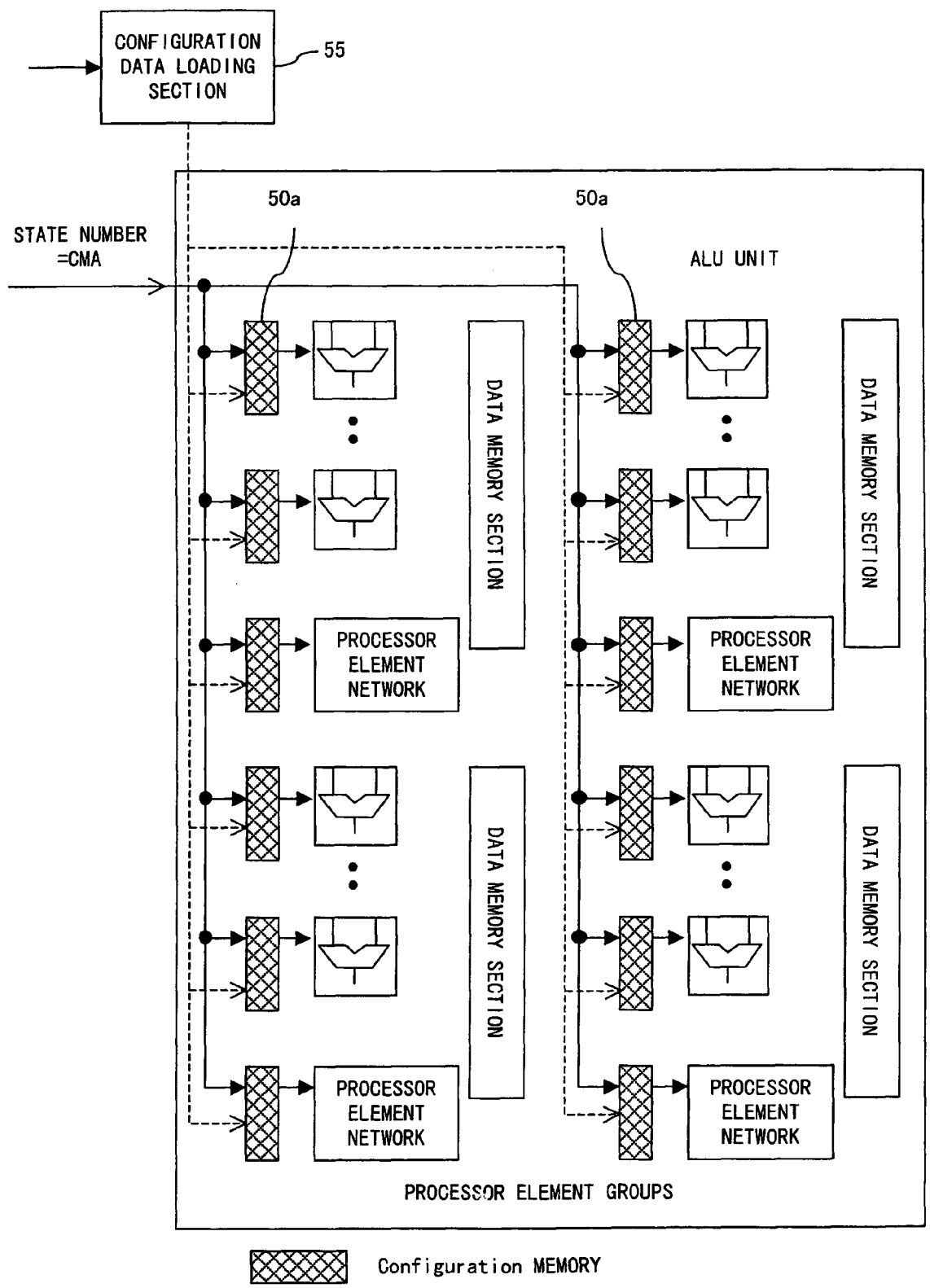
F I G. 30A

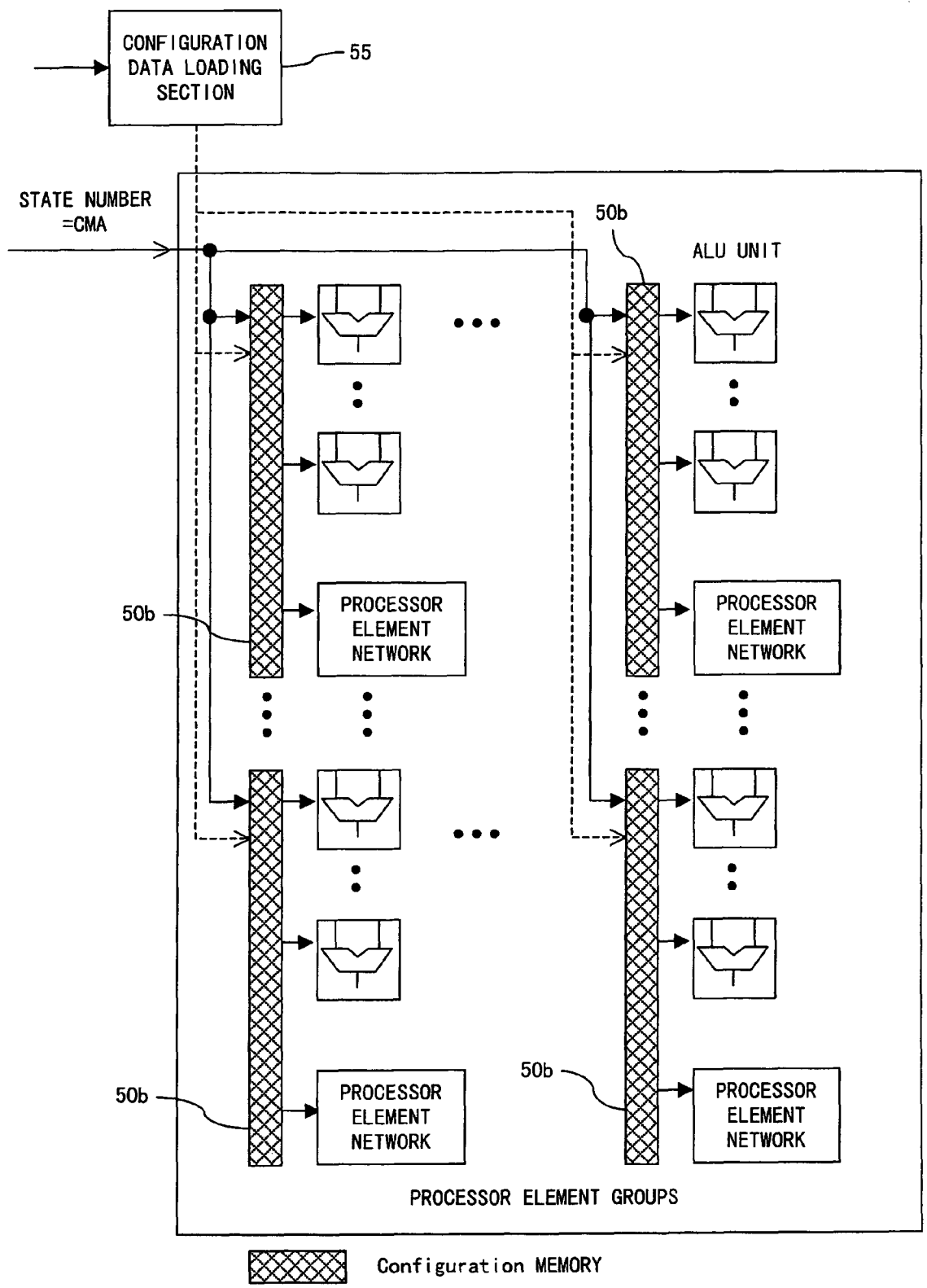
F I G. 30B

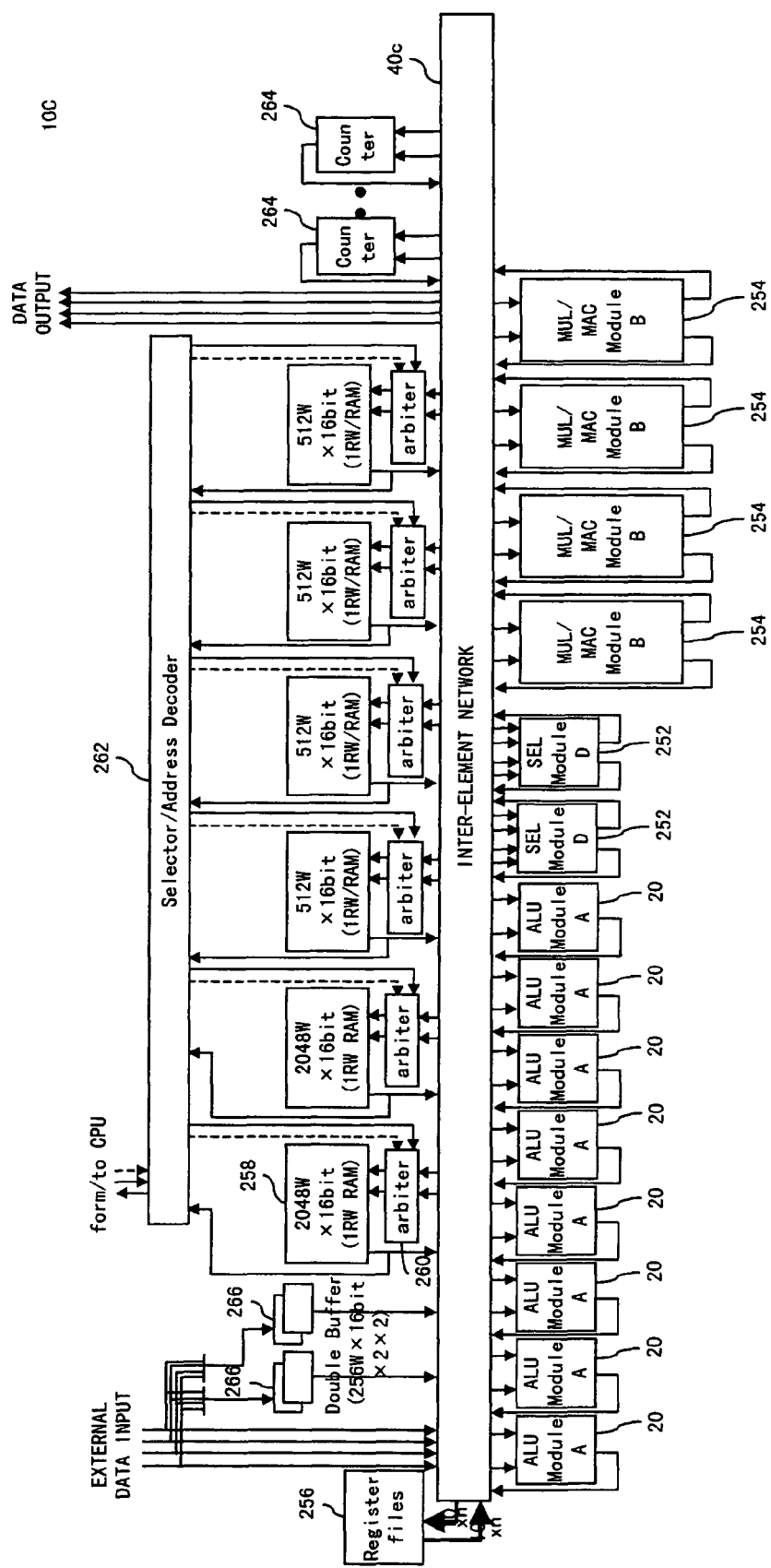
F I G. 3 2

ARRAY PROCESSOR HAVING RECONFIGURABLE DATA TRANSFER CAPABILITIES

CROSS-REFERENCE TO RELATED APPLICATIONS

This application is based upon and claims the benefit of priority from the prior Japanese Patent Application No. 2004-205332 filed on Jul. 12, 2004, the entire contents of which are incorporated herein by reference.

BACKGROUND OF THE INVENTION

1. Field of the Invention

The present invention relates to a dynamically reconfigurable operation apparatus capable of operating diverse processing by dynamically reconfiguring itself.

2. Description of the Related Art

A method for making a reconfigurable operation apparatus operate a plurality of tasks has conventionally been classified into two types: one, the space parallelism in which the circuit thereof is divided spatially and a task is allocated to each circuit; and two, the time parallelism in which the configuration is switched to a time sharing system for operating different tasks. The present invention relates to an operation apparatus, belonging to the latter type in the above classification, which enables a plurality of tasks in a time shared multi-access by changing over the configuration in synchronism with the machine clock, and a dynamic reconfiguration thereof.

An example for such operation apparatus is disclosed in a Japanese patent laid-open application publication No. 2001 312481. FIG. 1 is an illustration showing an example of a processor element array section of the array processor presented in the aforementioned publication. In FIG. 1, the processor element array (hereinafter called "PE array") section is comprised so that each processor element 990 is surrounded by eight of programmable switch elements 991. Between the adjacent programmable switch elements, and between the adjacent programmable switch elements 991 and the processor element 990 are, respectively, connected by data buses 992 electrically. Also, the programmable switch elements 991 and the processor element 990 are hard-wired with an operation control bus 993. One processor element 990 is connected with a plurality of the programmable switch elements 991, thereby gaining a higher freedom in connecting with the external data input and output thereof.

FIGS. 2A and 2B describe the problem of data transfer delay in the conventional PE array shown in FIG. 1. FIG. 2A shows the operations of processor elements engaged in the PE array processing, while FIG. 2B shows the way the operation progresses by each processing cycle. FIGS. 2A and 2B take example of operating an equation (a+b)+(c−d)+(e+f) while inputting data from the left part of the PE array. In FIG. 2A, when six values a, b, c, d, e and f are inputted, by two values at a time, into the three consecutive switch elements PE1, PE2 and PE3 on the left side, each processor element located on the right below of the each switch element inputted with data operates, respectively, the addition a+b (=A), the subtraction c−d (=B) and the addition e+f (=C) in the cycle 1. The switch element PE 4 operates the addition A+B (=D) in the cycle 2, and at the same time the data transfer 1 is performed for the value C. The data transfer 2 is performed for the value C in the cycle 3, the switch element PE 5 operates the addition D+C (=E) in the cycle 4, the data transfers 3 and 4 are performed for the operation result E in the cycles 5 and 6, respectively, and the operation result E is outputted in the cycle 7.

It is apparent from the above that the data transfer occurs in the cycle 3, causing a delayed processing, and the data transfers 3 and 4 occur in the cycles 5 and 6, respectively, causing another delayed processing in spite of a processing completion in the cycle 4, resulting in a delayed output of the operation result E.

That is, as observed in the Japanese patent laid-open application publication No. 2001 312481, the comprisal in which not only the processor elements but also switch elements used for data transfers between the processor elements can cause a high probability of a delayed processing associated with data transfers.

FIGS. 3A through 3D each shows a possibility of problem occurrence depending on the processing content caused by functional allocation to processor elements constituting the PE array in a conventional operation apparatus, by taking the operation of equation (a+b)*(c−d) as an example. FIGS. 3A and 3B show operations of the PE array for a processing and the operation in each process cycle for the same processing where no problem occurs, while FIGS. 3C and 3D show operations of the PE array for a processing and the operation in each process cycle for the same processing where a problem occurs. In the PE array shown by FIGS. 3A and 3C, arithmetic logical units (hereinafter called "ALU") and multipliers are assumed to be arrayed, respectively, as shown. The reason for defining the ALU and the multiplier differently is their complete physical differences.

In the case shown in FIG. 3A, since the ALUs and the multipliers are suitably arrayed for operating the equation (a+b)*(c−d), the operation is completed in 2 cycles and the above described data transfer in 3 cycles, and therefore the entire processing is finished in 6 cycles. Comparatively, in the case shown in FIG. 3C, since the ALUs and the multipliers are not suitably arrayed for computing the given equation, requiring 5 cycles for the operation itself because the input data −c and −d must be transferred to the processor elements used for computing, and 4 cycles are required to transfer data for the output because the processor element performing the processing is remotely located from the output switch element, thus resulting in taking a total of 10 cycles for the entire processing.

Allocation of processor elements in a PE array is established in the production thereof, which cannot be changed afterwards. Therefore, if a PE array is tried to be comprised by disparate ALU modules in a type of operation apparatus transferring data between adjacent switch elements, efficiencies of the processing will vary a great deal depending on the algorithm because it is impossible to pre-select a series of ALU modules suitable for arbitrary algorithms during the production stages according to the conventional techniques.

As such, it is difficult to use disparate operation elements for the PE array in constituting a PE array reconfigurable operation apparatus transferring data between operation elements by way of the two-dimensional array of switch elements.

FIGS. 4A and 4B also show the way a feed-back processing is done in the conventional operation apparatus, and let it assume the processing 1 is performed as follows.

```
D[0] = 1;
for (i=0; i<5; i++){
aa[i]=D[i]+a[i];
B[i]=b[i]+aa[i];
```

-continued

```
cc[i]=c[i]+d[i];
D[i+1]=B[i]-cc[i];
}            -- (Called processing 1)
```

For easy understanding, the vertical columns of the switch elements constituting the PE array are numbered sequentially, from the left to right, 0, 1, 2, . . . , M (with (M+1) being the number of columns), and the horizontal rows are numbered sequentially, from the top to downward, 0, 1, 2, . . . ,N (with (N+1) being the number of rows), and then the switch element-S located at the column-j and row-k is to be denoted as S (j, k). Also, the processor element located at the column-j and row-k (denoted as PE (j, k) supposedly) is to be accessible by switch elements S (j, k), S (j, k−1), S (j−1, k) and S (j−1, k−1), all of which are located adjacent to PE (j, k).

For performing the processing 1 above, the data b[0] is inputted from the switch element S (0, 0), the data D[0] and a[0] are inputted from S (0, 1), and the data d[0] and c[0] are inputted from S (0, 2). Now, in the cycle 1, the add operation aa[0] (=D[0]+a[0]) at the processor element PE (0, 1) is executed, followed by the add operation cc[0] (=c[0]+d[0]) at the processor element PE (1, 1), as shown in FIG. 4. Then in the cycle 2, the add operation B[0] (=b[0]+aa[0]) is executed at the processor element PE (1, 0). Then, in the cycle 3, the subtract operation D[0+1] (=B[0]−cc[0]) at the processor element PE (2, 1) and also the data transfer 1 for the value B[0] from the switch elements S (2, 1) to S (3, 1) are performed. Still in the cycle 3, subsequently, the data transfer 1 for the value B[0] from the switch elements S (3, 1) to S (4, 1) and at the same time the processing result D[1] at the processor element PE (2, 1) is fed back to the PE (0, 1). As such, a feedback cycle is required for a loop processing. While there is one feedback cycle for the example above, as the number of cycles prior to a loop-back increases, the distance for returning in a feedback becomes longer, and therefore a loss in the process efficiency will become worse accordingly.

As described, also the process control architecture closely affects the process efficiency of a PE array reconfigurable operation apparatus transferring data between processor elements by way of the two-dimensional array of switch elements, and therefore a further loss in the process efficiency can incur, depending on a loop processing.

There is a problem associated with time being taken in a reconfiguration of the ALU modules, which occurs in changing the processing content, at the detection of a conditional branching, et cetera. Therefore an accumulation of such switching time with the number of reconfiguration occurrence can possibly cause overall performance degradation.

Among the several methods disclosed in the Japanese patent laid-open application publication No. 2001-312481, there is one for shortening the switching time as shown in FIG. 5. The operation apparatus shown in FIG. 5 illustrates a part in which a reconfiguration is done for groups of ALU modules consisting of a plurality of the ALU module units 990a arranged in two dimensions. Each ALU module unit 990a consists of an ALU module 996, an instruction memory 994 storing a plurality of instructions issued to the ALU modules, and an instruction decoder 995 decoding a selected instruction. The part reconfiguring a group of the ALU modules consists of a state control manager 997, a state transition table 998 and a selector 999. The state transition table 998 is searched by a current state number, and a next state number and an instruction address common to all the ALU modules within the group of the ALU modules are selected. In each ALU module unit 990a, an instruction is read out from inside the instruction memory by an instruction address received from outside of the group of the ALU modules, the instruction is interpreted by the instruction decoder 995 and the processing content is established for the ALU module 996 so as to execute the instructed processing. FIG. 6 shows an operation timing of the operation apparatus shown in FIG. 5. In FIG. 6, the cycle defined as the "arithmetic and logical operations" actually includes an "instruction memory read-out," an "instruction decoding," and a genuine "operation" are performed. Note that FIG. 6 shows the case in which the current state number is used when the instruction address is issued. In the operation timing for "the case in which the next state number is used when the instruction is issued," although the timing itself for the instruction address issue can be advanced, the "instruction memory read-out," the "instruction decoding," and the genuine "operation" must be done because the arithmetic and logical operations are in the same timing in the above described Japanese patent laid-open application publication No. 2001-312481. Therefore, a delay between searching in the state transition table and the actual arithmetic and logical operation becomes problematic. Also the state transition table entries have both the next state numbers and instruction addresses. The state transition table is a memory whose size becomes larger with the number of entries, which in turn causes the problem of the area size becoming larger.

SUMMARY OF THE INVENTION

The purpose of the present invention is to solve the various problems as described in the related prior art.

Another purpose of the present invention is to provide a reconfigurable operation apparatus gaining uniform and good process efficiency independent of a process element allocation or process control architecture.

Yet another purpose of the present invention is to provide an operation apparatus capable of including optional disparate processor elements therein and of speedily reconfigurable thereof.

The present invention provides a reconfigurable operation apparatus for achieving the above purposes. A reconfigurable operation apparatus according to the present invention consists of a plurality of operation units capable of reconfiguring themselves by using a given first configuration data and of operating simultaneously with one another; at least one memory unit disposed freely for reading out thereof and writing therein; diverse processor elements required for constituting an operation apparatus; an inter-resource network connection unit enabling arbitrary output data from the plurality of operation units and the memory unit to make arbitrary input data for the plurality of operation units, performing data transfers between resources consisting of the plurality of operation units, the memory unit and the diverse processor elements in a uniform transfer time practically independent of positions and kinds of the resources, and being capable of reconfiguring itself by using a given second configuration data; a storage unit storing the first and second configuration data; a loading unit loading the configuration data from an external storage apparatus to the storage unit; and a supply unit supplying the first and second configuration data to the reconfigurable units in a suitable sequence and timing based on data obtained from the plurality of operation units.

Meanwhile, another aspect of the present invention is to provide an operation apparatus consisting of a plurality of ALU modules capable of operating simultaneously with one another, a sequencer controlling states of the plurality of the ALU modules, and a configuration memory storing a configuration as setting data for each of the ALU modules. An operation apparatus according to the present invention has a connection unit making outputs from arbitrary ALU modules among the plurality of the ALU modules the inputs to the other plurality of the ALU modules.

A reconfigurable operation apparatus according to the present invention provides a uniform, high processing efficiency independent of an allocation of processor elements or of control architecture.

Also according to the present invention, it is possible to include diverse processor elements and accomplish a speedy reconfiguration.

BRIEF DESCRIPTION OF THE DRAWINGS

The present invention will be more apparent from the following descriptions when the accompanying drawings are referenced.

FIG. 3B shows a possibility of problem occurrence depending on a processing content caused by a functional allocation to processor elements constituting the PE array, indicating the operation of PE array shown in FIG. 1 and that of each cycle where no problem occurs;

FIG. 3C shows a possibility of problem occurrence depending on a processing content caused by a functional allocation to processor elements constituting the PE array, indicating the operation of PE array shown in FIG. 1 and that of each cycle where a problem occurs;

FIG. 3D shows a possibility of problem occurrence depending on a processing content caused by a functional allocation to processor elements constituting the PE array, indicating the operation of PE array shown in FIG. 1 and that of each cycle where a problem occurs;

FIG. 5 illustrates a conventional reconfigurable array processor;

FIG. 7 is a summary conceptual block diagram of a reconfigurable operation apparatus according to the present invention;

FIG. 8A is a block diagram of overall architecture of the processor element network 10, and the subset FIG. 8B is a conceptual basic architecture of the selector 41 constituting the processor element network 10;

FIG. 10A shows an embodiment of a series of selectors constituting the inter-processor element network 40a shown in FIG. 9, and a setup of the selectors for the input a0 in the ALU module PE 0 (20);

FIG. 10I shows an embodiment of a series of selectors constituting the inter-processor element network 40a shown in FIG. 9, and a setup of the selectors for the external data input sections of FF 0 and FF 1 in the delaying FF cluster 256;

FIG. 11A is a summary conceptual block diagram of the first embodiment of the sequencer shown in FIG. 7;

FIG. 11B is a summary conceptual block diagram of the second embodiment of the sequencer shown in FIG. 7;

FIG. 14B shows a way a conventional problem "processing cycle delay associated with data transfer" is overcome according to the present invention, and a table showing a processing cycle in the aforementioned configuration;

FIG. 16B shows a table of processing cycle for the configuration shown in FIG. 16A;

FIG. 18B shows a table of processing cycle for the configuration shown in FIG. 18A;

FIG. 20A illustrates a comparison of scalability between a conventional RISC (reduced instruction set computer) processor (shown in FIG. 20A) and the operation apparatus 1 (shown in FIG. 20B) according to the present invention;

FIG. 20B illustrates a comparison of scalability between a conventional RISC (reduced instruction set computer) processor (FIG. 20A) and the operation apparatus 1 (FIG. 20B) according to the present invention;

FIG. 21 is a summary conceptual block diagram of the processor element network 10b according to a preferred embodiment of the present invention;

FIG. 22 shows a block diagram of an embodiment of the switching condition signal generator 60 shown in FIG. 21;

FIG. 24 shows an embodiment of the state table 78 for the sequencer 70b shown in FIG. 23;

FIG. 25 is a summary block diagram showing an embodiment of sequencer performing a look-ahead of the state table 78;

FIG. 27 is a summary block diagram showing an embodiment of an operation apparatus equipped with a configuration register;

FIG. 28 is a processing status chart showing an operation timing of the operation apparatus 1c shown in FIG. 27;

FIG. 29A is a summary block diagram showing a variation of embodiment of an operation apparatus equipped with a configuration register, and illustrates an example of setting up the configuration register for each cluster of the processor elements;

FIG. 29B is a summary block diagram showing a variation of embodiment of an operation apparatus equipped with a configuration register, and illustrates an example of setting up the configuration register for each of the processor elements;

FIG. 30A is a summary block diagram showing an example comprisal with a configuration memory disposed for each processor element;

FIG. 30B is a summary block diagram showing an example comprisal with a configuration memory disposed for each cluster of the processor element network which is divided into clusters;

FIG. 32 is a summary block diagram showing an example comprisal of a processor element network according to another embodiment.

DESCRIPTION OF THE PREFERRED EMBODIMENTS

Figure 1:
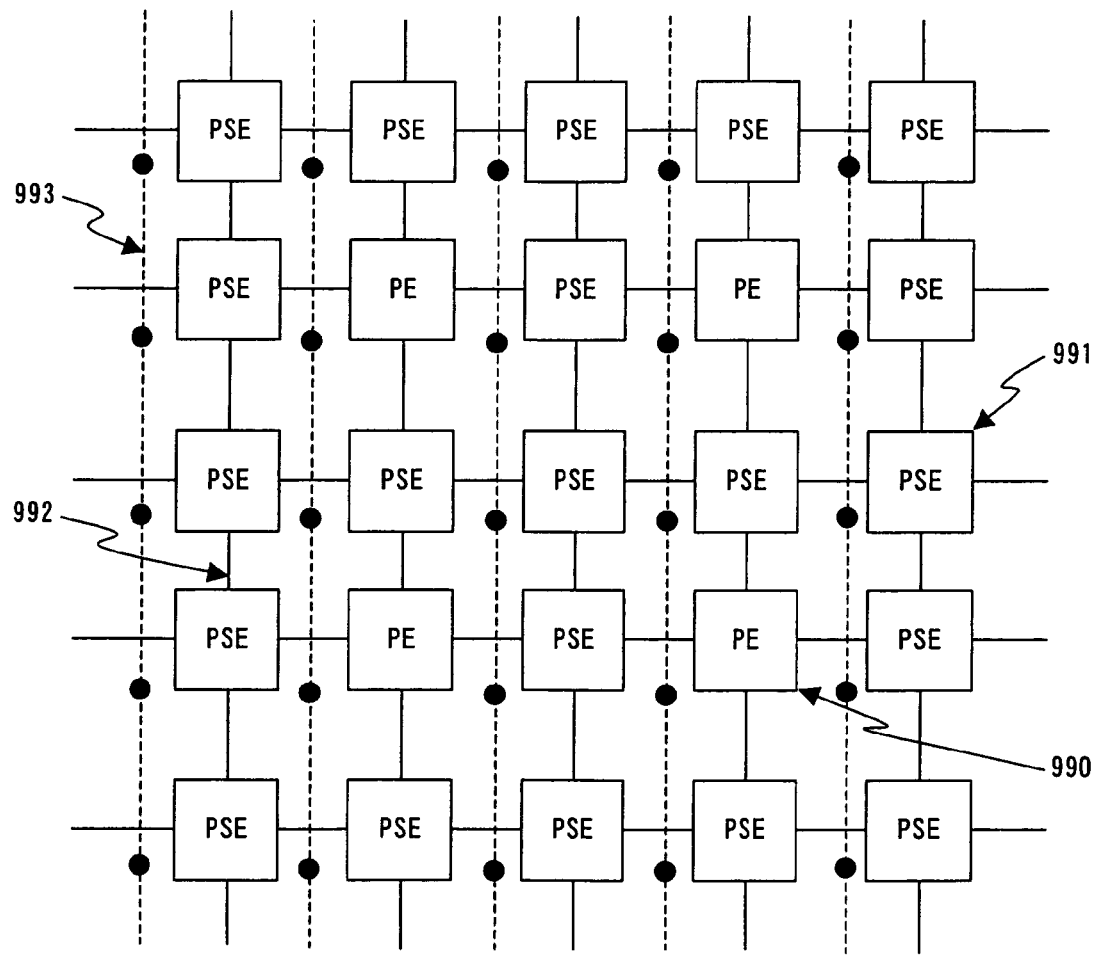
FIG. 1 illustrates an example of a processor element (PE) array of an array processor according to the Japanese patent laid-open application publication No. 2001-312481.

The present invention is described in detail by using the preferred embodiments according to the present invention and the accompanying Figures as follows. Note that the same reference number is assigned for the same element shown in a plurality of drawings herein.

Embodiments

FIG. 7 is a summary conceptual block diagram of a reconfigurable operation apparatus according to the present invention.

In FIG. 7, the reconfigurable operation apparatus 1 is equipped with a processor element network 10 in which diverse processor elements are interconnected by an inter-processor element network 40. The diverse processor elements interconnected by the inter-processor element network 40 include a plurality (four in the example shown in FIG. 7) of ALU modules 20, a data memory 240, a data input port 220, a data output port 230, various processor elements 250, et cetera, for example. Not only the ALU module 20 but also the other diverse processor elements can be set up so as to perform a function related to a configuration data supplied from the outside. Furthermore, the inter-processor element network 40 also enables data transfers among the diverse processor elements interconnected by the inter-processor element network 40 corresponding to a configuration data supplied from the outside.

Note that FIG. 7 shows only four of the ALU modules for simplicity, but tens or more thereof can be included of course. The number of other elements or signals are the same in this context.

The reconfigurable operation apparatus 1 is further equipped with a configuration memory 50 storing configuration data CD 0 through CD 6 corresponding to diverse reconfigurable elements in the processor element network 10; a configuration data loading section (CD loading section) 55 loading a configuration data (CD) from an external storage (not shown) to the configuration memory 50; a switching condition signal generator 60 receiving the condition forming signals CS 1, CS 2, et cetera, sent primarily from the ALU modules among the diverse reconfigurable elements constituting the processor element network 10, generating and sending out a switching condition signal based on the aforementioned signals; and a sequencer 70 supplying an address for subsequently reading out of the configuration memory 50 based on a switching condition signal sent by the switching condition signal generator 60. The condition forming signal, which is described later in detail, is a signal outputted when the results of comparison operation by each ALU (arithmetic logical unit) included in an ALU module 20 become identical, and is used at least for generating a switching condition signal which indicates a switching timing of a configuration. Note that the reconfigurable operation apparatus 1 further is desirably equipped with a state table loading section 57 for supplying a state table from a not-shown external storage apparatus to the sequencer 70.

<Inter-Element Network Assuring a Uniformity of Data Transfers>

Figure 8:
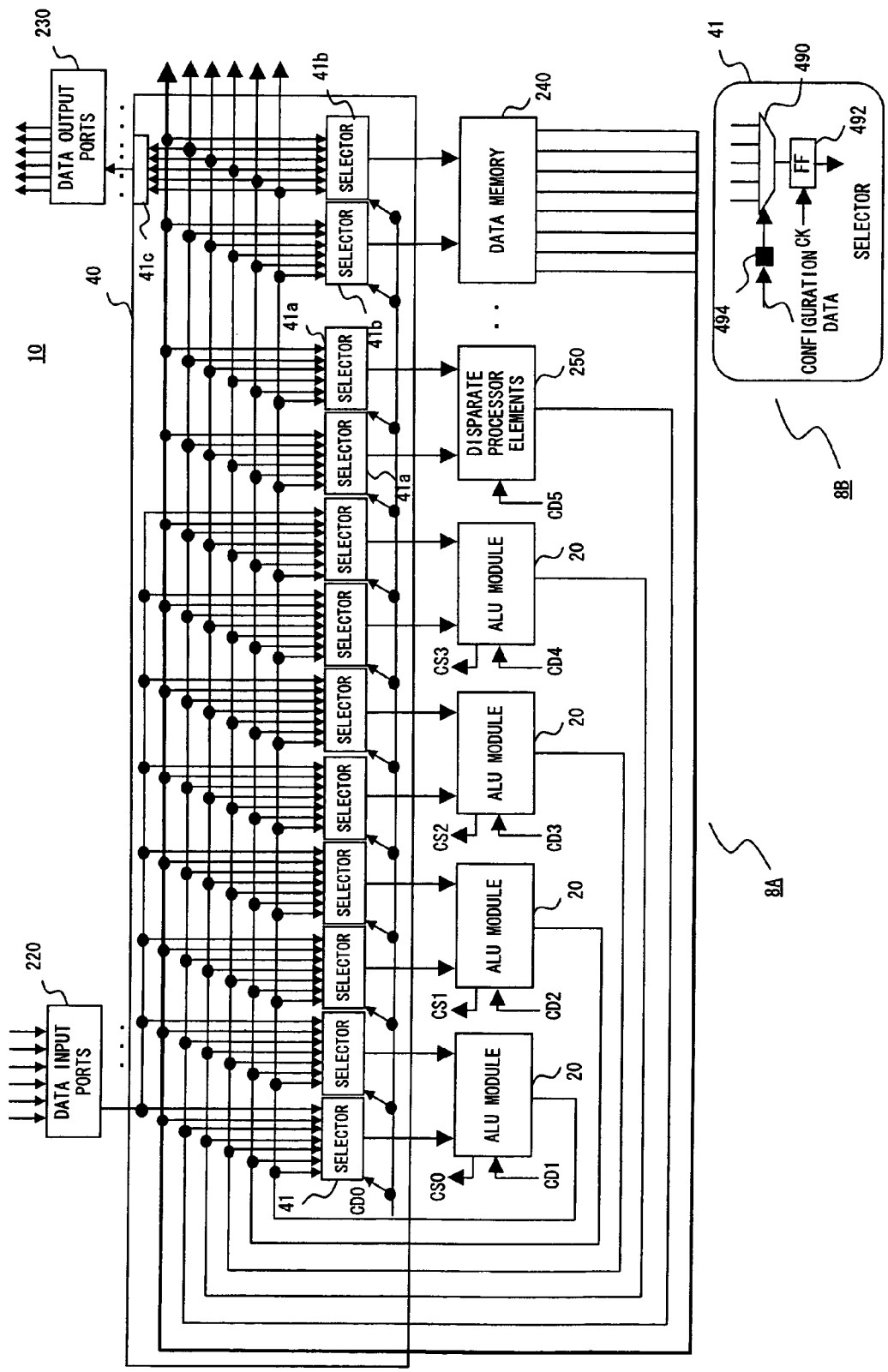
FIG. 8 shows architecture of the processor element network 10 shown in FIG. 7, in which the subset

FIG. 8 is a summary conceptual block diagram showing a comprisal of the processor element network 10 shown in FIG. 7, in which the subset FIG. 8A shows a block diagram of the overall processor element network 10, and the subset FIG. 8B shows a circuit illustrating a conceptual basic comprisal of the selector 41 constituting the processor element network 10. In the subset FIG. 8A, when the input terminals of the processor elements (i.e., ALU modules 20, a data output port 230, a data memory 240 and diverse processor elements 250 in the example of the subset FIG. 8A) connected to the inter-element network 40 and the inter-element network 40 are connected, the inter-element network 40 sends out data by way of selectors 41, 41*a* and 41*b* (note when these selectors need not be classified, they are simply denoted by "selector 41" collectively). For instance, the input to each ALU module is supplied through the selector 41 in which all the output lines of all the ALU modules 20, the data input port 220, the diverse processor elements 250, and the data memory 240 are treated as the input thereto. Likewise, the inter-element network 40 sends out data to the diverse processor element 250 through the selector 41*a*, to the data memory 240 through the selector 41*b*, and to the data output port 230 through the selector 41*c*.

While it is ideal to connect all the outputs of all the processor elements connected to the inter-element network 40 with the input terminal of each selector 41 for an improved flexibility in the reconfiguration, it is difficult to accomplish such a scheme if the number of processing prime becomes large. However, it is desirable for instance to connect at least the outputs of all the ALU modules 20 and the data memory 240 with the input terminals of the selectors 41 corresponding to the input of each ALU module 20. It is practical to determine what kind of processor elements and their output terminals to be connected with selectors 41 corresponding to the inputs to the other processor elements in consideration of the system use and the necessity or possibility of connection between the processor elements.

As such, the processor elements 20, 220, 230, 240 and 250 connected with the inter-element network 40 are inter-connected with one another through a singular selector 41 in a high degree of freedom according to the present invention. Therefore, there is no change in data transfer speed between processor elements due to locations thereof as seen in an array operation apparatus in which the switch elements and processor elements are arrayed in two dimensions. Data transfers are performed in the same time (i.e., 1 clock as described later) between any processor elements. This will then enable a design to include disparate processor elements, a substantially improved flexibility of the system and a wide variety of use.

As shown in the subset FIG. 2B of FIG. 8, each selector 41 consists of a single selector element or a combination of selector elements (simply called "selector") 490, a latching flip flop (herein after called "FF") 492 connected with the output terminal of the selector 490, and a memory section 494 mounted in, or connected with, the selector 490 and retaining a data (i.e., a part of a configuration data) indicating as to which one of the inputs connected with the selector is to be outputted. A configuration data CD 0 supplied from the configuration memory 50 is loaded onto the memory section 494 of the selector 41 constituting the inter-element network 40, and each selector selects one of the inputs thereto for an output therefrom based on the data memorized in the memory section 494 thereof.

A clock signal CK is supplied to the latching FF 492 of the selector 41, and the output from the selector 490 is retained and outputted in synchronism with the clock CK. As such, since the selectors 41 constituting the inter-element network 40 establishes the output in synchronism with the same clock CK, synchronized data transfers are performed for the processor elements connected through the inter-element network 40, and therefore the aforementioned processor elements as a whole forms a pipeline according to the present invention.

As described above, the inter-element network according to the present invention assures uniform data transfers enabling them within one clock regardless of the locations of the processor elements therein.

Figure 9:
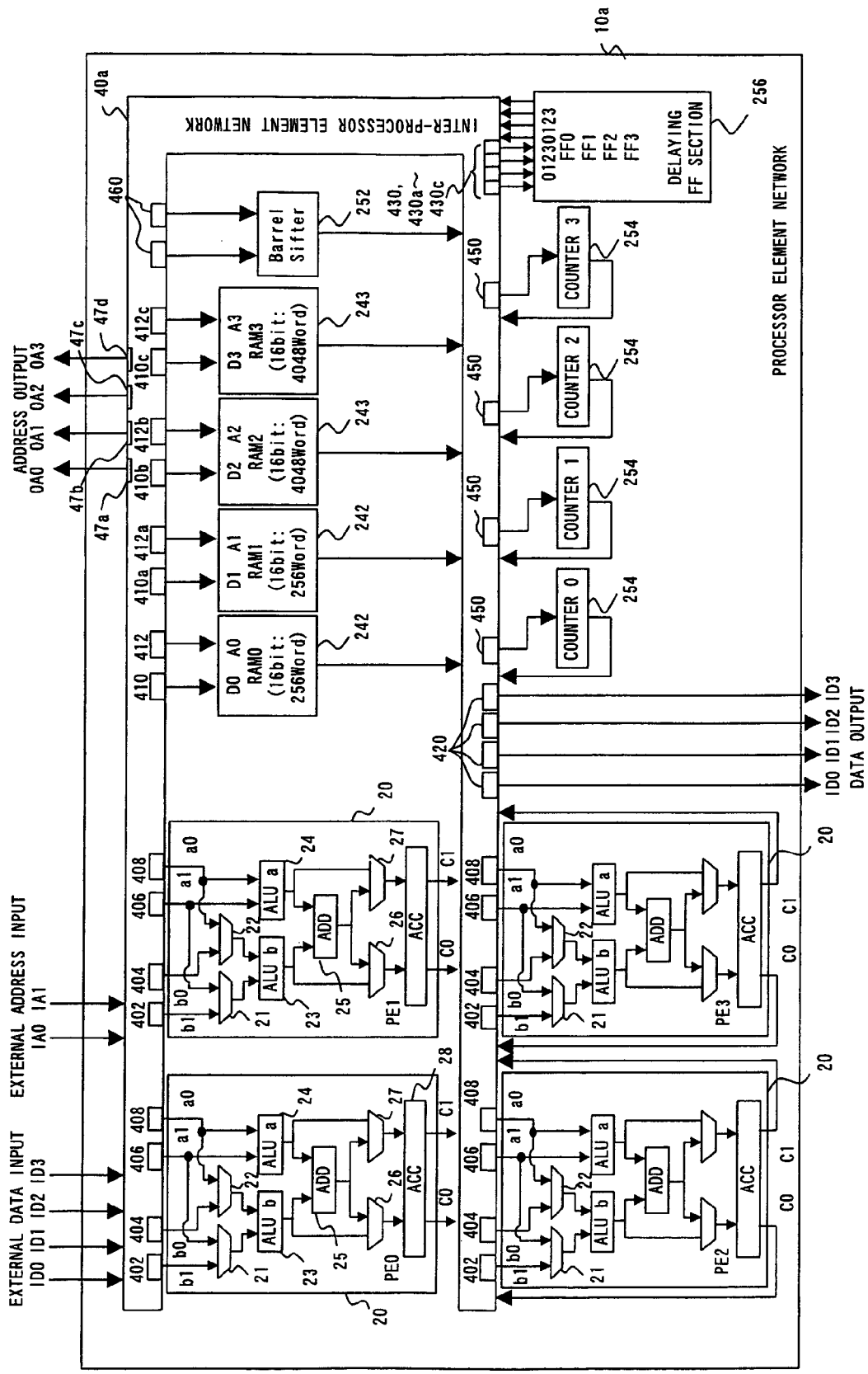
FIG. 9 is a block diagram of an embodiment of the processor element network 10 shown in FIG. 7.

FIG. 9 is a block diagram of an embodiment of the processor element network 10*a* shown in FIG. 7. In FIG. 9, the processor element network 10*a* is equipped with the inter-element network 40 which is connected by four of ALU modules 20, two of 256-word RAMs (random access memory) 242, two of 4048-word RAMs 243, a barrel shifter 252, four of counters 254 and a delaying FF section 256. The processor element network 10*a* is also connected by external data input lines ID 0, ID 1, ID 2, ID 4, et cetera, and external address input lines IA 0, IA 1, et cetera.

Each ALU module 20 consists of series-a input terminals a0 and a1, and series-b input terminals b0 and b1, a selector 22 connected with the input terminals a0 and b0 as the inputs thereto, a selector 21 connected with the input terminals a1 and b1 as the inputs thereto, an ALU a 24 connected with the input terminals a0 and b0 as the inputs thereto, an ALU b 23 connected with the outputs of the selectors 21 and 22 as the inputs thereto, an adder (ADD) 25 connected with the outputs of the ALU a 24 and the ALU b 23 as the inputs thereto, a selector 26 connected with the outputs of the ALU b 23 and the adder 25 as the input thereto, a selector 27 connected with the outputs from the ALU a 24 and the adder 25 as the inputs thereto, and an accumulator (ACC) 28 connected with the outputs of the selectors 26 and 27 as the input thereto. Note that the accumulator (ACC) 28 is an optional element and therefore it is omissible.

FIGS. 10A through 10L show embodiments of a series of selectors constituting the inter-process element network 40*a* shown in FIG. 9. In FIGS. 10A through 10L, those delineated by a solid black rectangle in a corner of each of the selectors denote the above described configuration memory section 494. The data lengths in the configuration memory section 494 vary from one bit for two inputs, two bits for four inputs, three bits for eight inputs, four bits for sixteen inputs, et cetera, corresponding to the number of inputs in the selector. Meanwhile, all the selector circuits 402, 404, 406, 408, 410, 420, 430, 430*a*, 450, 460 and 47*a* have the above mentioned latching FF 492 at the output stage thereof.

Figure 10B:
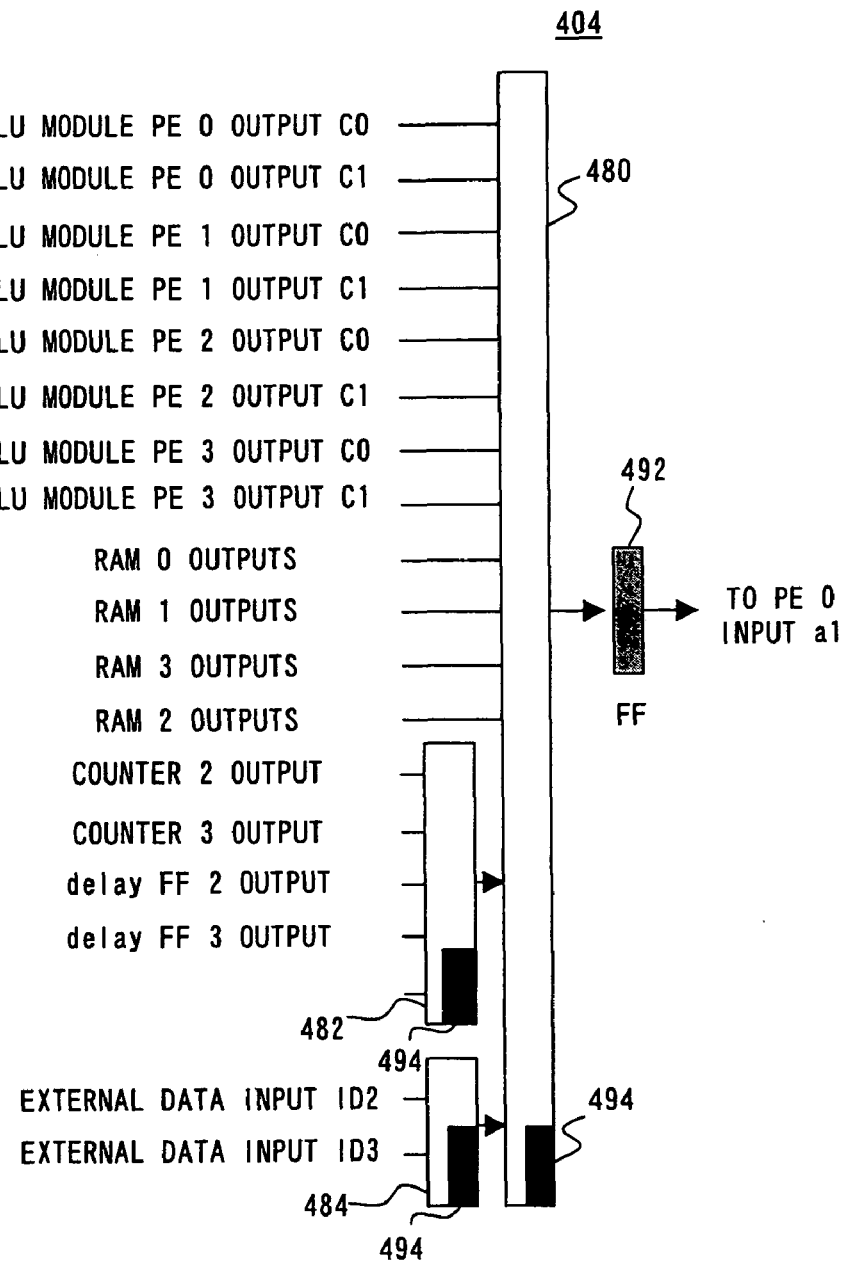
FIG. 10B shows an embodiment of a series of selectors constituting the inter-processor element network 40a shown in FIG. 9, and a setup of the selectors for the input a1 in the ALU module PE 0 (20)
Figure 10C:
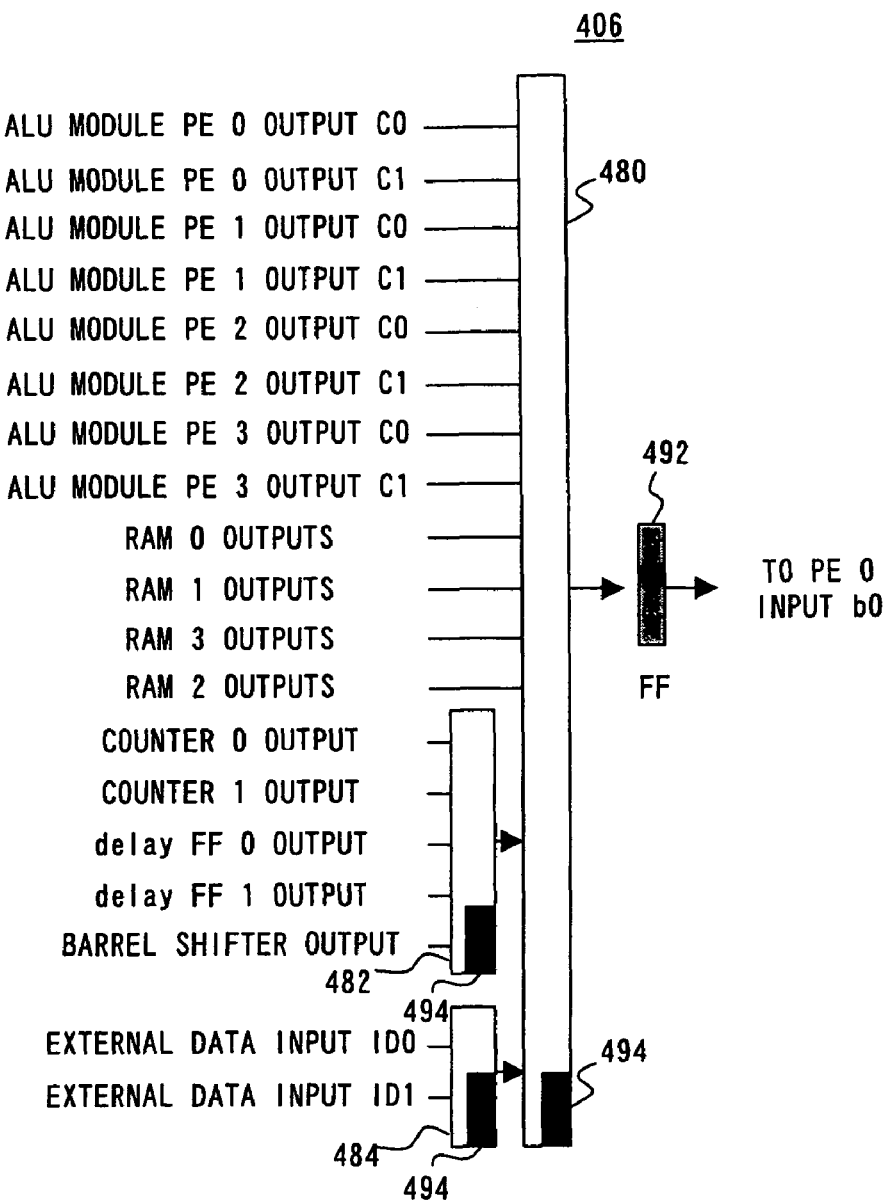
FIG. 10C shows an embodiment of a series of selectors constituting the inter-processor element network 40a shown in FIG. 9, and a setup of the selectors for the input b0 in the ALU module PE 0 (20)

FIGS. 10A through 10D show the selector circuits for the inputs a0, a1, b0 and b1, respectively, of the ALU module PE 0 (20). The selector circuits 402 through 408 shown in FIGS. 10A through 10D, respectively, are of the same structure. The selector circuits 402 and 404 consist of two (or more) of the input selectors 484, five (or more) of the input selectors 482 and fourteen (or more) of the input selectors 480. The input terminals of the selector 484 are connected with the external data inputs ID 0 and ID 1, the input terminals of the selector 482 are connected by the outputs of the counters 0 and 1, the outputs of the delaying FF 0 and FF 1, and the output of the barrel shifter 252. The input terminals of the selector 480 are connected by the outputs of the selectors 482 and 484, and in addition, by the outputs C 0 and C 1 of each of four ALU modules PE 0 through PE 3, and by all the output of RAMs 0 through 3. Therefore, the input terminals a0 and b0 of the ALU module PE 0 can be connected by all outputs from all processor elements except for the counters 2 and 3, FF 2 and FF 3 of the delaying FF section 256, and external data inputs ID 2 or later. Note that the selector circuit 406 shown in FIG. 10C is the same as the selector circuit 402 shown in FIG. 10A, except that the external data input ID 3 in place of ID 1 is inputted to the selector 484 in the former circuit.

In FIG. 10B, the selector circuit 404 is the same as the selector circuit 402 except that the inputs to the selector 484 are the external data inputs ID 2 and ID 3, and the inputs to the selector 482 are the outputs of the counters 2 and 3, and the outputs of the delaying FF 2 and FF 3 in the selector circuit 404. Therefore, all the outputs of all the processor elements, except for the counters 0 and 1, the FF 0 and FF 1 of the delaying FF sections 256, and the external data inputs ID 0 and ID 1, can be connected to the input terminal al of the ALU module PE 0.

Figure 10D:
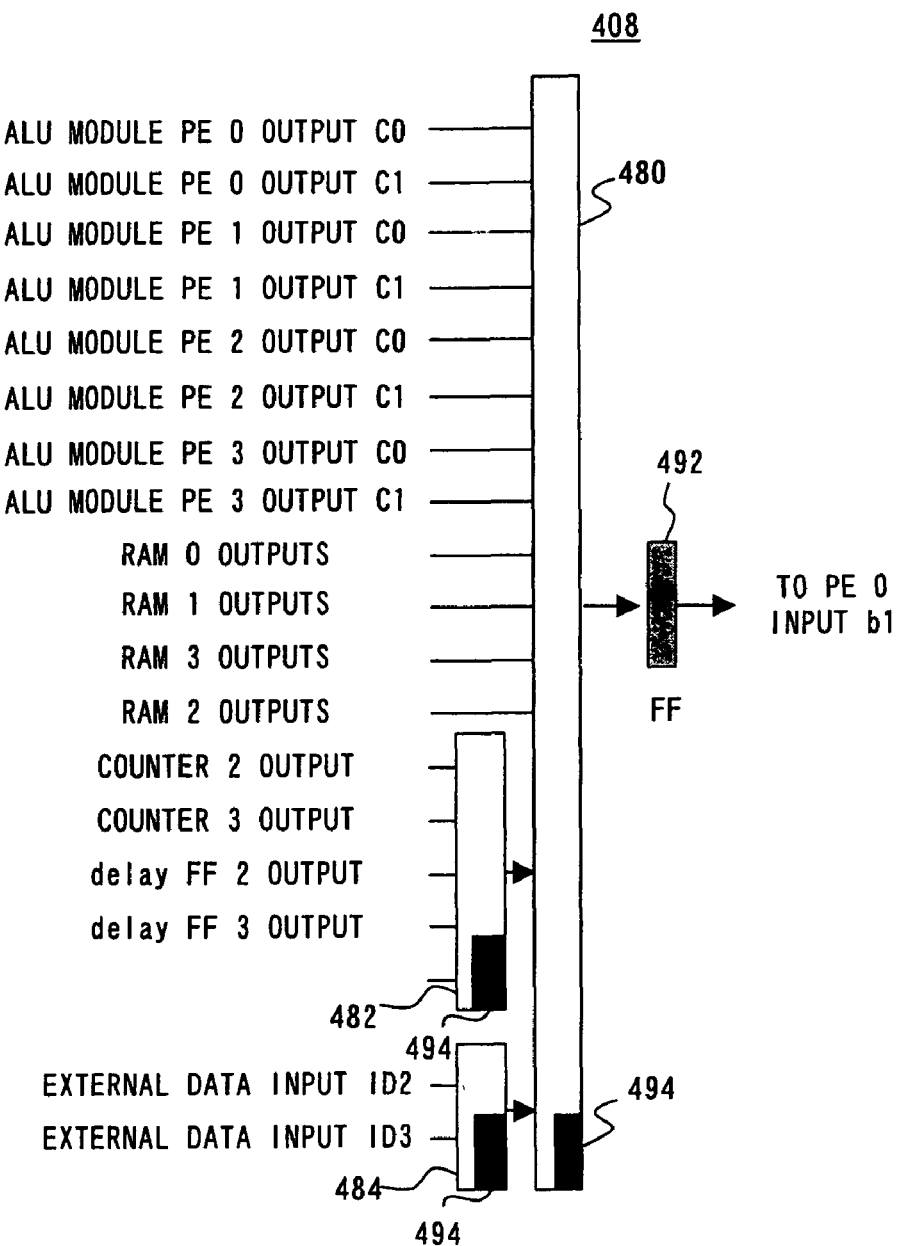
FIG. 10D shows an embodiment of a series of selectors constituting the inter-processor element network 40a shown in FIG. 9, and a setup of the selectors for the input b1 in the ALU module PE 0 (20)

In FIG. 10D, the selector circuit 408 is the same as the selector circuit 404, except that the inputs to the selector 484 are the external data inputs ID 1 and ID 3 in the former circuit. Therefore, all the outputs of all the processor elements, except for the counters 0 and 1, FF 0 and FF 1 of the delaying FF section 256, and the external data inputs ID 2 and ID 3 can be connected to the input terminal b1 of the ALU module PE 0. The solid black block shown at one corner of each of the selectors 480, 482 and 484 delineates the configuration memory section 494.

Figure 10E:
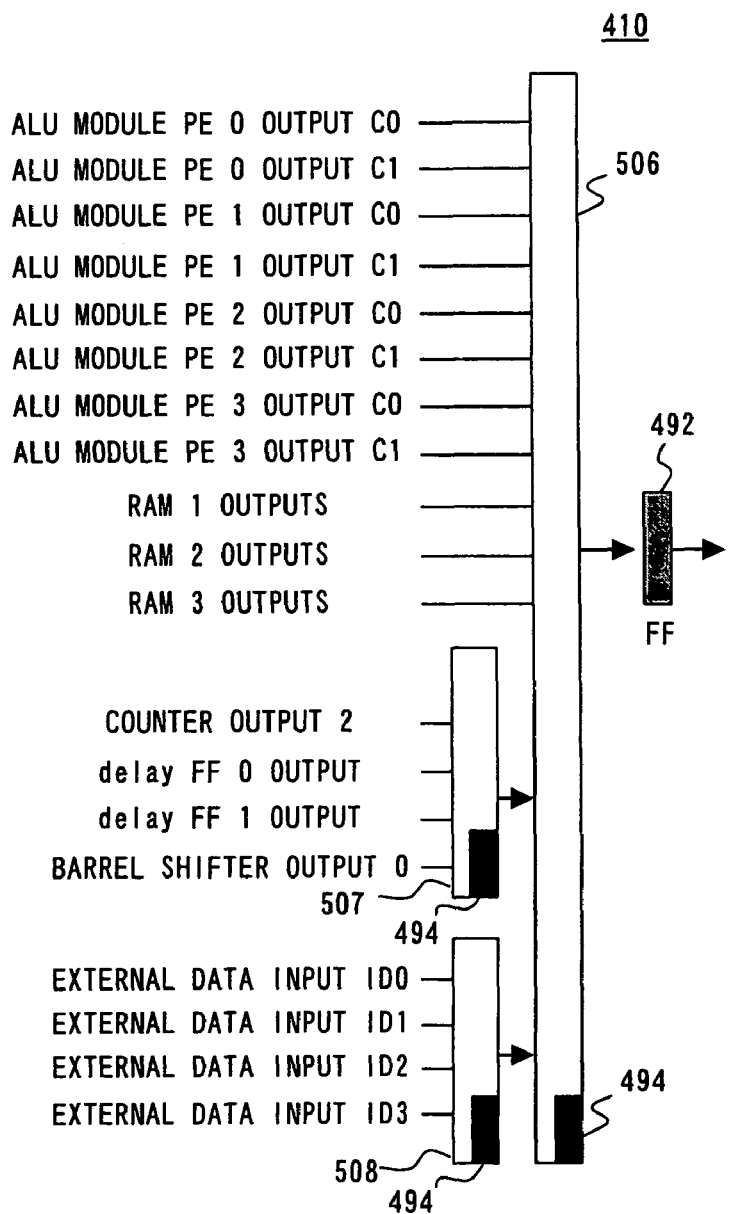
FIG. 10E shows an embodiment of a series of selectors constituting the inter-processor element network 40a shown in FIG. 9, and a setup of the selectors for the external data input section D 0 and the external address input section A 0 of a RAM 0 (242)

In FIG. 10E, the selector circuit 410 for the RAM 0 external data input D 0 consists of four (or more) of the input selectors 507 and 508, and fourteen (or more) of the input selectors 506. The input terminals of the selector 507 are connected by the output of the counter 2, of FF 0 and FF 1 of the delaying FF section 256, and of the barrel shifter 252. The input terminals of the selector 508 are connected by the external data inputs ID 0 through ID 3. The input terminals of the selector 506 are connected by the outputs C 0 and C 1 of each of the four ALU modules PE 0 through PE 3, the outputs of RAMs 1 through 3, and all the outputs of the selectors 507 and 508.

Figure 10F:
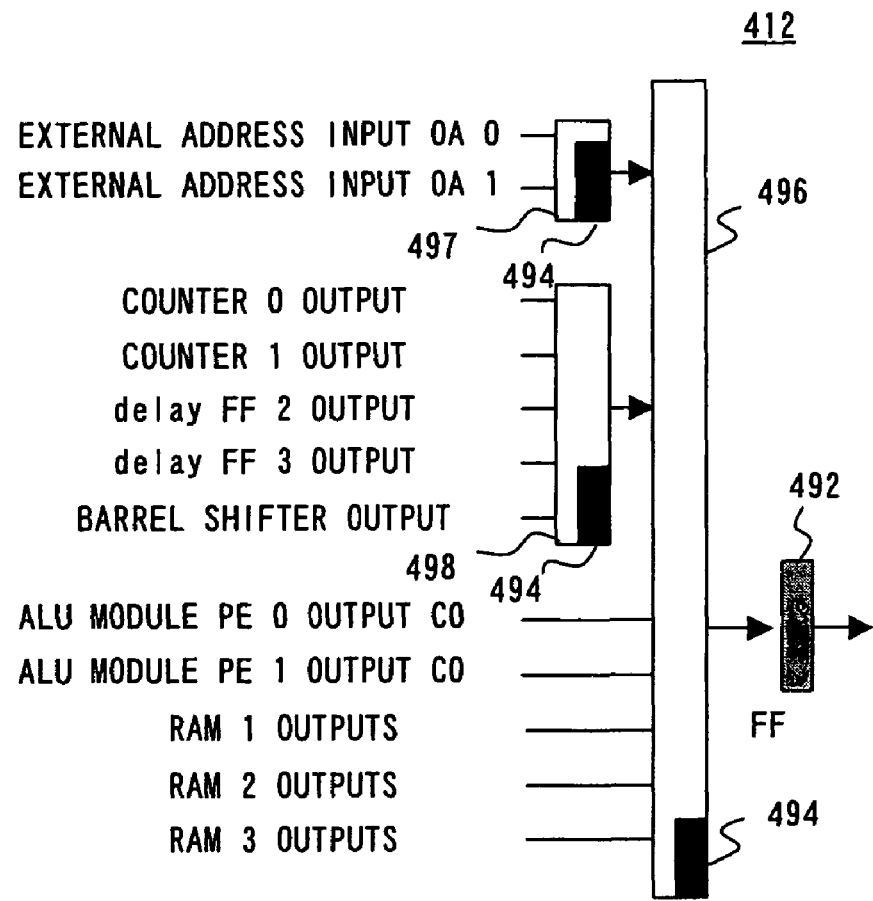
FIG. 10F shows an embodiment of a series of selectors constituting the inter-processor element network 40a shown in FIG. 9, and a setup of the selectors for the external data input section D 0 and the external address input section A 0 of a RAM 0 (242)

FIG. 10F shows a selector circuit 412 for the external address inputs for RAM 0. The input terminals of the selector circuit 412 are connected by the selector 497 having the external address inputs OA 0 and OA 1 as the inputs thereto, by the outputs of the counters 0 and 1, by the outputs of the delaying FF 2 and FF 3, and the output of the barrel shifter 252. The input terminals of the selector 496 are connected by the outputs C 0 of each of the ALU modules PE 0 and PE 1, and the outputs of RAM 1 through RAM 3.

The component identification numbers for RAM output, the counter output and the delaying FF output are changed cyclically, as with the external data input selectors 410a, 410b and 410c, and the external address input selectors 412a, 412b and 412c for RAMs 1 through 3, respectively.

Figure 10G:
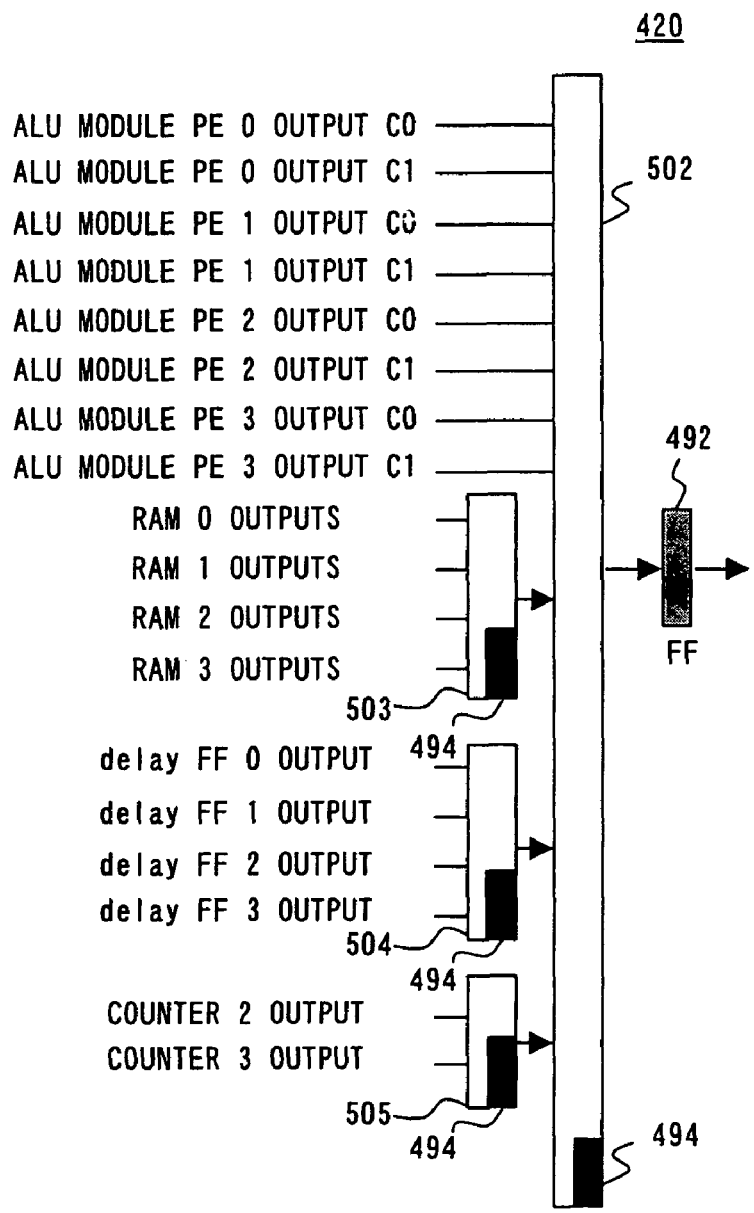
FIG. 10G shows an embodiment of a series of selectors constituting the inter-processor element network 40a shown in FIG. 9, and a setup of the selectors for the data output sections OD 0 through OD 3.

FIG. 10G shows a selector circuit 420 for the data output sections OD 0 through OD 3. The selector circuit 420 consists of a selector 503 connected with the outputs of RAMs 0 through 3 as the input thereto, a selector 504 connected with the outputs of the delaying FF 0 through 3 as the input thereto, a selector 505 connected with the outputs of the counters 2 and 3 as the input thereto, and a selector 502 connected with the outputs C 0 and C 1 of each of the ALU modules PE 0 through PE 3, and the outputs of selectors 503, 504 and 505 as the inputs thereto. The counter numbers for the output data ID 1 through ID 3 are changed cyclically.

Figure 10H:
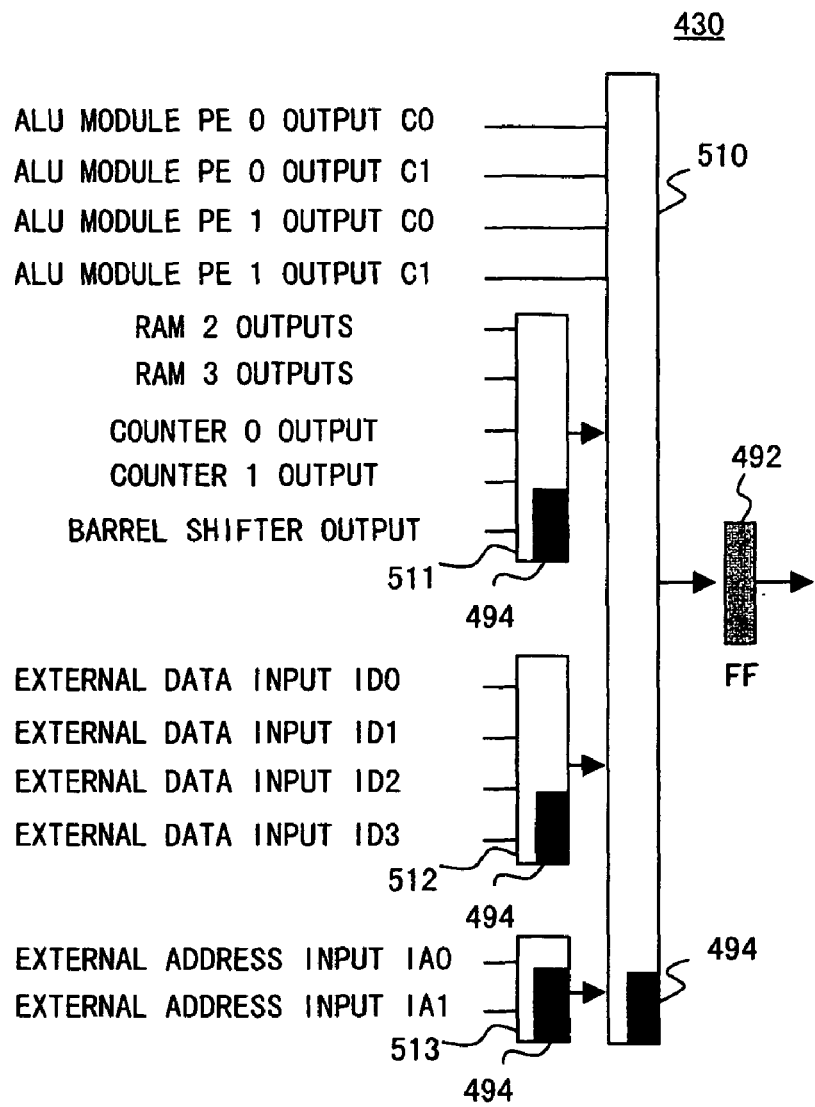
FIG. 10H shows an embodiment of a series of selectors constituting the inter-processor element network 40a shown in FIG. 9, and a setup of the selectors for the external data input sections of FF 0 and FF 1 in the delaying FF cluster 256.

FIG. 10H shows a selector circuit 430 for the delaying FF 0 input section. The selector circuit 430 consists of a selector 511 connected with the outputs of RAMs 2 and 3, the outputs of counters 0 and 1, and the output of the barrel shifter 252 as the inputs thereto; a selector 512 receiving the data inputs ID 0 through ID 3 as the inputs thereto; a selector 513 receiving the external address inputs IA 0 and IA 1 as the inputs thereto; and a selector 510 connected with the outputs of the selectors 511, 512 and 513, and in addition, the outputs C 0 and C1 of each of the ALU modules PE 0 and PE 1 as the inputs thereto.

FIG. 10I shows a selector circuit 430a for the delaying FF 1 input section. The selector circuit 430a is the same as the selector circuit 430 except that the selector 511 is replaced by the selector 512 in the former circuit. The input terminals of the selector 521 are connected by the outputs of RAMs 0 and 1, and the output of the counters 2 and 3. Also for the delaying FF 2 and FF 3, the counter numbers are changed cyclically, otherwise the same as above.

Figure 10J:
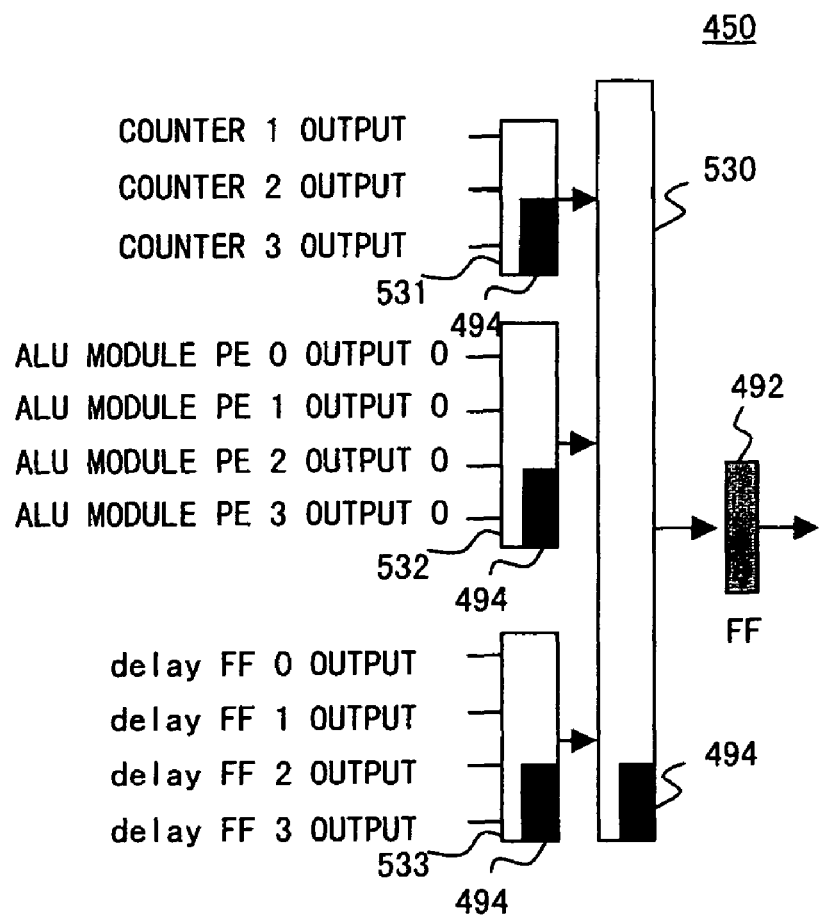
FIG. 10J shows an embodiment of a series of selectors constituting the inter-processor element network 40a shown in FIG. 9, and a setup of the selectors for the input section of the counter 0 (254)

FIG. 10J shows a selector circuit 450 for a counter 0 input. In FIG. 10J, the selector circuit 450 consists of a selector 531 connected with the outputs of the counters 1 through 3, except for the counter 0, as the inputs thereto, a selector 532 connected with the output C 0 of each of the ALU modules PE 0 through PE 3 as the inputs thereto, a selector 533 connected with the outputs of the delaying FF 0 through 3 as the inputs thereto, and a selector 530 connected with the outputs of the selectors 531, 532 and 533 as the inputs thereto. As with the counters 1 through 3, its own output is not inputted into the selector 531.

Figure 10K:
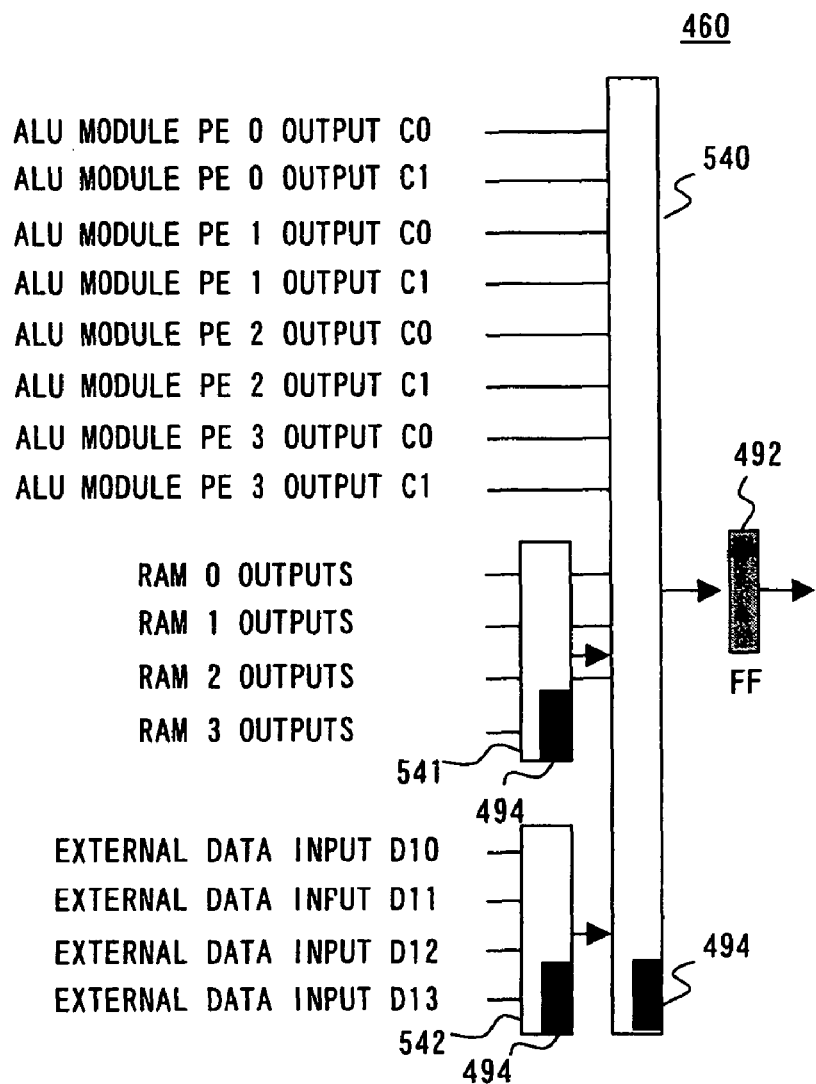
FIG. 10K shows an embodiment of a series of selectors constituting the inter-processor element network 40a shown in FIG. 9, and a setup of the selectors for the input section of the barrel shifter 252.

FIG. 10K shows a selector circuit 460 for the barrel shifter 252 input. The selector circuit 460 consists of a selector 541 connected with the outputs of RAMs 0 through 3 as the inputs thereto, a selector 542 receiving the external data inputs ID 0 through 3 as the inputs thereto, and a selector 460 connected with the outputs of the selectors 541 and 542, and the outputs C 0 and C 1 of each of the ALU modules PE 0 through PE 3 as the inputs thereto.

Figure 10L:
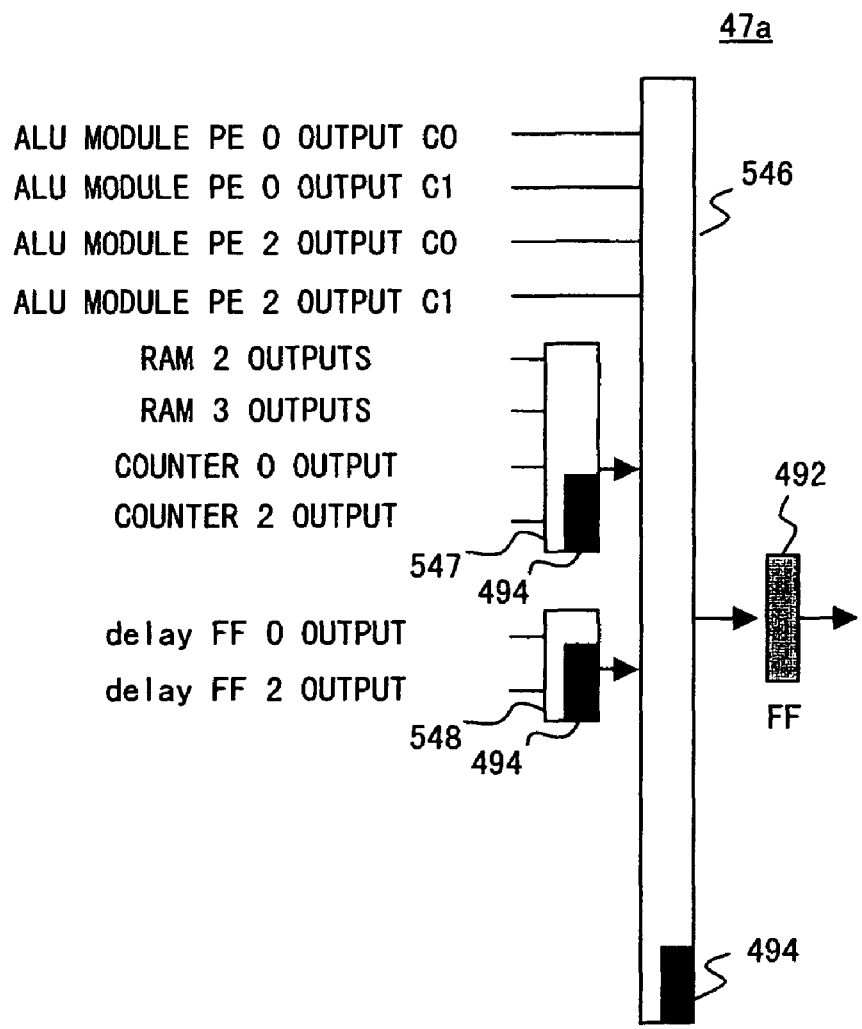
FIG. 10L shows an embodiment of a series of selectors constituting the inter-processor element network 40a shown in FIG. 9, and a setup of the selectors for the address output section OA 0.

FIG. 10L shows a selector circuit 47a for the address output OA 0. The selector circuit 47a consists of a selector 547 connected with the outputs of RAMs 2 and 3, and the output of counters 0 and 2 as the inputs thereto; a selector 548 connected with the outputs of the delaying FF 0 and 2 as the input thereto; and a selector 546 connected with the outputs of the selectors 547 and 548, and the outputs C 0 and C1 of each of the ALU modules PE 0 and PE 2 as the inputs thereto. While the selectors 47b, 47c and 47d for the other address outputs OA1 through 3, respectively, are similar, except that the inputs other than that of RAMs are cyclically different.

Described so far are preferred embodiments of the inter-element network 40a used for the processor element network 10a shown in FIG. 9. As has so far been made clear, since between the ALU module 20 and the data memory (i.e., RAMs 0 through 3) 242 are at least interconnected in their input and output terminals, other processor elements are also inter-connected with the ALU modules and other processor elements one another as required, and diverse processor elements are included therein, it is possible to comprise a highly flexible system configuration and perform an effective pipeline processing independent of a process control architecture.

FIG. 11A is a summary conceptual block diagram of the first embodiment of the sequencer shown in FIG. 7. In FIG. 11A, the sequencer 70 consists of a state number register 76 retaining a state number, a state table 74 storing a predefined post-transition (i.e., next) state number, and a status control section 72 reading out of the state table 74 by a state number indicated by the state number register 76 at the timing of a switching condition signal from a switching condition signal generator 60 becoming valid. An output of the current state number register 76 is used for an output of the sequencer 70. According to the present invention, the current state number is used as an address for the configuration memory 50, thereby improving the process efficiency as described later.

Figure 12:
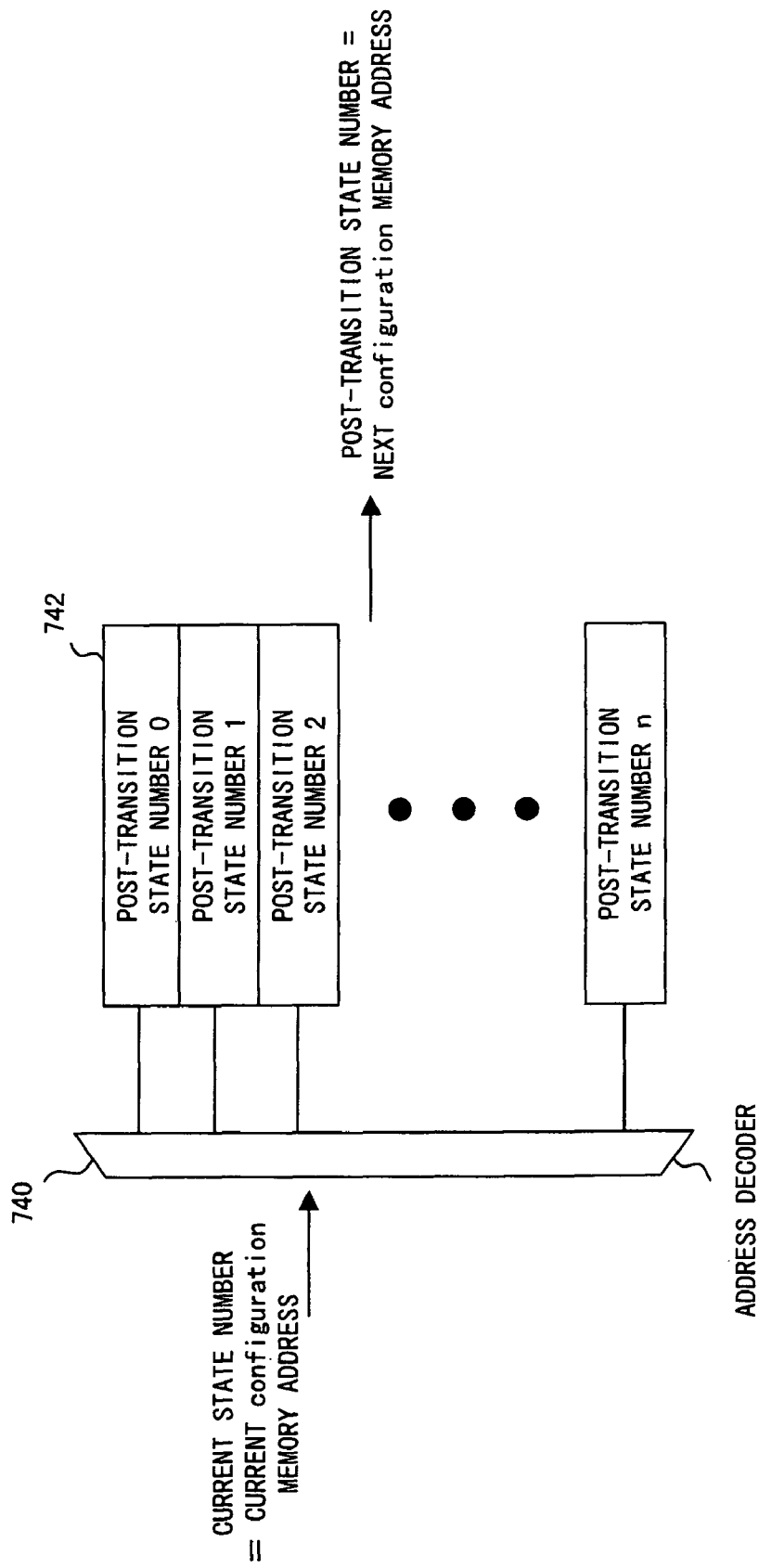
FIG. 12 shows an embodiment of the state tables for the sequencers 70 and 70a shown in FIGS. 11A and 11B, respectively.

FIG. 12 is a conceptual composition of the state transition table 74. In FIG. 12, the state transition table 74 consists of a post-transition state number memory section 742 storing post-transition state numbers 1 through n of an "n" number of possible states, and an address decoder 740 addressing a post-transition state number "i" (where i=1~n, with n denoting a possible number of states) related to the current state number by decoding the current state number supplied by the current state number register 76. The state transition table 74 outputs a post-transition state number "i" (which is equal to a configuration memory address (hereinafter called "CMA")) addressed by the address decoder 740.

Figure 13:
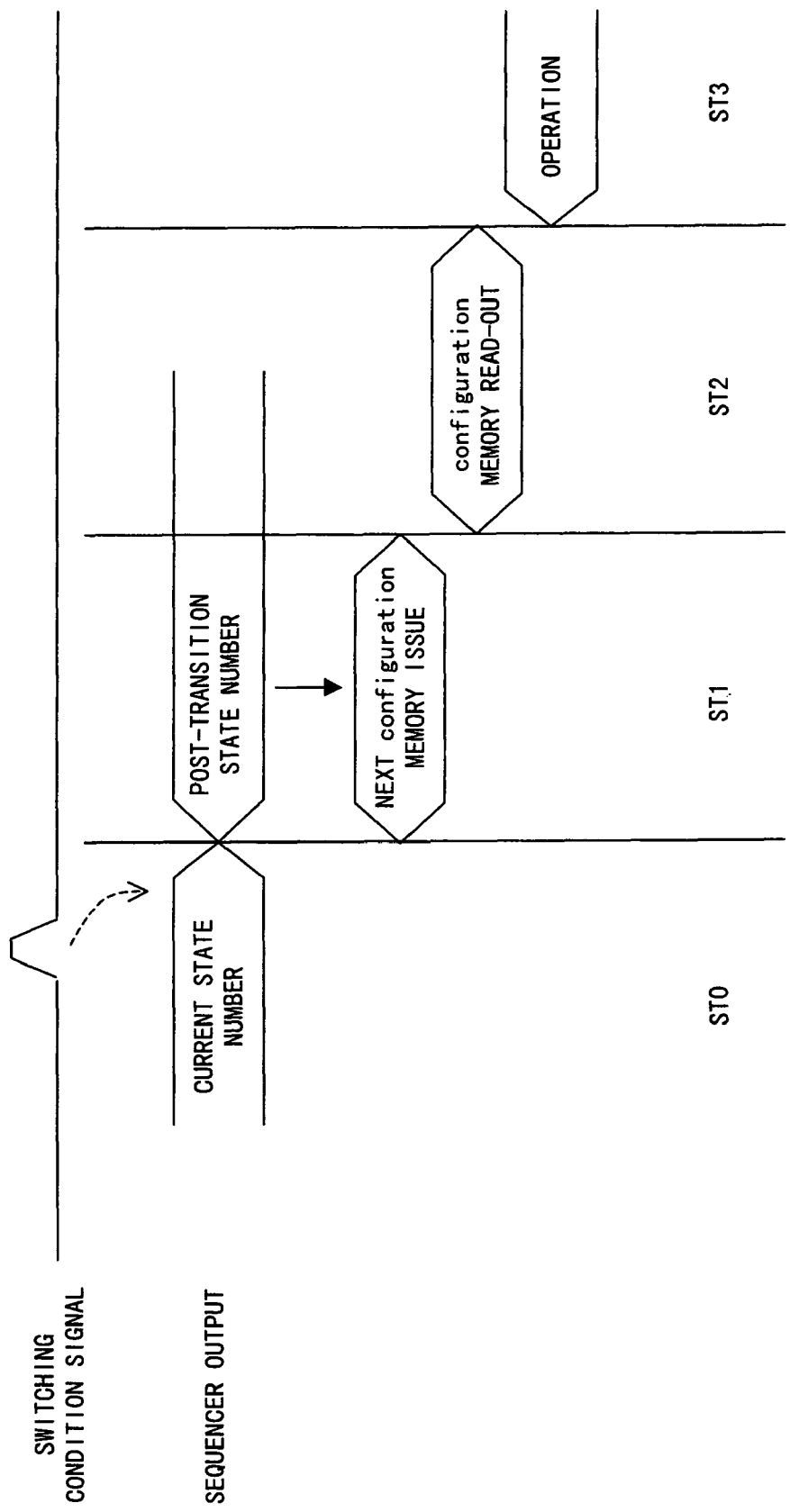
FIG. 13 shows an operation timing between a reconfiguration and execution in the case of using the sequencer 70 or 70a in the reconfigurable operation apparatus 1.

FIG. 13 shows an operating timing at switching configurations. In FIG. 13, when a pulse appears in the switching condition signal indicating a configuration switching during a processing (ST 0) by the current configuration, the status control section 72, responding to the aforementioned pulse, hands over the current state number in the current state number register 76 to the state transition table 74. At the state ST 1, the state transition table 74 outputs the post-transition state number (i.e., the next CMA) based on the received current state number. At the state ST 2, a configuration data (CD) is read out of the configuration memory 50 by using the CMA, the read-out CD is stored in the configuration data (CD) memory section of each processor element, part by part corresponding to each of the processor elements constituting the process element network 10, and at the same time, each processor element is reconfigured in response to the newly stored CD. At the state ST 3, the processor element network 10 starts operation by the reconfigured configuration.

Figure 6:
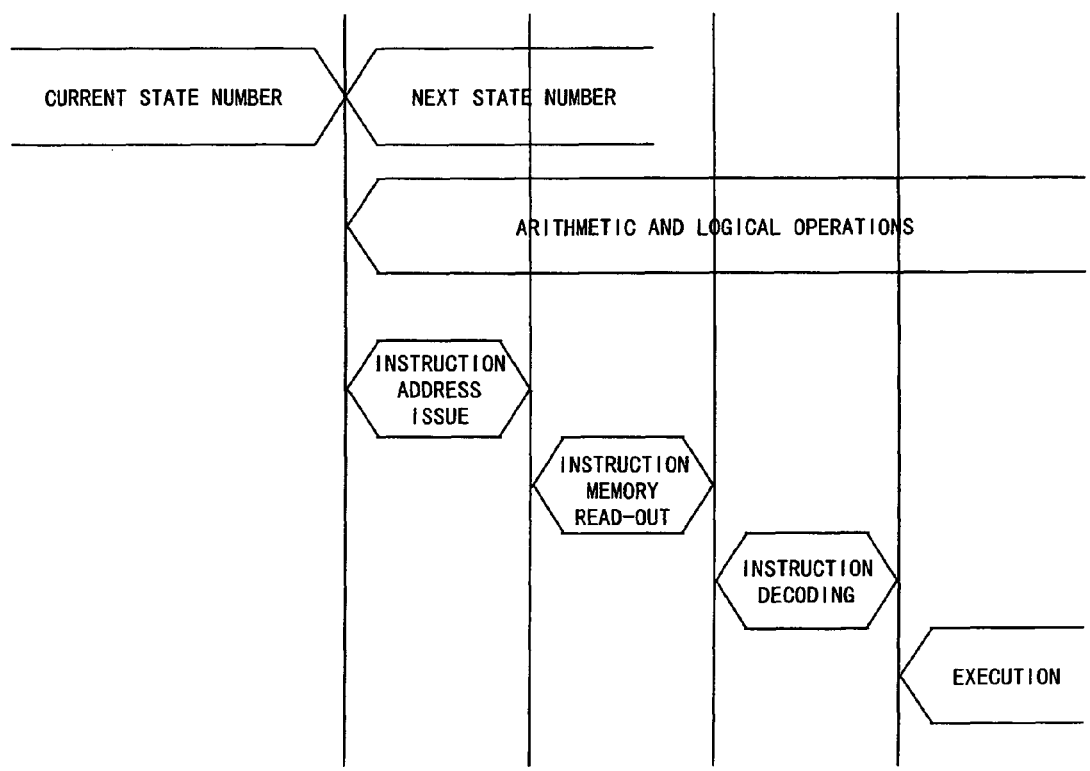
FIG. 6 shows an operating timing at a state transition of the reconfigurable array processor shown in FIG. 5.

Thus, according to the present invention, not only the state transition table 74 is simplified but also the number of steps for reading out of the configuration memory by making a state number in agreement with a CMA, and therefore the time for reconfiguring becomes shorter as compared to the conventional operation apparatus described in relation with FIG. 6. It is further apparent that the post-transition state number memory section 742 shown in FIG. 6 according to the present invention has much less number of data as compared to the state transition table shown in FIG. 5, given the same number of states.

And FIG. 11B is a summary conceptual block diagram of the second embodiment of the sequencer shown in FIG. 7. The sequencer 70a shown in FIG. 11B is the same as the sequencer 70 except for the former including a switch 75 which is connected with the outputs of the state transition table 74 and of the current state number register 76 as the inputs thereto, and outputs either one of the two. By including the switch 75 which is set for selecting an output of the state transition table 74 (i.e., a post-transition number is equal to the next CMA) at a configuration switching, thereby the post-transition state number in the state table 74 is outputted more quickly and the configuration switching time is shortened accordingly.

The characteristics of the present invention are then described in comparison with the problem associated with the conventional techniques as follows.

<Elimination of Processing Cycle Delay Due to Data Transfer>

Figure 2A:
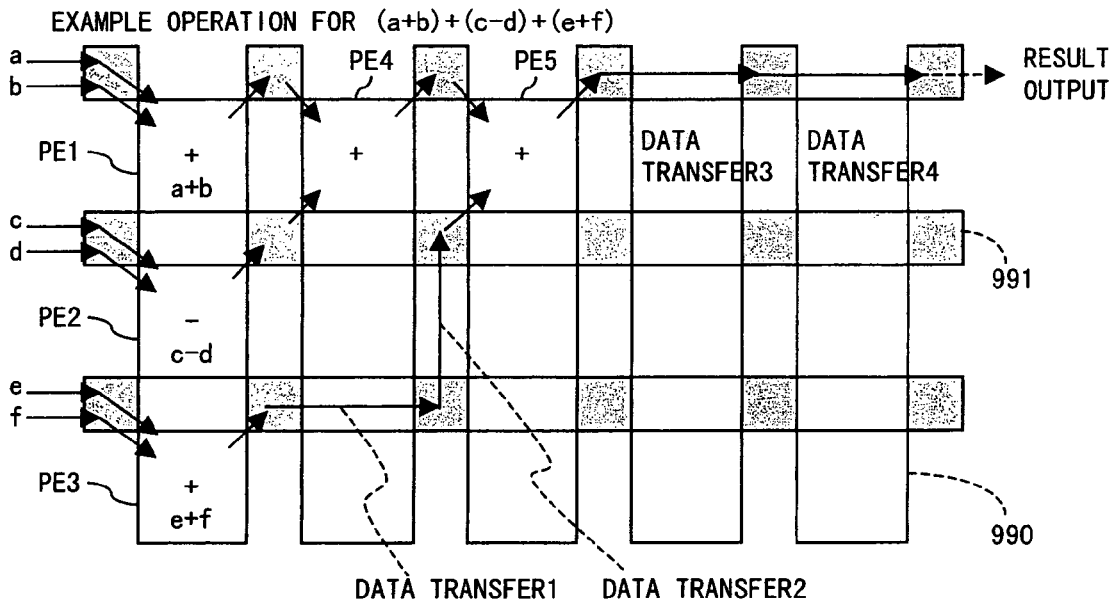
FIG. 2A describes a problem of data transfer delay in a conventional PE array shown in FIG. 1, and shows the operation of the PE array shown in FIG. 1.
Figure 2B:
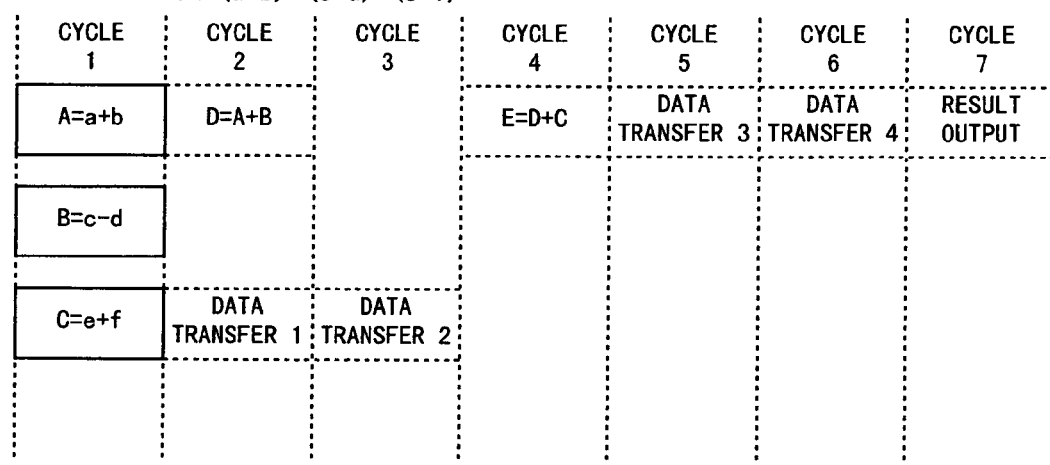
FIG. 2B describes a problem of data transfer delay in a conventional PE array shown in FIG. 1, and shows the operation of each cycle.
Figure 3A:
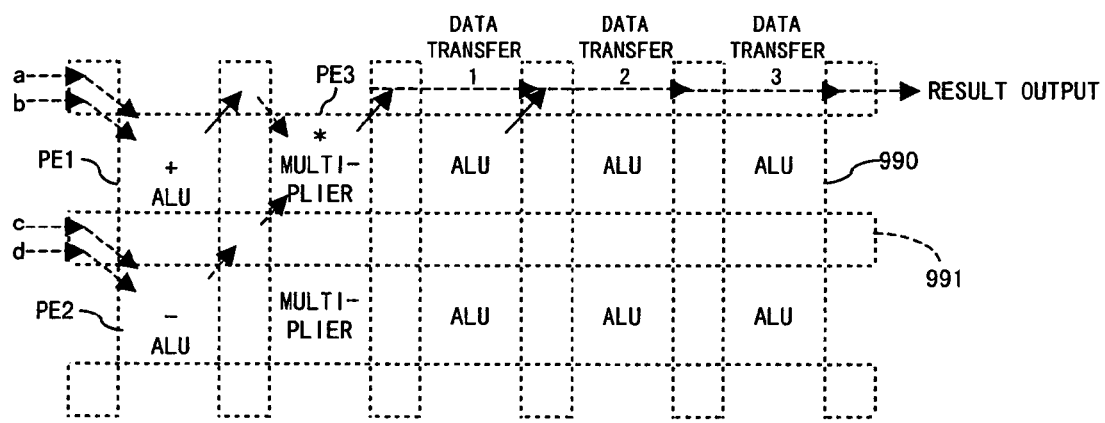
FIG. 3A shows a possibility of problem occurrence depending on a processing content caused by a functional allocation to processor elements constituting the PE array, indicating the operation of PE array and that of each cycle where no problem occurs.
Figure 14A:
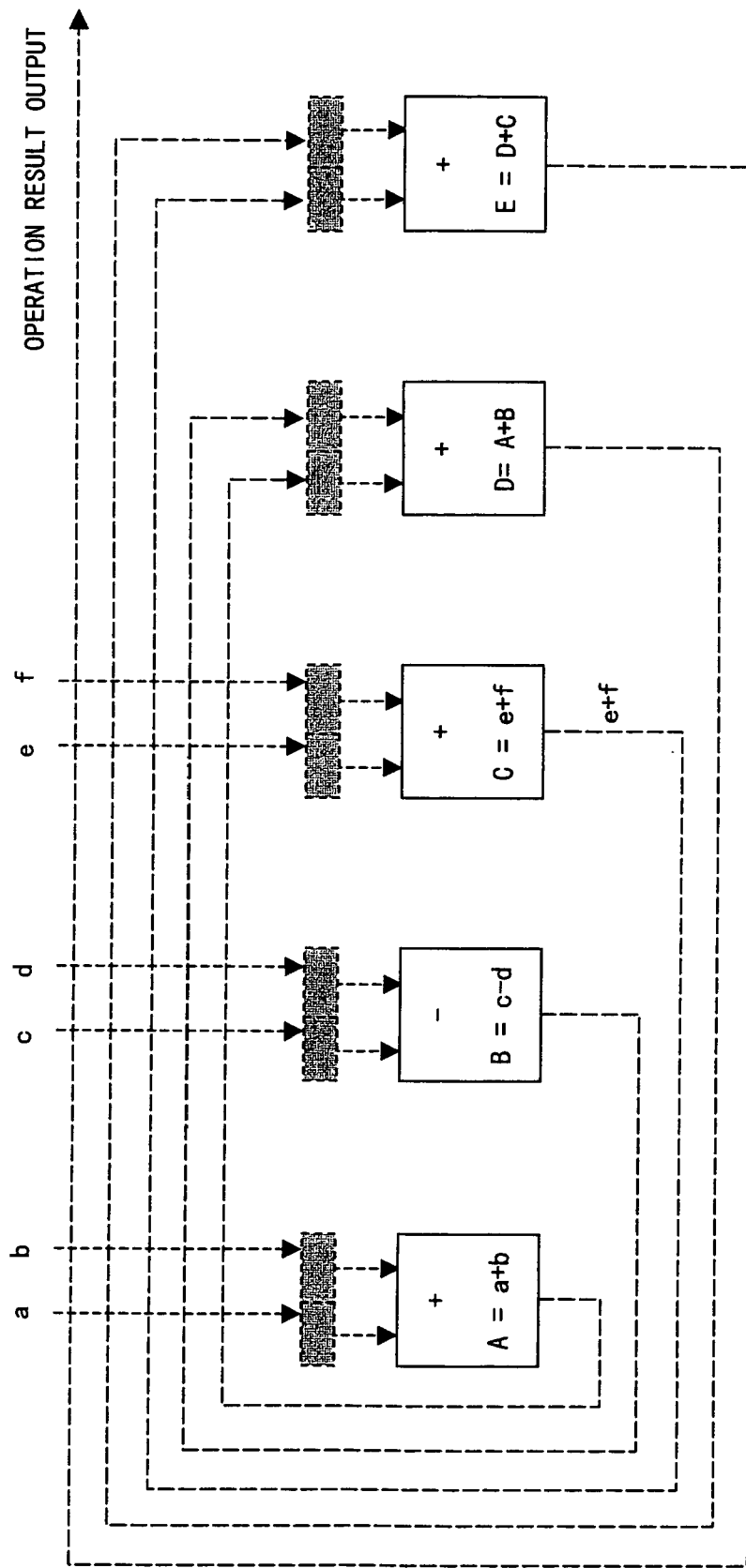
FIG. 14A shows a way a conventional problem "processing cycle delay associated with data transfer" is overcome according to the present invention, and an example configuration.

In a conventional array operation apparatus, a delay occurs due to the data transfers 1 through 4 as shown in FIGS. 2A and 2B. FIG. 14A is an equivalent circuit showing the configuration of a reconfigurable operation apparatus according to the present invention performing the same processing as shown in FIGS. 2A and 2B. In these figures herein showing the equivalent circuits including FIG. 14A, the dotted lines delineate a connected state between the respective processor elements as a result of selector circuits (not shown) within the inter-elements network 40 being relevantly set up corresponding to configuration data. Those shaded rectangles laid on their long sides inserted into input terminals of the ALU modules denote the above described flip-flop 492.

In FIG. 14A, the ALU modules A, B and C are reconfigured as processor elements for operating an addition a+b, a subtraction c−d and an addition e+f, respectively, where the "a" through "f" are the input signals. The ALU module D is reconfigured as the adder for operating an addition A+B by using the outputs of the ALU modules A and B; and the ALU module E is reconfigured as the adder for operating an addition D+C by using the outputs of the ALU modules D and C.

FIG. 14B is a table of cycle states showing the processing performed by the configuration shown in FIG. 14A. As shown in FIG. 14B, the addition A=a+b, subtraction B=c−d and addition C=e+f in the cycle 1, the addition D=A+B in the cycle 2, and the addition E=D+C in the cycle 3, respectively, are operated, and the operation result E is outputted in the cycle 4. As such, no processing cycle delay due to the data transfers occurs in the reconfigurable operation apparatus according to the present invention. By comparison, a delay of 3 cycles occurred in the processing shown in FIGS. 2A and 2B.

<Independence of Processor Elements>

Figure 15A:
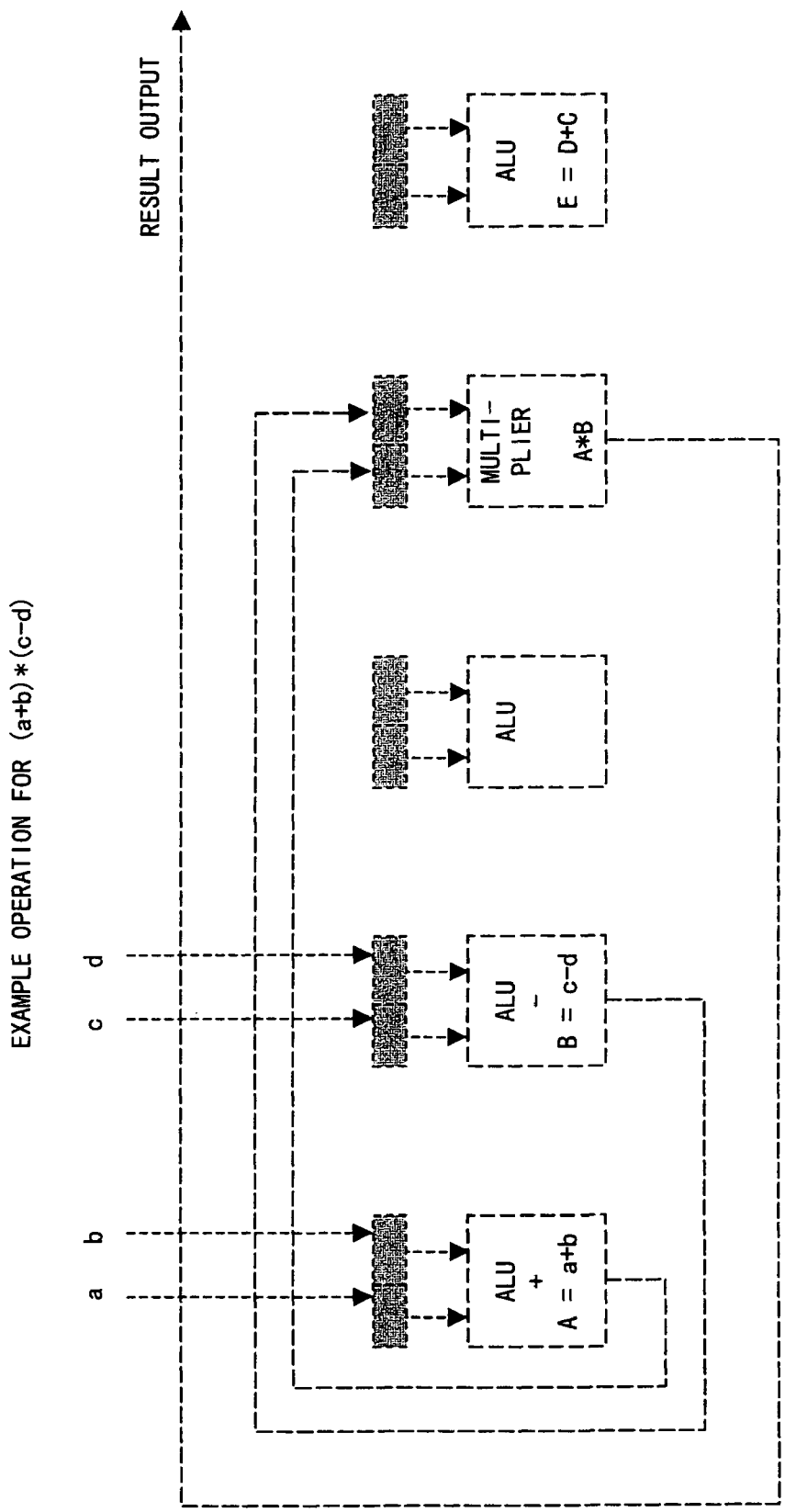
FIG. 15A shows an equivalent circuit illustrating a configuration including disparate processor elements in the reconfigurable operation apparatus 1 according to the present invention.
Figure 15B:
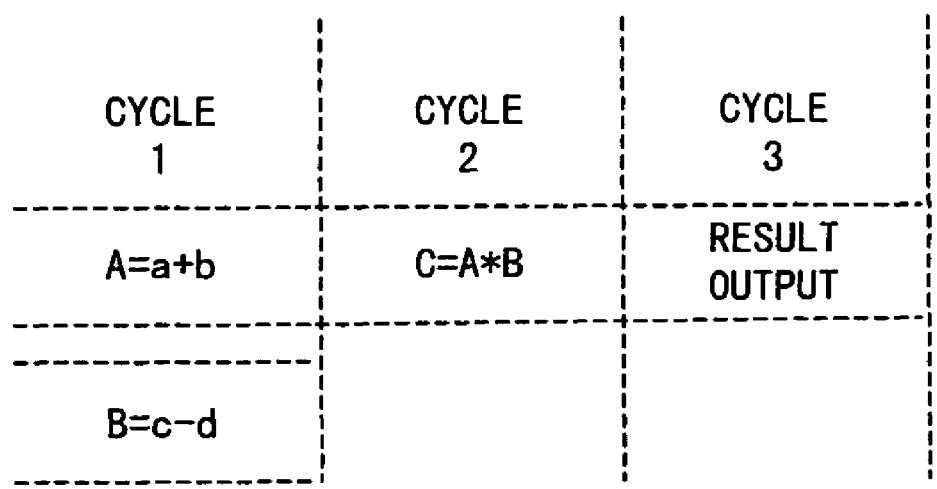
FIG. 15B shows a table of processing cycle for the configuration shown in FIG. 15A.

In a conventional array operation apparatus having disparate processor elements therein, the processing efficiency was affected by an arrangement of the processor elements and a processing content as shown in FIGS. 3A through 3D. The following examines this point. FIGS. 15A and 15B describe the way the operation of the same equation (a+b)*(c−d) as the one processed in FIGS. 3A through 3D is performed by the reconfigurable operation apparatus 1 according to the present invention. FIG. 15A shows an equivalent circuit of the processor element network 10 reconfigured for operating the equation (+b)*(c−d). FIG. 15B is a table of cycle states showing the processing of FIG. 15A. In the processing cycle 1, the ALU modules A and B operate an addition a+b (=A) and a subtraction c−d (=B), respectively, followed by the multiplier located in the second from the right multiplying A*B in the cycle 2 and the operation result of the multiplier being outputted.

As understood by FIG. 15A, it is possible to form the same topology as FIG. 15A independent of the positions of the ALU modules through the inter-element network 40 according to the present invention. Thus, a reconfigurable operation apparatus according to the present invention is capable of forming the same topology independent of the positions of processor elements, and therefore disparate processor elements can be added to optional positions.

<Feedback Operations>

Figure 4A:
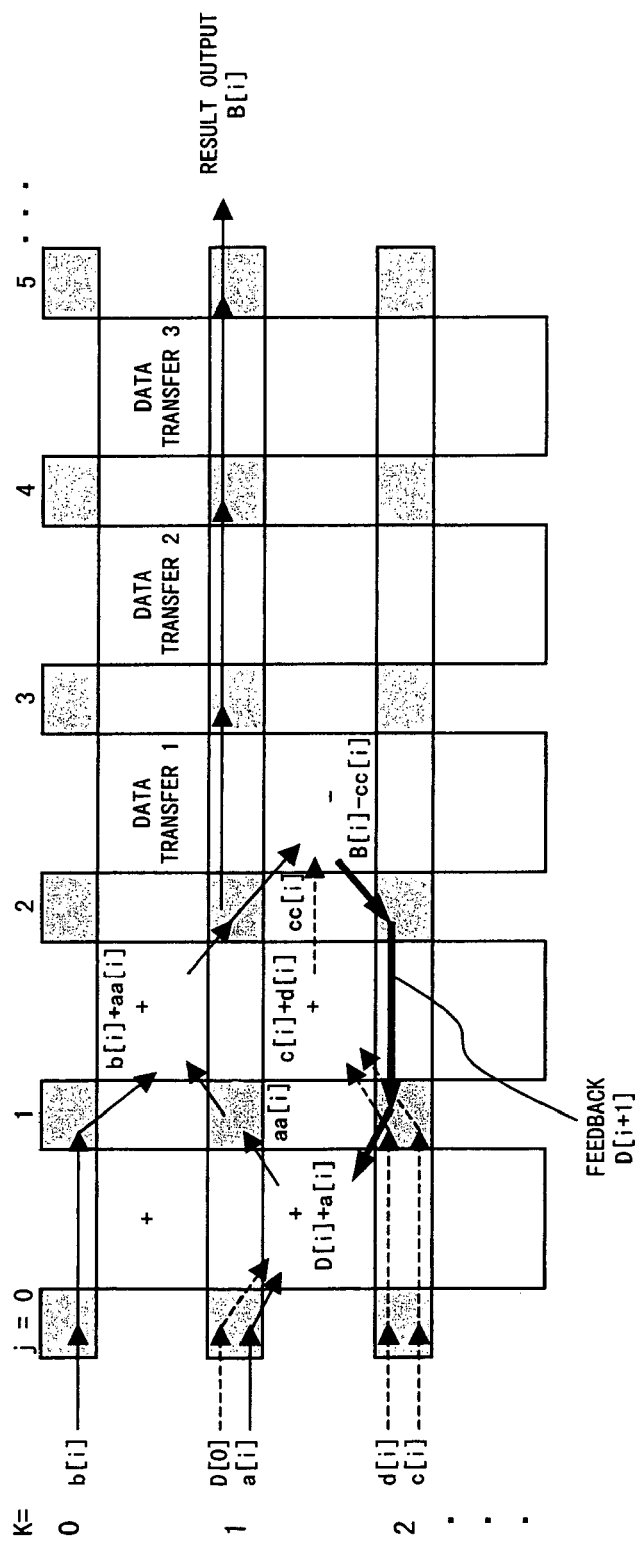
FIG. 4A describes a problem occurring in processing including a feedback loop by the PE array shown in FIG. 1, and shows an operation of the PE array.
Figure 4B:
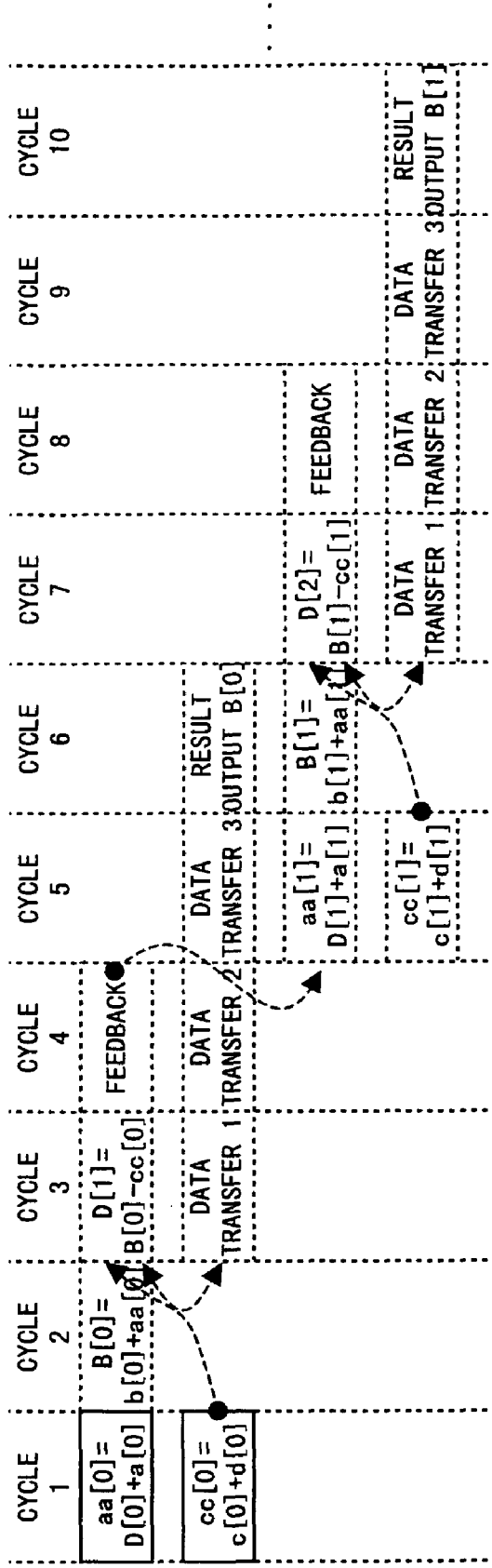
FIG. 4B describes a problem occurring in processing including a feedback loop by the PE array shown in FIG. 1, and shows an operation of the PE array.
Figure 16A:
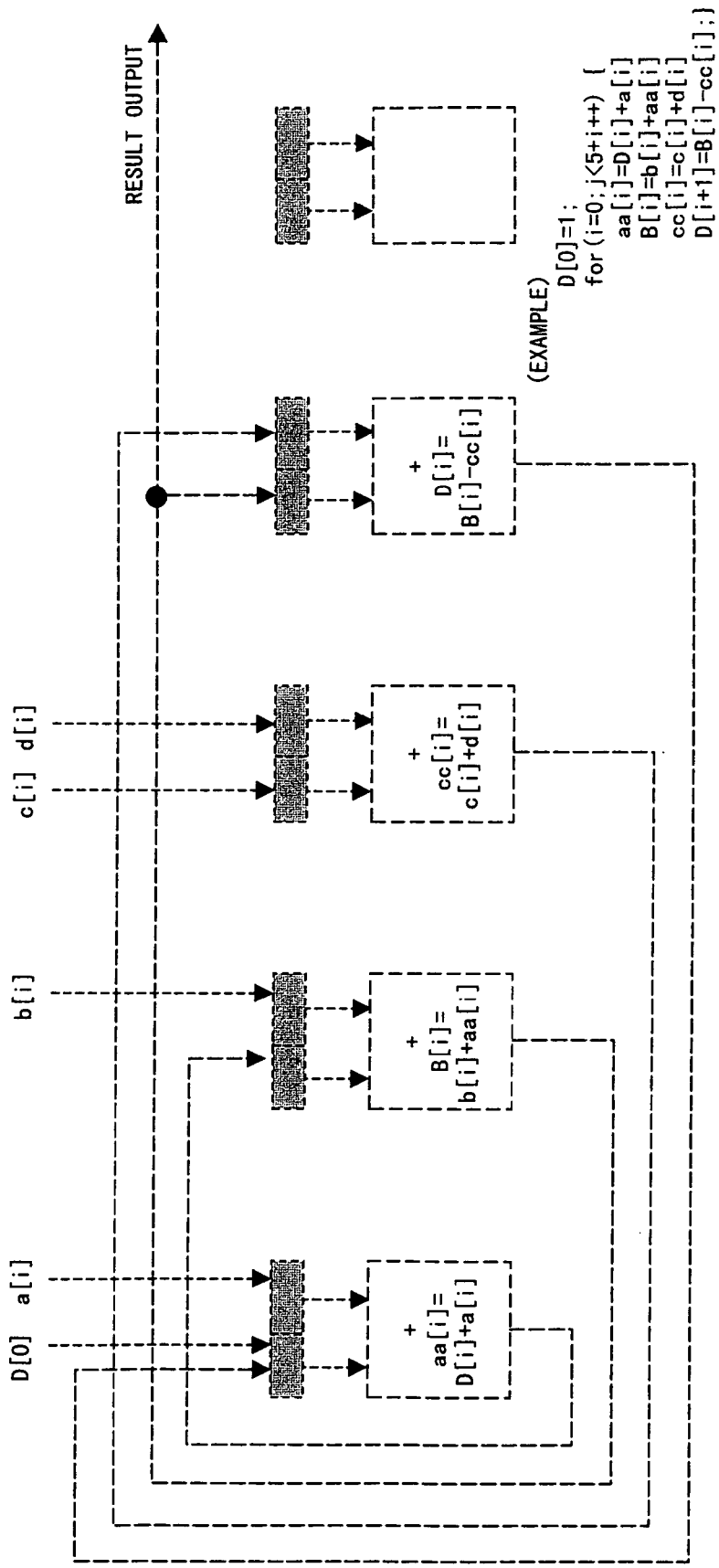
FIG. 16A shows an equivalent circuit illustrating a configuration including a feedback in the reconfigurable operation apparatus 1 according to the present invention.

In a conventional array operation apparatus consisting of disparate processor elements, the processing efficiency was affected when processing a repetition including a loop as shown in FIGS. 4A and 4B. The following examines this point. FIGS. 16A and 16B describe the way the operation of the same equation as the one in FIGS. 4A and 4B (i.e., the above described processing cycle 1) is performed by the reconfigurable operation apparatus 1 according to the present invention. FIG. 16A shows an equivalent circuit of the processor element network 10 reconfigured for operating the above described processing cycle 1. FIG. 16B is a table of cycle states showing the processing shown in FIG. 16A. In the processing cycle 1, the adder aa[i] on the farthest left and the adder cc[i] at the center operate the addition D[0]+a[0] (=aa [0]) and the addition c[0]+d[0] (=cc[0]), respectively; followed by the adder B[i] on the second from the left operating the addition b[0]+aa[0] in the cycle 2; and the subtracter D[i+1] on the second from the right operating the subtraction B[0]−cc[0] and, at the same time, outputting the operation result of the adder B[i] in the cycle 3; and thereby ending the first loop. Then in the cycle 4, the adders aa[i] and cc[i] operate the additions D[1]+a[1] (=aa[1]) and c[1]+d[1] (=cc [1]), respectively; followed by the adder B[i] operating the addition b[1]+aa[1] in the cycle 5; and the subtracter D[i+1] operating the subtraction B[1]−cc[1] and at the same time, outputting the operation result of the adder B[i] in the cycle 6; and thereby ending the second loop.

As understood by the table of cycle states shown in FIG. 16B, there is no data transfer for the feedback in association with a loop processing in the reconfigurable operation apparatus according to the present invention. Thus, there is no loss in the processing efficiency caused by a loop processing according to the present invention.

<Comparison with a RISC Processor>

Independent Parallel Processing

Figure 17A:
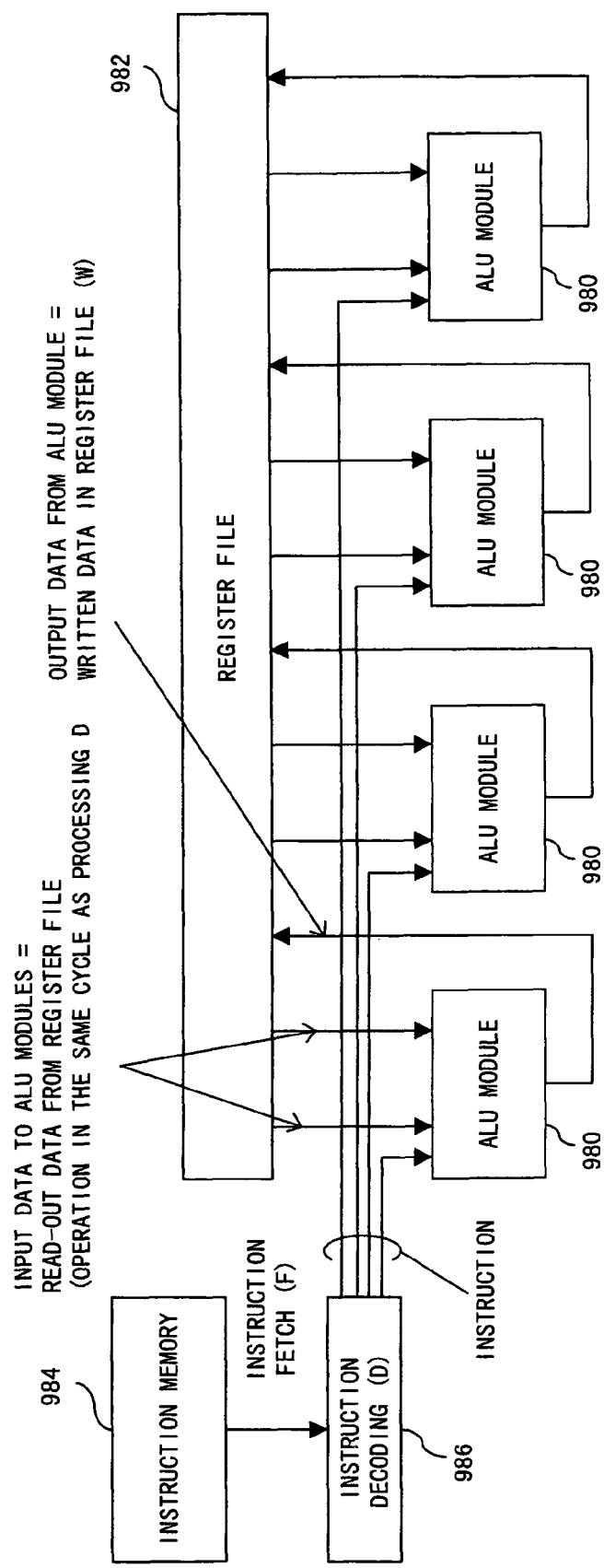
FIG. 17A illustrates a conceptual block diagram of a typical RISC (reduced instruction set) processor.

FIG. 17A illustrates a conceptual block diagram of a typical conventional RISC processor. In FIG. 17A, a typical RISC processor consists of a plurality of ALU modules 980, a register file 982 connected with the input and output of the ALU modules 980, an instruction memory 984 and an instruction decoder 986 decoding instructions from the instruction memory 984 and supplying to the ALU modules 980.

Figure 17B:
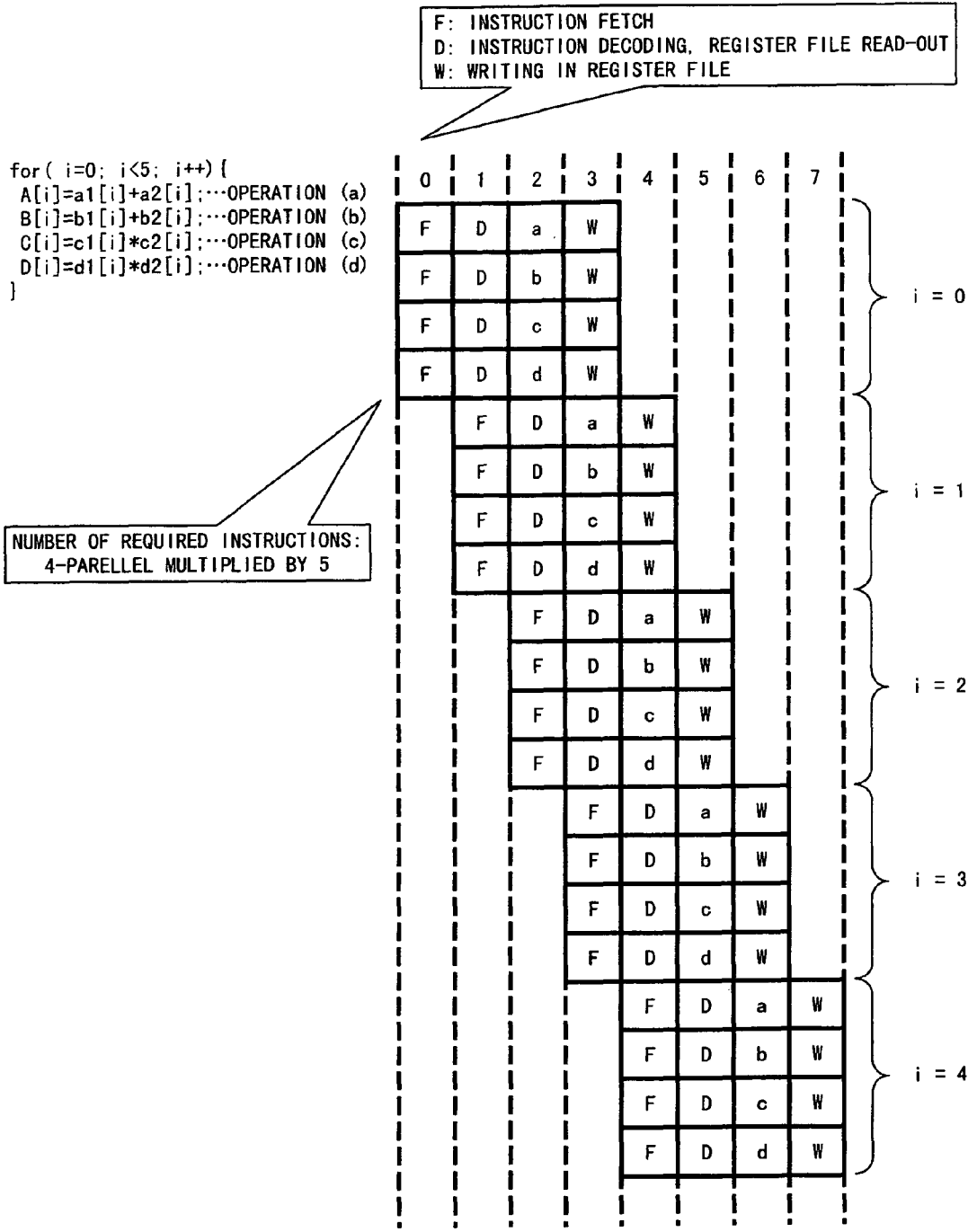
FIG. 17B is a status flow chart showing a parallel processing operation by a popular RISC processor.

FIG. 17B is a table of cycle states when the RISC processor as shown in FIG. 17 performing a parallel processing as follows.

```
for (i=0; i<5; i++){
    A[i]=a1[i]+a2[i];      -- operation (a)
    B[i]=b1[i]+b2[i];      -- operation (b)
    C[i]=c1[i]*c2[i];      -- operation (c)
    D[i]=d1[i]*d2[i];      -- operation (d)
}                          -- (Processing 2)
```

That is, when the processing 2 above is parallel-processed by making the two ALU modules shown in FIG. 17A operate the additions A[i] and B[i], respectively, and the other two ALU modules operate the additions C[i] and D[i], respectively, the table of cycle states are as shown in FIG. 17B. In FIG. 17B, "F" denotes an instruction fetch cycle reading an instruction out of the instruction memory 984; "D" denotes a decoding cycle in which the instruction decoder 986 decoding the read-out instruction; "a," "b," "c" and "d" denote execution cycles each executing the respective operation; and "W" denotes a write cycle writing the processing results. As RISC processors are von Neuman processors in which the instruction is fetched and decoded every time each ALU module 980 performs a processing, each processing requires four cycles. Therefore, the number of required instructions are 20 (i.e., 4 parallel processes multiplied by 5 equals 20).

Figure 18A:
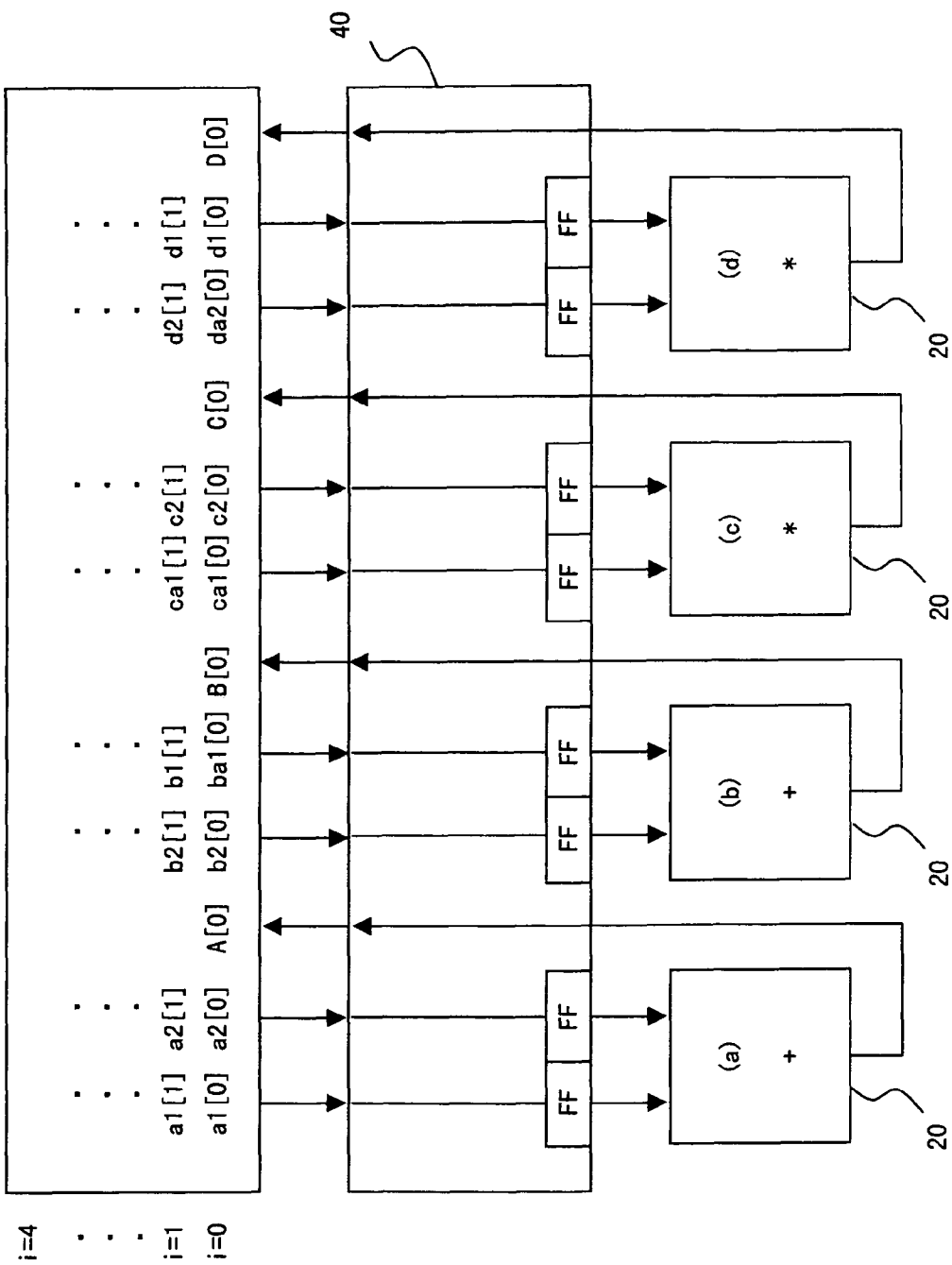
FIG. 18A is an equivalent circuit illustrating a configuration performing a parallel operation in the reconfigurable operation apparatus 1 according to the present invention.

Comparatively, an examination is given for the reconfigurable operation apparatus 1 according to the present invention performing the above processing 2 as follows. FIG. 18A illustrates an equivalent circuit as a result of reconfiguring the processor element network 10 for executing the processing 2, while FIG. 11B shows a table of cycle states when the configuration shown in FIG. 11A executes the processing 2. Since the reconfigurable operation apparatus according to the present invention is classified basically as a data driven processor, not a von Neuman processor, when each of the ALU modules 20 repeats the same processing independently (i.e., each ALU module 20 is not affected by operation result by the others) as with the processing 2, there is no need of reconfiguring in the processing once reconfigured at first as shown in FIG. 18A.

In FIG. 18A, the two input and one output terminals in each of the ALU modules (a), (b), (c) and (d) are all connected to the data memory 240; and the ALU modules (a) and (b) are set as adders while the ALU modules (c) and (d) are set as multipliers.

In FIG. 18B, "R" denotes the read cycles reading the data a1[i], a2[i], b1[i], b2[i], c1[i], c2[i], d1[i] and d2[i] out of the memory 240; "N" denotes a cycle in which the data out of the memory 240 are in the inter-element network 40; "a", "b", "c" and "d" denote the cycle in which each of the ALU modules 20 performs the respective processing; "W" denotes the cycle in which the processing results are written in the data memory 240. A simple parallel processing such as the processing 2 above can be completed by a reconfigurable operation apparatus according to the present invention in the same cycles as a conventional RISC processor.

Interdependent Parallel Processing

In the processing 2 above, the four operations are executed independently without using an operation result for others, hence simple. An examination is given for a processing example in which other operation result is used for a particular operation as follows.

```
for (i=0; i<5; i++){
    A[i]=a1[i]+a2[i];      -- operation (a')
    B[i]=b1[i]+A[i];       -- operation (b')
    C[i]=A1[i]*B[i];       -- operation (c')
    D[i]=d1[i]*C[i];       -- operation (d')
}                          -- (Processing 3)
```

Figure 17C:
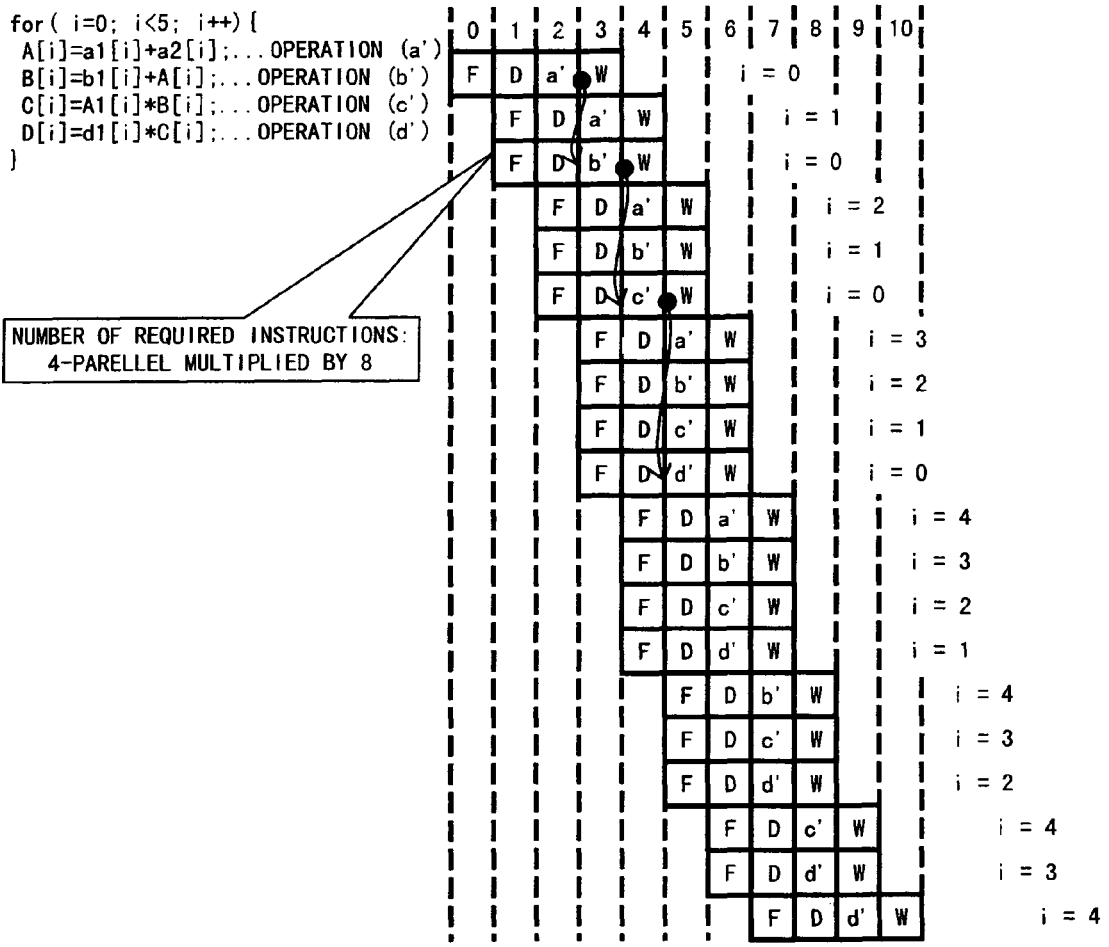
FIG. 17C is a status flow chart showing a processing flow including the forwarding by a popular RISC processor.

FIG. 17C shows a table of cycle states when the processing 3 is executed while performing the forwarding or the bypassing (i.e., a operation result is handed over to a requiring ALU module bypassing the register file 982 at the same time the operation result is being written in the register file 982) which is done in a high performance RISC processors. In this case, the number of required instructions is four parallel processing multiplied by eight, and the processing is completed in eleven cycles.

Figure 17D:
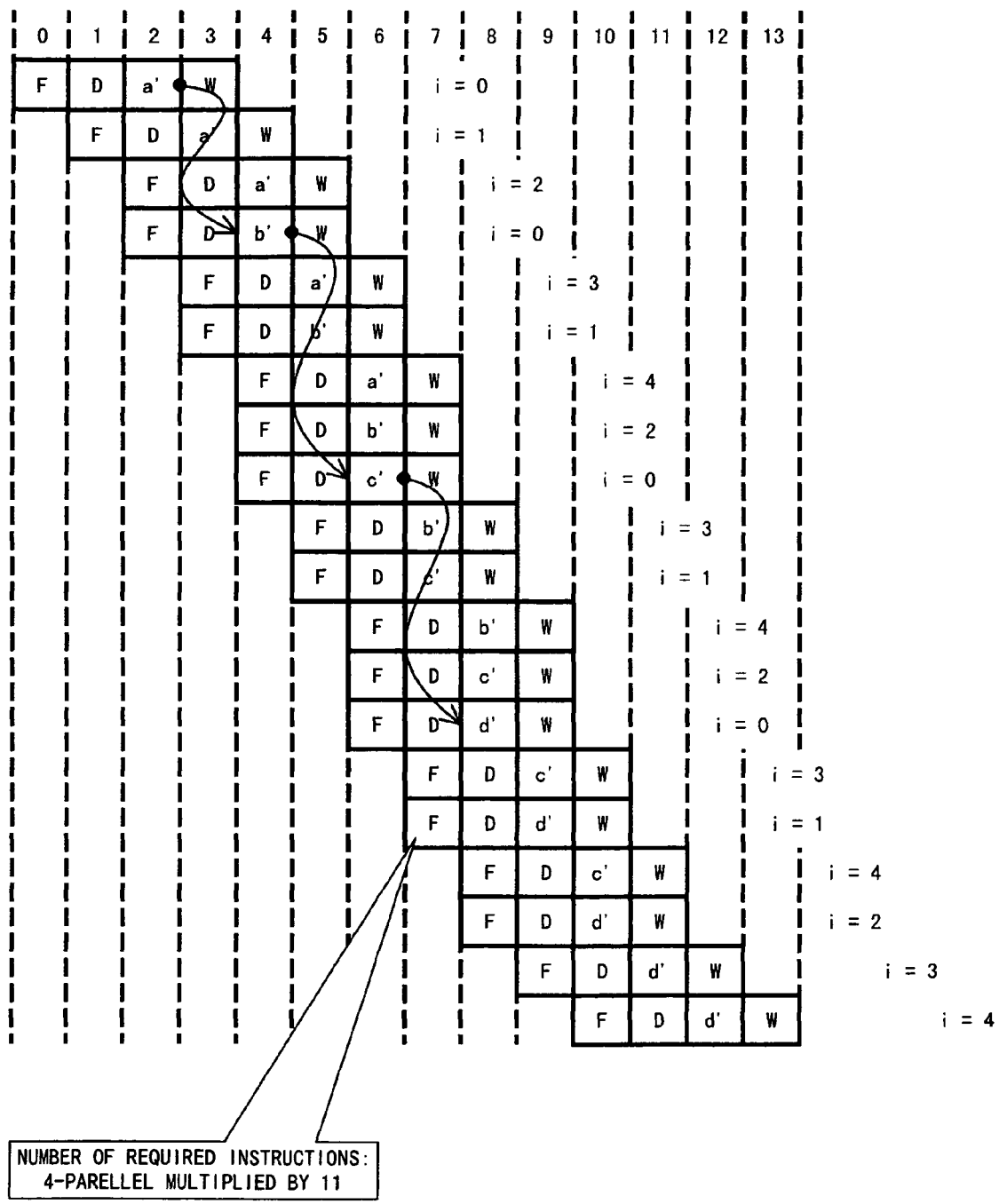
FIG. 17D is a status flow chart showing a processing flow including no forwarding by a popular RISC processor.

And FIG. 17D shows a table of cycle states when the processing 3 is operated without the forwarding. In this case, since an operation result is handed over to a requiring ALU module by way of the register file 982 when using the operation result for other operation, the processing efficiency is lower as compared to the case of forwarding. In this case the number of required instructions is four parallel processing multiplied by eleven, and the processing is completed in 14 cycles.

Figure 18C:
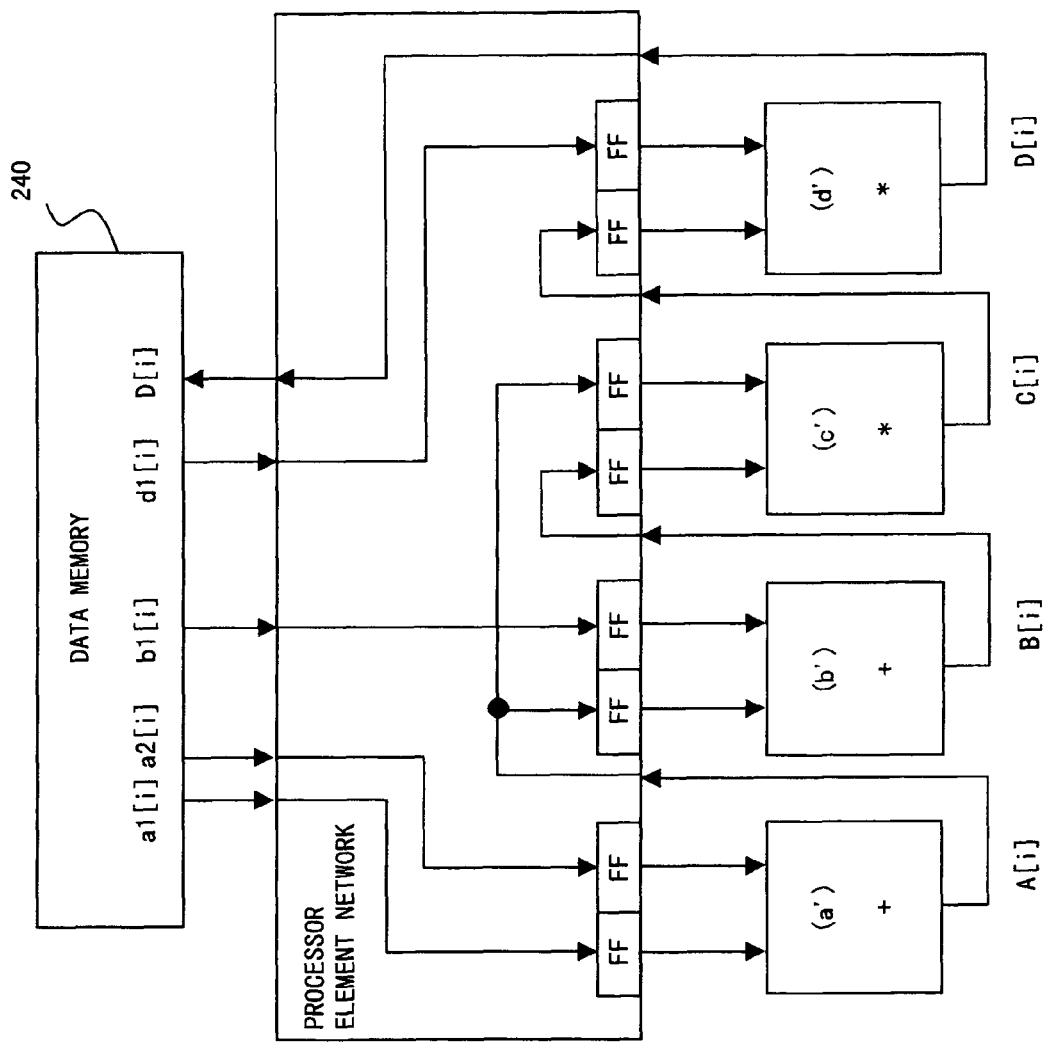
FIG. 18C is an equivalent circuit illustrating a configuration performing a pipeline processing in the reconfigurable operation apparatus 1 according to the present invention.

FIG. 18C shows an equivalent circuit of the processor element network 10 reconfigured for executing the processing 3. The ALU modules (a') and (b') are set as adders, while the ALU modules (c') and (d') are set as multipliers. An input terminal of the ALU module (a') is connected to the data memory 240 so as to take in the data a1[i] and a2[i]; the output A[i] of the ALU module (a') is connected with one input of each of the ALU modules (b') and (c'); the other input of the ALU module (b') is connected with the data memory 240 so as to take in the data b1[i]; the output B[i] of the ALU module (b') is connected with the other input terminal of the ALU module (c'); the output C[i] of the ALU module (c') is connected with one input terminal of the ALU module (d'); and the other input and the output of the ALU module (d') are connected with the data memory 240 so as to take in the data d1[i] as the input thereto and also write the operation result D[i] in the data memory 240.

Figure 18D:
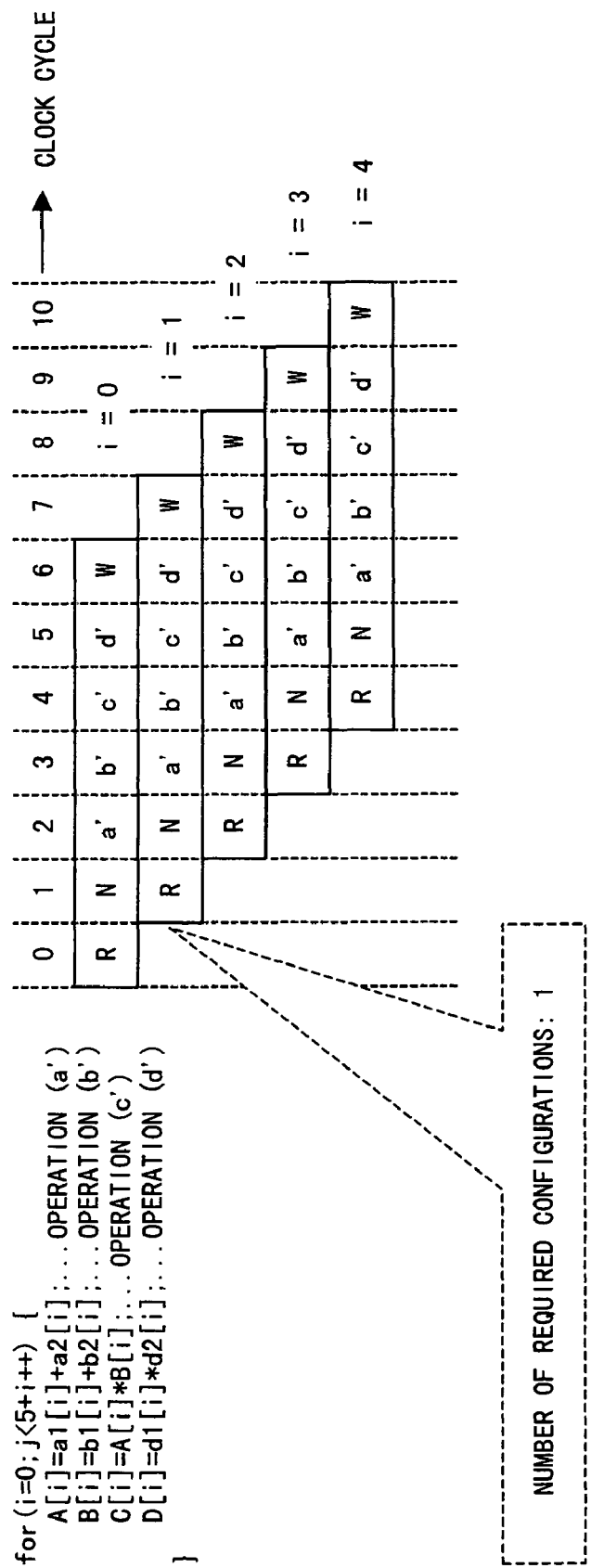
FIG. 18D shows a table of processing cycle for the configuration shown in FIG. 18C.

FIG. 18D is a table of cycle states showing the operation of the processing 3 by the configuration shown in FIG. 18C. One cycle of loop processing including a read cycle (R), a network cycle (N) and a write cycle (W) requires seven clocks, and five cycles of loop processing are parallel-processed, with each subsequent cycle lagging by one clock.

The pipeline processing according to the present invention takes eleven clocks for completing the processing 3. This means the same performance as a conventional RISC processor with the forwarding, whereas a higher performance as compared to the processor without the forwarding.

While a conventional RISC processor requires eight instructions (with the forwarding) or eleven instructions (without the forwarding), consisting of eight or eleven times of instruction fetches, instruction decoding and instruction setting in the ALU modules, there is only one configuration required according to the present invention and therefore one reconfiguration done prior to the start of a processing can be kept until the completion of the processing. This in turn can reduce the number of operating points and power consumption.

In the example of the processing 3, the number of loops is five. While in the case of 1000, the conventional method requires either 1003 times (with the forwarding) or 1006 times the instruction issues, whereas only one configuration is required according to the present invention which is merely reconfigured prior to the start of a processing and kept until the completion thereof, reducing the number of operating points and power consumption.

Also according to the present invention, the data is not written in a memory for each operation but is retained by the latching FF 492 in the inter-element network 40, the number of access to the register file is reduced as in a RISC processor.

As described above, a reconfigurable operation apparatus according to the present invention provides a better performance in an interdependent parallel processing as compared to a RISC processor.

<A Possibility of a Higher Degree of Freedom in Reconfiguration>

Figure 19:
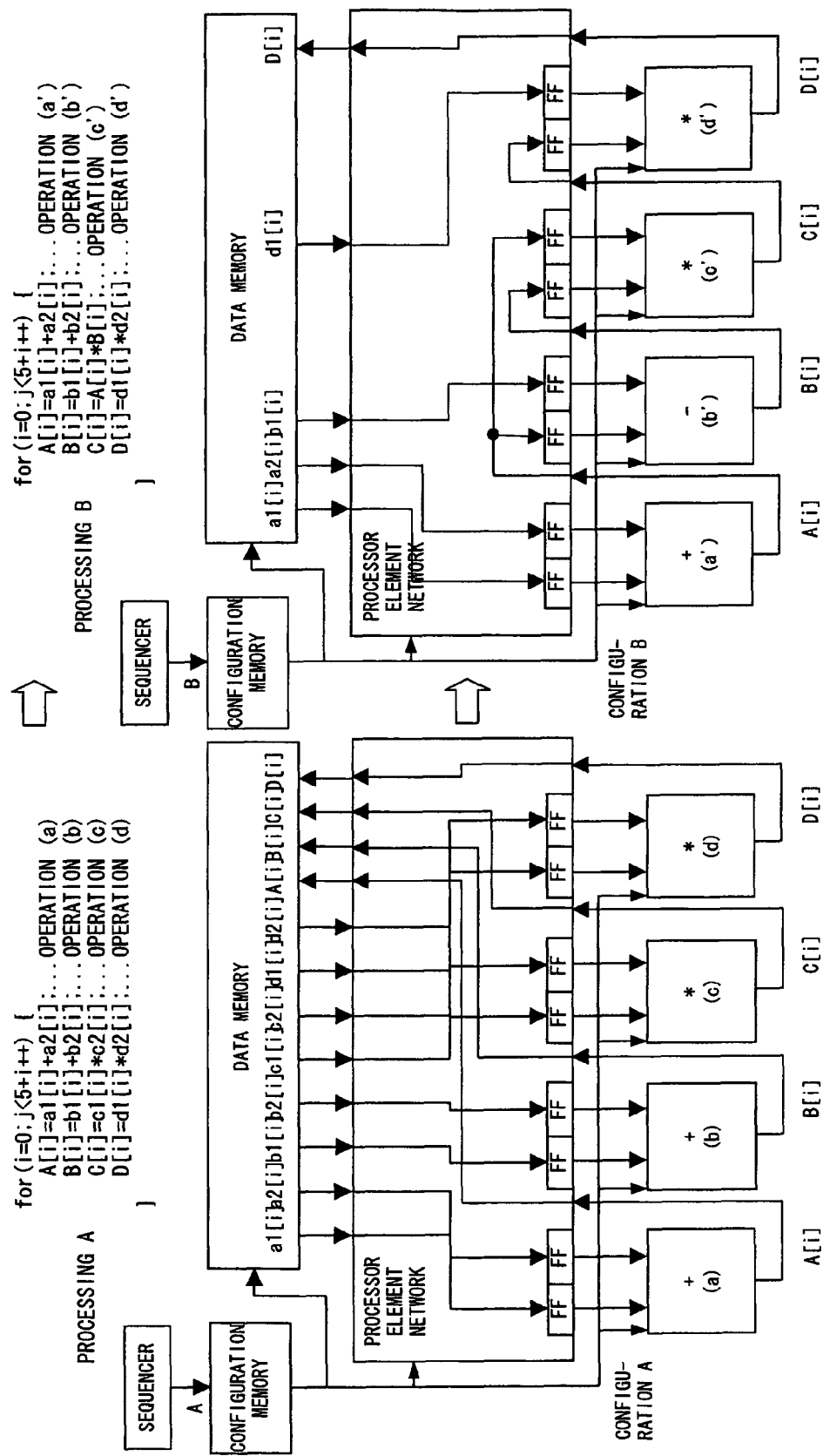
FIG. 19 shows an example of reconfiguration in the operation apparatus 1.

FIG. 19 shows a high flexibility in reconfiguring the processor element network 10 of the reconfigurable operation apparatus 1 according to the present invention. In FIG. 19, it is easy to reconfigure from one configuration for performing a processing "A" (i.e., the processing 2 above) to another for performing a processing "B" in which the equation B[i]=b1[i]+A[i] in the above described processing 3 is changed to B[i]=b1[i]−A[i]. As such, reconfiguring from an independent parallel processing to an inter-dependent parallel processing can be done with a high degree of freedom according to the present invention.

<Scalability>

FIGS. 20A and 20B illustrate a comparison of scalability between a conventional RISC processor (shown in FIG. 20A) and the operation apparatus 1 (shown in FIG. 20B) according to the present invention. In the RISC processor shown in FIG. 20A, a memory port of the register file must be added as the number of the ALU modules capable of simultaneous operation increases. One such ALU module causes two read ports and one write port to be added. The area size occupied by a register file is very large in the processor in the order of an n squared area size increase in the register file for an n times of increase in the number of the ports, and therefore it is difficult to increase the number of the ALU modules. This problem occurs in either the parallel processing or the pipeline processing by a RISC processor.

Comparatively in the processor element network 10 according to the present invention, the number of ALU modules can be increased within a practical mounting limitation of memory or input or output resources for a parallel processing. For a pipeline processing, since the in-process results are retained by the FF 492 in the inter-element network 40, eliminating a need to rewrite the in-process results in the memory 240 and read out thereof, and therefore the memory size or the number of ports required for the register file does not increase even with a deeper number of pipeline stages (i.e., with an increased number of ALU modules for simultaneous operations). Accordingly, this facilitates addition of the ALU module since the memory size or the number of ports required for the register file does not increase with the number of ALU modules. An increased number of the ALU modules will improve the processing efficiency per unit time.

[The Preferred Embodiments]

FIG. 21 is a summary conceptual block diagram of the processor element network 10b according to a preferred embodiment of the present invention. As the processor element network 10b shown in FIG. 21 is almost the same as the processor element network 10a shown in FIG. 9, only the difference is described herein. The difference is that the processor element network 10b is equipped with data enabling lines DE 0 through DE 3 for each of external data input lines ID 0 through ID 3, respectively, for obtaining an enable signal ES for generating a switching condition signal; address enable signals AE 0 through AE 3 for each of external address inputs A0 through A3, respectively, for inputs into RAMs 0 through 3; a selector 62 connected with the data enables DE 0 through DE 3 and the address enables AE 0 through AE 3 as the inputs thereto; and a configuration data memory section 64 disposed for the selector 62.

The selector 62 selects either one of the data, enables DE 0 through DE 3 or the address enables AE 0 through AE 3, and sends it out as an enabling signal ES based on the data stored in the configuration data memory section 64.

In the meantime, a combination between an enabling signal for RAM read-out data and an enable signal for RAM write-in data may be used in place of the RAM address enable signals AE 0 through AE 3.

FIG. 22 shows a block diagram of a preferred embodiment of the switching condition signal generator 60. In FIG. 22, among each ALU module PE i (i=0, 1, 2 and 3 for the example shown in FIG. 21), each of the ALUb 23 and ALUa 24 outputs a condition forming signal becoming the logic 1 when a comparison operation produces an identical result. In the example shown in FIG. 22, the two of the condition forming signals CS 0a and CS 0b from the ALU module PE 0 are integrated as CS 0, and the two of the condition forming signals CS 1*a* and CS 1*b* from the ALU module PE 1 are integrated as CS 1. The switching condition signal generator 60 consists of a loop end detection section 610 generating a switching condition occurrence signal, which indicates the formation of a switching condition, by using a configuration data and an enable signal ES from the configuration memory 50; and a switching condition code generation unit 630 generating a pre-switching condition occurrence notice signal and a switching condition code outputting a switching condition code signal based on the condition forming signals CS 0*a* and CS 0*b*, CS 1*a* and CS 1*b*, from the ALU modules PE 0 and PE 1, respectively.

The switching condition code generation unit 630 consists of selectors 632, 634, 636 and 638 receiving the condition forming signals CS 0*a* and CS 0*b*, CS 1*a* and CS 1*b* from the ALU modules PE 0 and PE 1, respectively, and each selecting and sending out a unique one from the four of aforementioned condition forming signals; a CD memory section 640 storing the configuration data for the aforementioned selectors; switching condition code generation sections 642, 644, 646 and 648 sending out the predefined 2-bit codes 00, 01, 10 and 11 when the input signal becomes the logic 1; a priority-numbered selector 650 sending out one of outputs from the switching condition code generating sections 642 through 648 as a switching condition code signal in response to the condition forming signals CS 0 and CS 1; and an OR gate 652 sending out a logical sum of the condition forming signals CS 0*a*, CS 0*b*, CS 1*a* and CS 1*b*.

The loop end detection section 610, detecting an end of a loop processing (i.e., the processing has come out of a loop), consists of a data enabled counter 612 counting the enabled signal ES sent from the processor element network 10*b*; an expected loop cycle retention part 614 retaining an expected cycle of loop processing; a comparator 616 comparing outputs from the enable counter 612 and the expected loop cycle retention part 614; a cycle counter 618 counting outputs from the comparator 616; a loop-end offset value retention section 620 retaining the number of clock cycles required for completing the current processing with the pipeline being all cleared of the current processing; a comparator 622 comparing between the cycle counter 618 and the loop-end offset value retention section 620; a selector 624 connected with the output of the comparator 622 and a pre-switching condition occurrence notice signal from the switching condition code generation unit 630, and send out either one of the aforementioned two signals; and a CD retention section 626 retaining a configuration data instructing a selection by the selector 624.

The following describes operations of the switching condition signal generator 60 consisting of as above. Let it assume that a configuration data is stored in the CD memory section 640 of the selectors 632 through 638 so that each of the aforementioned selectors selects a respective one of the condition forming signals, for example, CS 0*a*, CS 0*b*, CS 1*a* and CS 1*b*. Each of the signals CS 0*a*, CS 0*b*, CS 1*a* and CS 1*b* selected by the selectors 632, 634, 636 and 638, respectively, can be such that a plurality thereof becomes the logic 1 simultaneously. The switching condition code generation sections 642, 644, 646 and 648 send out the predefined 2-bit code as described above when signals from the selectors 632, 634, 636 and 638 are the logic 1. Let it assume that, in the priority-numbered selector 650, the outputs from the switching condition code generation sections 642, 644, 646 and 648, and the condition forming signals CS 0*a*, CS 0*b*, CS 1*a* and CS 1*b*, which are the other inputs thereto, are made into related pairs, and furthermore the outputs from the switching condition code generation sections 642, 644, 646 and 648 (or the condition forming signals CS 0*a*, CS 0*b*, CS 1*a* and CS 1*b*) are each given a predefined priority number. The priority-numbered selector 650 sends out a 2-bit code, as a switching condition code signal, related to the one given the highest of the predefined priority-numbered condition forming signal among those which have become the logic 1 out of the condition forming signals CS 0*a*, CS 0*b*, CS 1*a* and CS 1*b* when receiving outputs from a plurality of the switching condition code generation sections (i.e., 642, 644, 646 and 648). The four-input OR gate 652, connected with the condition forming signals CS 0*a*, CS 0*b*, CS 1*a* and CS 1*b* as the inputs thereto, sends out the "logic 1" when at least one of the condition forming signals CS 0*a*, CS 0*b*, CS 1*a* and CS 1*b* is the logic 1.

Meanwhile, in the loop end detection section 610, the data enable counter 612 counts the number of the received enable signals ES and sends it out. The comparator 616 compares an output from the data enable counter 612 and a value of the expected loop cycle retention part 614, and, if the two are identical, sends out a signal indicating an "identity." The cycle counter 618 starts counting the number of processing cycles (e.g., clocks) in the reconfigurable operation apparatus 1 upon receiving the identity signal from the comparator 616. In the loop-end offset value retention part 620, the number of clock cycles required for completing the current processing (i.e., the pipeline is all cleared of the process data of the current processing) is stored. Therefore, since the comparator 622 sends out the identity signal when a value of the cycle counter 618 is equal to that of the loop-end offset value retention part 620, which means that the identity signal is outputted at the timing of the current processing being completed when an enable signal ES is equal to the number of expected loop cycles. The selector 622 sends out either the output from the comparator 622 or the output from the 4-input OR gate 652 corresponding to a 1-bit content of the CD memory section 626.

The switching condition signal generator 60, as described above, sends out a switching condition occurrence signal (i.e., the output of the selector 624) indicating a configuration switching timing, and a 2-bit switching condition code signal.

Note that it is preferable to dispose the priority-numbered selector 650 for retaining either a configuration data supplied by the configuration memory 50 or a set data inputted from another input unit so as to enable the user to set a priority.

Figure 23:
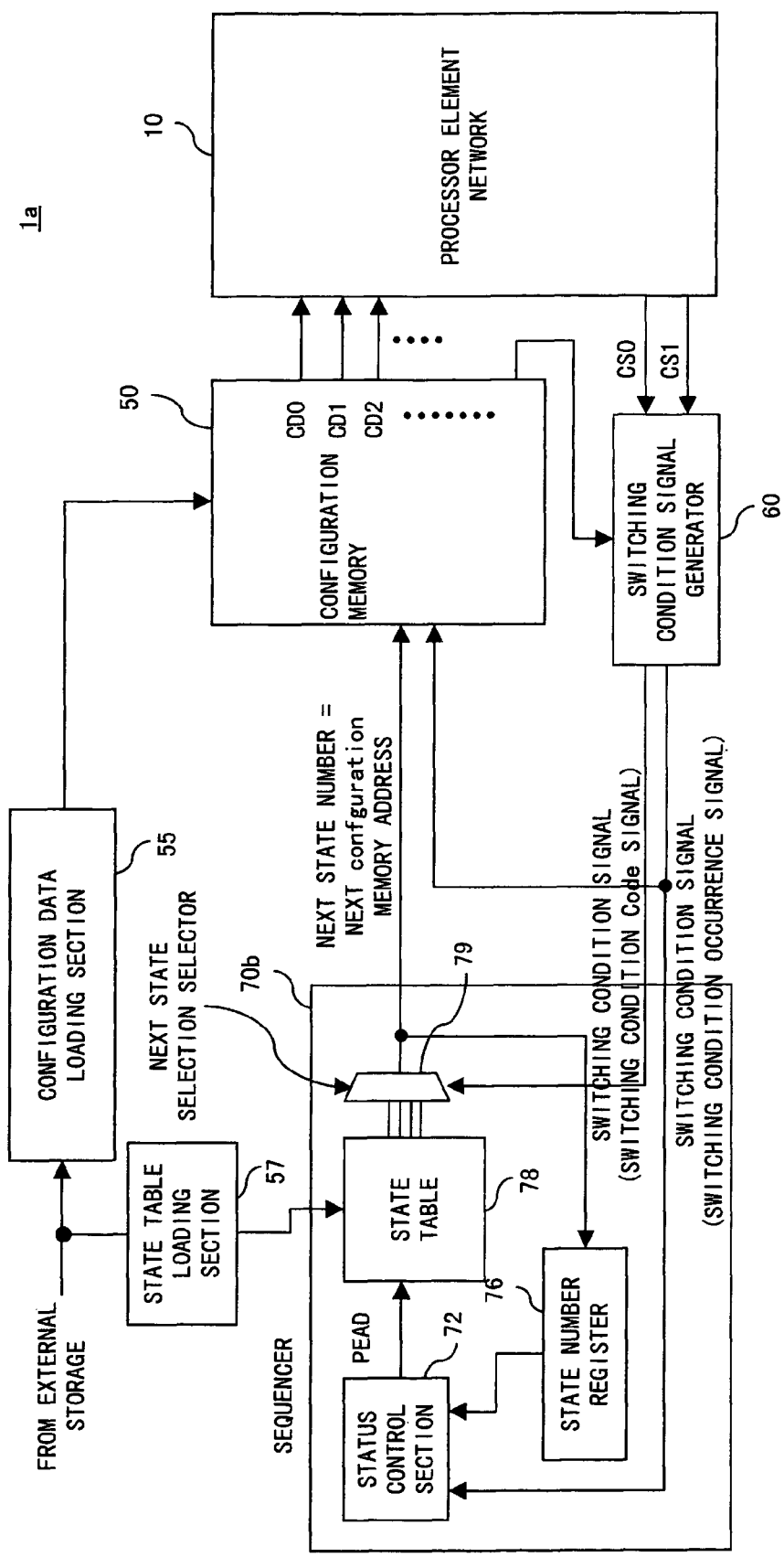
FIG. 23 is a summary block diagram showing the entire comprisal of the operation apparatus according to a preferred embodiment using the processor element network 10b shown in FIG. 21 and the switching condition signal generator 60 shown in FIG. 22, and a practical example of sequencer.

FIG. 23 is a summary block diagram showing the entire comprisal of the operation apparatus according to a preferred embodiment using the processor element network 10*b* shown in FIG. 21 and the switching signal generator 60 shown in FIG. 22, and a practical example of sequencer. In FIG. 23, the processor element network 10*b*, the configuration memory 50, the CD loading section 55 and the switching condition signal generator 60 are as already described.

The sequencer 70*b* consists of a status control section 72, a state table 78 outputting candidates of post-transition state numbers related to an output from the status control section 72, a selector 79 selecting a candidate sent out by the state control section 72 based on a switching condition code signal from the switching condition signal generator 60 and sending out as the next state number (equal to a configuration memory address), and a state number register 76 retaining the output from the selector 79. A switching condition occurrence signal from the switching condition signal generator 60 is supplied to the status control section 72 and the configuration memory 50. As described above, the reconfigurable operation apparatus 1 is also equipped with a state table loading section 57 so that a state table 78 is loaded from a not-shown external storage apparatus onto the storage apparatus of the sequencer 70 or 70b.

FIG. 24 shows an embodiment of the state table 78. In FIG. 24, the state table 78 consists of the address decoder 740 described already in FIG. 12, and a state transition table 742a made up of a list of candidates for post-transition state numbers corresponding to possible states.

The operation of the sequencer 70b is described referring to FIGS. 23 and 24 as follows.

The status control section 72 sends out the current state number (i.e., the current configuration memory address) retained in the current state number register 76 to the state table 78 in synchronism with a switching condition occurrence signal from the switching condition signal generator 60. Upon receiving the current state number, the address decoder 740 in the state table 78 specifies a list of candidates "i" (where i=1 to n; n denotes the number of possible states) for a post-transition state number corresponding to the current state number by decoding the current state number. The state transition table 742a sends out a list of candidates "i" for the specified post-transition state number. In the example shown in FIG. 24, four candidates for post-transition state numbers are included in the list of candidates "i." Upon receiving the candidate list "i" of post-transition state numbers, the selector 79 sends out a post-transition state number corresponding to a switching condition code signal from the switching condition signal generator 60. For example, a method is provided for placing a list of candidates "i" for the post-transition state number in the order, e.g., switching condition code signals 00, 01, 10 and 11. Various methods for corresponding as above can be considered. The next state number (i.e., the next CMA) sent out from the selector 79 is supplied to the current state number register 76 and the configuration memory 50. The current state number register 76 retains the received next state number. A configuration data for the next CMA in the configuration memory 50 is read out in synchronism with the switching condition occurrence signal from the switching condition signal generator 60, the read-out configuration data is then distributed to each recipient. The configuration data thus distributed to each processor element accomplish a reconfiguration.

<Presetting the Next CMA>

FIG. 25 is a summary block diagram showing an embodiment of a sequencer performing a look-ahead of the state table 78. The sequencer 70c shown in FIG. 25 is the same as the sequencer 70b shown in FIG. 23, except that the sequencer 70c is equipped with a state switching section 80 sending out the current state number, which is switched over from the next state number based on the output from the current state number register 76 and the switching condition occurrence signal, by way of the selector 79.

Figure 26:
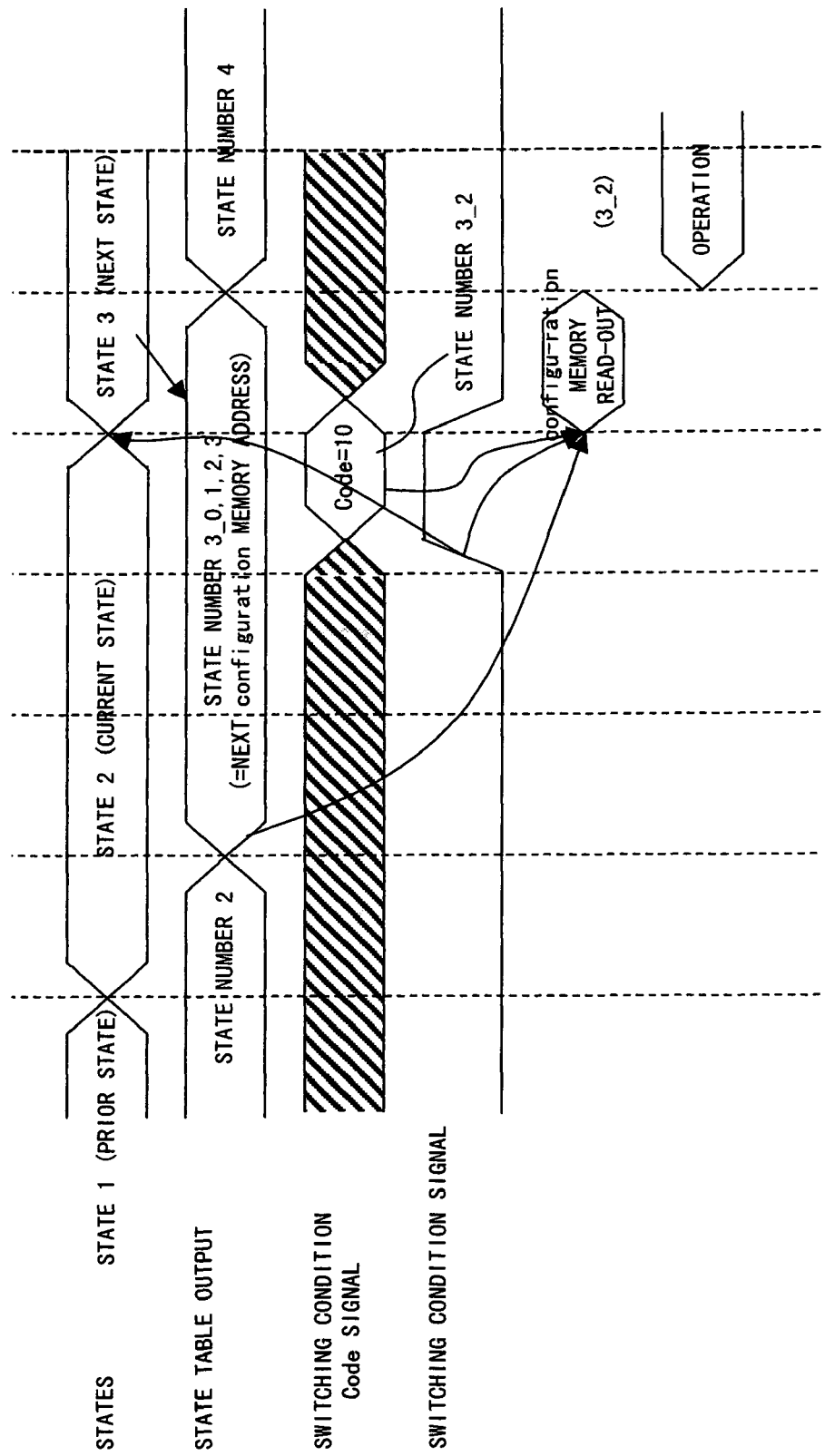
FIG. 26 is a processing status chart showing an operation timing of the sequencer 70c shown in FIG. 25.

FIG. 26 is a processing status chart showing an operation timing of the sequencer 70c shown in FIG. 25. In the state 2 (i.e., the current state) shown by FIG. 26, the state switching section 80 reads out the candidates for post-transition state numbers from the state table 78 in advance, select the next state number from the aforementioned candidates responding to the switching condition occurrence signal, and reads out the configuration memory at once, thereby accomplishing a high speed switching. That is, since the next state number 3, in other words, the next configuration memory address (CMA) is already read out before a state switching timing occurrence in the state 2 (i.e., the current state), the configuration memory address is read out at the time of state switching timing occurrence, the next configuration data is read out of the configuration memory, and an execution of operation is thus enabled. Although this example shows as if the configuration memory read-out and the execution of operation each took one clock, the execution of operation can start in the same clock cycle as the configuration memory read-out. Also, according to the present invention, the configuration loading section 55 for loading configuration data into the configuration memory 50 from an external storage apparatus (not shown) may be incorporated in the sequencer.

<Various Modifications>

FIG. 27 is a summary block diagram showing an embodiment of an operation apparatus equipped with a configuration register. The reconfigurable operation apparatus 1b shown in FIG. 27 is the same as the reconfigurable operation apparatus 1 shown in FIG. 7, except that a configuration register 82 is inserted between the configuration memory 50 and the processor element network 10, and a switching condition signal from the switching condition signal generator 60 is also supplied to the processor element network 10 in the former.

FIG. 28 is a processing status chart showing a configuration switching operation of the reconfigurable operation apparatus 1b shown in FIG. 27. In FIG. 28, the state number 3 (i.e., the next CMA) is outputted from the sequencer 70 in the state 2 (i.e. the current state) as described above. The next configuration data is read out of the configuration memory 50 by using the next CMA, and stored in the configuration register 82. Therefore the next configuration data is already stored in the configuration register 82 in the state 2 (i.e. the current state). Then, in response to a switching condition signal from the switching condition signal generator 60 becoming active, each reconfigurable processor element in the processor element network 10 takes in the configuration data from the respectively allocated place in the configuration register 82, and thereby completing the reconfiguration and enabling the actual processing. As such, equipping with the configuration register 82 enables a speedy configuration switching.

FIGS. 29A and 29B show variations of embodiment in allocating the configuration register 82. FIG. 29A shows an example of grouping diverse processor elements 20, 250 including the inter-element network 40, and allocating each of configuration registers 82 a1, 82 a2, . . . , 82 aN (where N denotes the number of processor element groups) to each processor element group.

FIG. 29B shows an example of allocating each of configuration registers 82 b1, 82 b2, . . . , 82 bM (where M denotes the number of reconfigurable processor elements) to each processor element including the inter-element network 40.

FIGS. 30A and 30B show embodiments of allocating the configuration memory 50 in a distributed manner. FIG. 30A shows the configuration memory 50 a being disposed for each reconfigurable processor element. FIG. 30B shows an embodiment of clustering the processor element network 10 and disposing the configuration memory 50b for each cluster. In either case, each memory 50a, or 50b, receives the respective data from the configuration data loading section 55 and the sequencer 70.

Figure 31:
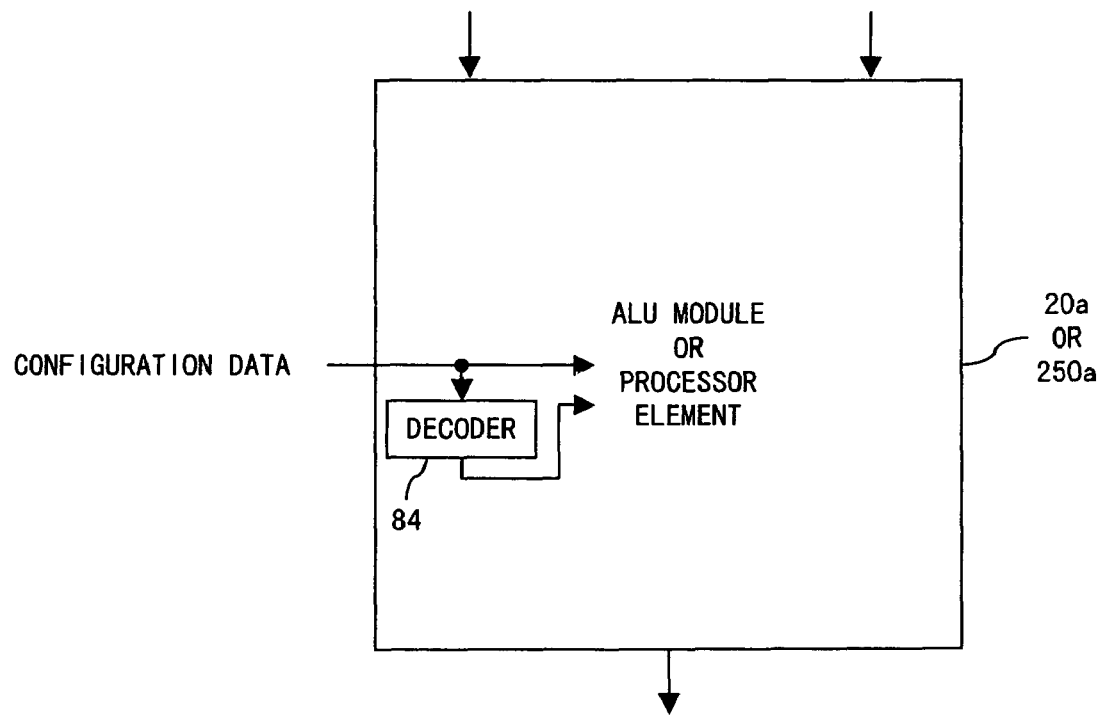
FIG. 31 illustrates an embodiment of the way the ALU module or the processor element decoding a part or the whole of the received configuration data as shown in FIGS. 7, 8, 9, 21, 22, 29A and 29B, and 30A and 30B.

FIG. 31 illustrates an embodiment of the way the ALU module or the processor element decoding a part or the whole of the received configuration data as shown in FIGS. 7, 8, 9, 21, 22, 29A and 29B, and 30A and 30B. Decoding a part of configuration data enables a speedy switching of states.

FIG. 32 is a summary block diagram showing example comprisal of a processor element network according to another embodiment. In FIG. 32, the processor element network 10c consists of eight ALU modules 20, two selectors (i.e., SEL modules) 252, four MUL/MAC modules 254, a plurality of counters 264, register files 256, two sets of double buffers 266, and an inter-element network 40c connecting the aforementioned processor elements. Also, the processor element network 10c, while consisting of two 2048-word RAMs 258 and four 512-word RAMs 259, includes an arbiter 260 connected to each RAM 258 and RAM 259 so as to enable accesses not only from the ALU modules 20 and the MUL/MAC modules 254 but also from a not-shown CPU, and the inter-element network 40c and a selector/address decoder 262 are connected with the aforementioned RAMs by way of the arbiter 260. Such a comprisal enables a system operating in association with a CPU (not shown) proficient of a procedure processing, and thereby an operation integrating a procedure processing and a pipeline processing is possible, thus responding to a wide variety of use.

The above have merely listed embodiments for describing the present invention. Therefore, it is easy for the inventor of the present invention to change, modify or add to the above described embodiments according to the idea or principle of technology associated with the present invention.

As has been made apparent by the network architecture shown in FIG. 8 and FIGS. 10A through 10L, since the interconnection between each of the processor elements or resources in a network for interconnecting them is accomplished only by the selector 490 (and the FF 492) whose output is connected with the input of each resource, not by such selector as the ones used for connecting other resources, hence an element or resource can easily be added or eliminated in the middle of a design.

While the above embodiments have taken examples of the operation apparatus, a reconfigurable operation apparatus according to the present invention may be obtained by a so called processor through an integrated circuit.

What is claimed is:

1. A reconfigurable operation apparatus, comprising:
a plurality of operation units that reconfigure themselves by using a given first configuration data;
at least one memory unit disposed freely for reading out thereof and writing therein;
diverse processor elements required for constituting an operation apparatus;
an inter-resource network connection unit that reconfigures itself by using a given second configuration data, said inter-resource network connection unit:
enabling arbitrary output data from said plurality of operation units and said memory unit to make arbitrary input data for said plurality of operation units, and
performing data transfers between resources consisting of said plurality of operation units, said memory unit and said diverse processor elements;
wherein at least one input port of the memory unit is a data input port and at least one input port of the memory unit is an address input port;
wherein first and second selectors are provided for each input port of each of the plurality of operation units and the memory unit; and
wherein each of outputs of each of the plurality of operation units and memory units is connected to another one of the plurality of operation units and the memory units through said first and second selectors;
a storage unit storing said first and second configuration data;
a loading unit loading said configuration data from an external storage apparatus to said storage unit; and
a supply unit supplying said first and second configuration data to said reconfigurable units in a suitable sequence and timing based on data obtained from said plurality of operation units;
said diverse processor elements including a counter, a shifter, and a delay flip- flop, wherein
the inter-resource network connection unit connects a plurality of first input ports, a plurality of second input ports, a plurality of first output ports, and a plurality of second output ports;
each of the first and second selectors comprises a plurality of input selectors;
an input terminal of one of the plurality of input selectors is connected to an external data input; and
an input terminal of another one of the plurality of input selectors is connected to an output of the counter, an output of the shifter, and an output of the delay flip-flop.

2. The reconfigurable operation apparatus according to claim 1, wherein said inter-resource network connection unit includes selector circuits whose outputs are connected with input terminals of said resources connected thereto;
inputs of a selector circuit whose output is connected with an input of each operation unit are connected with all outputs of said plurality of operation units; and
each selector circuit is equipped with a flip-flop at the output stage thereof.

3. The reconfigurable operation apparatus according to claim 1, wherein said supply unit includes a timing unit generating a timing signal indicating a timing for reconfiguring based on data obtained from said plurality of operation units;
a table unit storing state numbers corresponding to a predefined number of states;
a retention unit retaining a current state number;
a relation unit relating said current state number with one of the state numbers stored in said table unit; and
an output unit outputting said related state number responding to said timing signal, wherein said related state number is used as an address for said storage unit.

4. The reconfigurable operation apparatus according to claim 1, wherein said supply unit includes a code generation unit generating a predefined code related to an identity signal indicating a comparison result outputted from comparator units included in each of said plurality of operation units being identical with one another;
a selection unit selecting one said code if a plurality of said predefined codes are generated;
a timing unit generating a timing signal indicating a timing for reconfiguring;
a table unit storing a plurality of lists of state numbers so that each of said plurality of lists of state numbers corresponding to a certain number of states includes a plurality of state numbers corresponding to said predefined code;
a retention unit retaining a current state number;
a relation unit relating said current state number with one of the state numbers stored in said table unit; and
an output unit outputting a state number corresponding to said selected code from among said related list of state numbers, responding to said timing signal, wherein said the state number outputted from the output unit is used as an address for said storage unit.

5. The reconfigurable operation apparatus according to claim 4, wherein said timing unit comprises a timing signal generation unit generating said timing signal in synchronism with a timing of said identity signal outputted by an arbitrary comparator unit of said plurality of arbitrary operation units.

6. The reconfigurable operation apparatus according to claim 4, wherein said timing unit comprises a detection unit detecting an end of loop processing to be processed by the aforementioned reconfigurable operation apparatus; and
   a timing signal output unit outputting said timing signal in synchronism with a piece of processing data being cleared from a resource used for the current configuration when said detection unit outputs a signal indicating an end of the current configuration.

7. The reconfigurable operation apparatus according to claim 6, wherein said detection unit comprises a condition forming signal unit outputting a condition forming signal indicating a condition forming by watching a data bus and an address bus;
   a loop cycle retention unit retaining an expected number of cycles of a loop; and
   a judgment unit judging whether or not an occurrence cycle of said condition forming signal is equal to said expected number of cycles of a loop.

8. The reconfigurable operation apparatus according to claim 5, wherein said timing unit comprises a detection unit detecting an end of loop processing to be processed by the aforementioned reconfigurable operation apparatus;
   a timing signal output unit outputting said timing signal in synchronism with a processing data being cleared from a resource used for the current configuration when said detection unit outputs a signal indicating an end of the current configuration;
   a selection unit selecting either one of outputs from said timing signal generation unit or said timing signal output unit based on a given configuration data.

9. The reconfigurable operation apparatus according to claim 3, wherein said supply unit includes a read-out unit preparing said related state number in advance, and reading a piece of configuration data out of said storage unit by using said related state number responding to said timing signal.

10. The reconfigurable operation apparatus according to claim 3, comprising a retention unit retaining a configuration data read out of said storage unit in advance by using said related state number; and a distribution unit distributing a configuration data retained by said retention unit to said reconfigurable units responding to said timing signal.

11. The reconfigurable operation apparatus according to claim 3, comprising a retention unit being equipped in each of said reconfigurable units, and retaining a configuration data allocated to each of said reconfigurable units; and
   a setting unit setting a configuration data retained by said retention unit in said reconfigurable units corresponding to said retention units responding to said timing signal.

12. The reconfigurable operation apparatus according to claim 3, comprising:
   a retention unit being equipped in each group of said reconfigurable units, and retaining a configuration data allocated to said each group of said reconfigurable units; and
   a setting unit setting a configuration data retained by said retention unit in said group of reconfigurable units corresponding to said retention units responding to said timing signal.

13. The reconfigurable operation apparatus according to claim 1, wherein said storage unit is equipped in each of said reconfigurable units, and said loading unit loads the configuration data allocated to each of said reconfigurable units onto said storage unit equipped in each of said reconfigurable units.

14. The reconfigurable operation apparatus according to claim 1, wherein said storage unit is equipped in each group of said reconfigurable units, and said loading unit loads a configuration data allocated to each group of said reconfigurable units onto said storage unit equipped in each group of said reconfigurable units.

15. The reconfigurable operation apparatus according to claim 1, wherein said reconfigurable units use a received configuration data by decoding at least a part thereof.

16. The reconfigurable operation apparatus according to claim 1 is an integrated circuit.

17. The reconfigurable operation apparatus according to claim 1, wherein the data transfers between resources consisting of said plurality of operation units, said memory unit and said diverse processor elements, are performed in a uniform transfer time independent of positions and kinds of said resources.

18. The reconfigurable operation apparatus according to claim 1, wherein the data transfers between resources consisting of said plurality of operation units, said memory unit and said diverse processor elements, are performed in one clock.

19. A reconfigurable pipeline processor having an operation resource network, comprising:
   a plurality of operation units that reconfigure themselves by using a given first configuration data;
   a memory unit disposed freely for reading out thereof and writing therein;
   diverse processor elements required for constituting an operation apparatus; and
   an inter-resource network connection unit that reconfigures itself by using a given second configuration data, said inter-resource network connection unit:
      interconnecting said operation units, said memory unit and said diverse processor elements, and
      performing data transfers between resources connected thereto;
      wherein at least one input port of the memory unit is a data input port and at least one input port of the memory unit is an address input port;
      wherein first and second selectors are provided for each input port of each of the plurality of operation units and the memory unit; and
      wherein each of outputs of each of the plurality of operation units and memory units is connected to another one of the plurality of operation units and the memory unit through said first and second selectors;
   said diverse processor elements including a counter, a shifter, and a delay flip-flop, wherein
      the inter-resource network connection unit connects a plurality of first input ports, a plurality of second input ports, a plurality of first output ports, and a plurality of second output ports;
      each of the first and second selectors comprises a plurality of input selectors;
      an input terminal of one of the plurality of input selectors is connected to an external data input; and
      an input terminal of another one of the plurality of input selectors is connected to an output of the counter, an output of the shifter, and an output of the delay flip-flop.

20. The reconfigurable pipeline processor according to claim 19 is an integrated circuit.

* * * * *